US010230964B2

(12) United States Patent
Sato

(10) Patent No.: US 10,230,964 B2
(45) Date of Patent: Mar. 12, 2019

(54) IMAGE PROCESSING APPARATUS AND METHOD

(71) Applicant: SONY CORPORATION, Tokyo (JP)

(72) Inventor: Kazushi Sato, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/709,572

(22) Filed: Sep. 20, 2017

(65) Prior Publication Data
US 2018/0007370 A1 Jan. 4, 2018

Related U.S. Application Data

(63) Continuation of application No. 14/329,267, filed on Jul. 11, 2014, now Pat. No. 9,924,177, which is a
(Continued)

(30) Foreign Application Priority Data

Jun. 4, 2010 (JP) .................................. 2010-129414
Sep. 30, 2010 (JP) .................................. 2010-222300
(Continued)

(51) Int. Cl.
*H04N 19/18* (2014.01)
*H04N 19/176* (2014.01)
(Continued)

(52) U.S. Cl.
CPC ........... *H04N 19/18* (2014.11); *H04N 19/119* (2014.11); *H04N 19/124* (2014.11);
(Continued)

(58) Field of Classification Search
CPC ...... H04N 19/18; H04N 19/124; H04N 19/44; H04N 19/174; H04N 19/14; H04N 19/126;
(Continued)

(56) References Cited

U.S. PATENT DOCUMENTS 6,915,014 B1 * 7/2005 Honma ................ H04N 19/176
375/E7.13
8,107,754 B2 1/2012 Chen
(Continued)

FOREIGN PATENT DOCUMENTS

JP 2006-262004 9/2006
JP 2008-206211 9/2008
(Continued)

OTHER PUBLICATIONS

Combined Office Action and Search Report dated Jun. 7, 2018 in Chinese Patent Application No. 201510593508.1 (with English language translation), 16 pages.
(Continued)

*Primary Examiner* — Amandeep Saini
(74) *Attorney, Agent, or Firm* — Xsensus LLP

(57) ABSTRACT

An image processing apparatus, including processing circuitry configured to decode a bit stream to generate quantized data. The bit stream includes a flag, for each block, that specifies whether or not a difference quantization parameter is present in the bit stream. The flag is included in a first layer that is higher than a second layer in which the difference quantization parameter is set. The processing circuitry is configured to set, according to the flag, a current quantization parameter for a current sub block formed by block partitioning, which splits a block into smaller sub blocks. The processing circuitry is configured to inversely quantize the generated quantized data using the set current quantization parameter.

14 Claims, 43 Drawing Sheets

Related U.S. Application Data continuation of application No. 13/700,156, filed as application No. PCT/JP2011/062797 on Jun. 3, 2011, now Pat. No. 8,849,052.

(30) Foreign Application Priority Data

Mar. 10, 2011 (JP) ................................ 2011-053479
Mar. 11, 2011 (JP) ................................ 2011-054816

(51) Int. Cl.
| | |
|---|---|
| H04N 19/70 | (2014.01) |
| H04N 19/119 | (2014.01) |
| H04N 19/30 | (2014.01) |
| H04N 19/196 | (2014.01) |
| H04N 19/463 | (2014.01) |
| H04N 19/124 | (2014.01) |
| H04N 19/126 | (2014.01) |
| H04N 19/14 | (2014.01) |
| H04N 19/174 | (2014.01) |
| H04N 19/44 | (2014.01) |
| H04N 19/33 | (2014.01) |

(52) U.S. Cl.
CPC ........... *H04N 19/126* (2014.11); *H04N 19/14* (2014.11); *H04N 19/174* (2014.11); *H04N 19/176* (2014.11); *H04N 19/196* (2014.11); *H04N 19/30* (2014.11); *H04N 19/33* (2014.11); *H04N 19/44* (2014.11); *H04N 19/463* (2014.11); *H04N 19/70* (2014.11)

(58) Field of Classification Search
CPC .... H04N 19/33; H04N 19/463; H04N 19/196; H04N 19/30; H04N 19/119; H04N 19/70; H04N 19/176
USPC ......................................................... 382/251
See application file for complete search history.

(56) References Cited

U.S. PATENT DOCUMENTS

| | | | |
|---|---|---|---|
| 2005/0123050 A1 | 6/2005 | Kondo | |
| 2005/0201625 A1* | 9/2005 | Kondo | H04N 19/17 382/232 |
| 2006/0209952 A1 | 9/2006 | Tanizawa et al. | |
| 2007/0230584 A1 | 10/2007 | Chen et al. | |
| 2008/0219354 A1* | 9/2008 | Segall | H04N 19/176 375/240.23 |
| 2009/0168873 A1* | 7/2009 | Jeon | H04N 19/105 375/240.12 |
| 2009/0296808 A1 | 12/2009 | Regunathan et al. | |
| 2010/0074338 A1 | 3/2010 | Yamori et al. | |
| 2013/0188883 A1 | 7/2013 | Gisquet | |

FOREIGN PATENT DOCUMENTS

| | | |
|---|---|---|
| JP | 2009-531999 | 9/2009 |
| JP | 2010-011075 | 1/2010 |
| WO | 2008-126135 | 10/2008 |

OTHER PUBLICATIONS

Combined Office Action and Search Report dated Jun. 7, 2018 in Chinese Patent Application No. 201510593300.X (with English language translation), 16 pages.
Office Action dated Mar. 21, 2018 in Korean Patent Application No. 10-2018-7002965 (with English translation).
Office Action dated Mar. 21, 2018 in Korean Patent Application No. 10-2018-7002964 (with English translation).
Combined Chinese Office Action and Search Report dated Dec. 1, 2017 in Patent Application No. 201510593300.X (with English language translation).
Office Action dated Nov. 10, 2017 in Korean Patent Application No. 10-2017-7029341 (with English language translation).
International Search Report dated Jul. 12, 2011 in PCT/JP11/62797 filed Jun. 3, 2011.
Sung-Chang Lim et al., "Intra coding using extended block size", ITU-Telecommunications Standardization Sector, Study Group 16, Question 6, 38th Meeting, Jul. 1-8, 2009, pp. 1-5.
Peisong Chenn et al. "Video Coding Using Extended Block Sizes", Qualcomm Inc., International Telecommunication Union, Jan. 2009, pp. 1-4.
Extended Search Report dated Sep. 26, 2014 in European Patent Application No. 11789919.5.
Marta Karczewicz, et al., "Video coding technology proposal by Qualcomm Inc.", Qualcomm Inc., JCTVC-A121, JointCollaborative Team on Video Coding of (JCT-VC), of ITU-T SG16 WP3 and ISO/IEC JTC1/SC29/WG11 XP030007566, Apr. 15-23, 2010 , XP030007567, 26 pages.
Madhukar Budagavi, et al., "Delta QP signaling at sub-LCU level", Texas Instruments Inc., Joint Collaborative Team on Video Coding (JCT-VC), of ITU-T SG16 WP3 and ISO/IEC JTC1/SC29/WG11, JCTVC-D038, Jan. 20-28, 2011, XP030008079, 6 pages.
Combined Office Action and Search Report dated Dec. 16, 2014 in Chinese Patent Application No. 201180026114.8 (with English language translation).
Office Action dated Jun. 30, 2015 in Japanese Patent Application No. 2012-518484.
Office Action dated Jun. 30, 2015 in Japanese Patent Application No. 2014-114195.
Extended European Search Report dated Aug. 10, 2015 in Patent Application No. 15162793.2.
"Advanced video coding for generic audiovisual services" International Telecommunications Union—Telecommunication Standardization Sector of ITU—https://www.itu.int/rec/T-REC-H.264, Mar. 2010, 4 Pages.
Japanese Office Action dated Sep. 8, 2015 in Patent Application No. 2014-114195 (without English Translation).
Kemal Ugur et al., "Description of Video Coding Technology Proposal by Tandberg, Nokia, Ericsson", Joint Collaborative Team on Video Coding (JCT-VC) of ITU-T SG16 WP3 and ISO/IEC JTC1/SC29/WG11 1st Meeting: Dresden, DE, JCTVC-A119, Apr. 15-23, 2010, 5 pages.
Kemal Ugur et al., Appendix to Description of Video Coding Technology Proposal by Tandberg Nokia Ericsson, Joint Collaborative Team on Video Coding (JCT-VC) of ITU-T SG16 WP3 and ISO/IEC JTC1/SC29/WG11, 1st Meeting: Dresden, DE, JCTVC-A119_Appendix_Decoder_Description, Apr. 15-23, 2010, 2 pages.
Ken McCann et al., "Samsung's Response to the Call for Proposals on Video Compression Technology", Joint Collaborative Team on Video Coding (JCT-VC) of ITU-T SG16 WP3 and ISO/IEC JTC1/SC29/WG11 1st Meeting: Dresden, DE, JCTVC-A124, Apr. 15-23, 2010, 3 pages.
Combined Chinese Office Acton and Search Report dated Oct. 30, 2015 in Patent Application No. 201310142242.X (with English language translation).
Combined Chinese Office Action and Search Report dated Nov. 3, 2015 in Patent Application No. 201310142243.4 (with English language translation).
Combined Chinese Office Action and Search Report dated Nov. 19, 2015 in Patent Application No. 201310142193.X (with English language translation).
Combined Chinese Office Action and Search Report dated Dec. 3, 2015 in Patent Application No. 201310142062.1 (with English language translation).
Combined Chinese Office Action and Search Report dated Dec. 16, 2015 in Patent Application No. 201310142244.9 (with English language translation).
Japanese Office Action dated Mar. 31, 2016 in Patent Application No. 2014-114195 (with English language translation).
Japanese Office Action dated Mar. 10, 2016 in Patent Application No. 2012-518464.

(56) References Cited

OTHER PUBLICATIONS

Office Action dated Sep. 29, 2016 in Japanese Patent Application No. 2012-518464.
Summons to Attend Oral Proceedings Pursuant to Rule 115(1) EPC issued Oct. 18, 2016 in European Patent Application No. 15162793.2.
Ken McCann et al, "Samsung's Response to the Call for Proposals on Video Compression Technology", Joint Collaborative Team on Video Coding (JCT-VC) of ITU-T SG16 WP3 and ISO/IEC JTC1/SC29/WG11 Document: JCTVC-A124, Apr. 15-23, 2010, 42 pages.
Extended European Search Report dated Apr. 26, 2017 in Patent Application No. 17152128.9.
Office Action dated Mar. 22, 2017 in Korean Patent Application No. 10-2012-7030833 (with English translation).
Extended European Search Report dated May 29, 2017 in Patent Application No. 17151964.8.
U.S. Appl. No. 14/329,182, filed Jul. 11, 2014, Sato.
U.S. Appl. No. 14/329,403, filed Jul. 11, 2014, Sato.

\* cited by examiner

FIG. 2

| QP$_Y$ | <30 | 30 | 31 | 32 | 33 | 34 | 35 | 36 | 37 | 38 | 39 | 40 | 41 | 42 | 43 | 44 | 45 | 46 | 47 | 48 | 49 | 50 | 51 |
|---|---|---|---|---|---|---|---|---|---|---|---|---|---|---|---|---|---|---|---|---|---|---|---|
| QP$_C$ | =QP$_Y$ | 29 | 30 | 31 | 32 | 32 | 33 | 34 | 34 | 35 | 35 | 36 | 36 | 37 | 37 | 37 | 38 | 38 | 38 | 39 | 39 | 39 | 39 |

FIG. 17

| coding_unit( x0, y0, currCodingUnitSize ) { | C | Descriptor |
|---|---|---|
| if( x0+currCodingUnitSize < PicWidthInSamples$_L$ && | | |
| y0+currCodingUnitSize < PicHeightInSamples$_L$ && | | |
| currCodingUnitSize > MinCodingUnitSize ) | | |
| split_coding_unit_flag | 2 | u(1) \| ae(v) |
| if( ( split_coding_unit_flag && | | |
| currCodingUnitSize == AlfMinCtrlCodingUnitSize ) \|\| | | |
| ( !split_coding_unit_flag && | | |
| currCodingUnitSize > AlfCtrlMinCodingUnitSize ) | | |
| cu_qp_delta | 2 | se(v) |
| alf_flag | 2 | u(1) \| ae(v) |
| if( split_coding_unit_flag ) { | | |
| splitCodingUnitSize = currCodingUnitSize >> 1 | | |
| x1 = x0 + splitCodingUnitSize | | |
| y1 = y0 + splitCodingUnitSize | | |
| coding_unit( x0, y0, splitCodingUnitSize ) | 2\|3\|4 | |
| if( x1 < PicWidthInSamples$_L$ ) | | |
| coding_unit( x1, y0, splitCodingUnitSize ) | 2\|3\|4 | |
| if( y1 < PicHeightInSamples$_L$ ) | | |
| coding_unit( x0, y1, splitCodingUnitSize ) | 2\|3\|4 | |
| if( x1 < PicWidthInSamples$_L$ && y1 < PicHeightInSamples$_L$ ) | | |
| coding_unit( x1, y1, splitCodingUnitSize ) | 2\|3\|4 | |
| } else { | | |
| prediction_unit( x0, y0, currCodingUnitSize ) | 2 | |
| if( PredMode != MODE_SKIP \|\| !(PredMode == MODE_INTRA && planar_flag == 1 ) ) | | |
| transform_unit( x0, y0, currCodingUnitSize ) | 3\|4 | |
| } | | |
| } | | |

FIG. 24

| | METHOD OF CALCULATING dQP | EASINESS OF PIPELINE PROCESS | CODING EFFICIENCY |
|---|---|---|---|
| 1 | dQP=CurrentQP−LCUQP | ◎ | ◎ |
| 2 | dQP=CurrentQP−PreviousQP | ○ | ◉ |
| 3 | dQP=CurrentQP−SliceQP | ◉ | ○ |

FIG. 26

| | | C | Descriptor |
|---|---|---|---|
| 1 | slice_header( ) { | | |
| 2 |     first_lctb_in_slice | 2 | ue(v) |
| 3 |     slice_type | 2 | ue(v) |
| 4 |     pic_parameter_set_id | 2 | ue(v) |
| 5 |     frame_num | 2 | u(v) |
| 6 |     if( IdrPicFlag ) | | |
| 7 |         idr_pic_id | 2 | ue(v) |
| 8 |     pic_order_cnt_lsb | 2 | u(v) |
| 9 |     if( slice_type == P \|\| slice_type == B ) { | | |
| 10 |         num_ref_idx_active_override_flag | 2 | u(1) |
| 11 |         if( num_ref_idx_active_override_flag ) { | | |
| 12 |             num_ref_idx_l0_active_minus1 | 2 | ue(v) |
| 13 |             if( slice_type == B ) | | |
| 14 |                 num_ref_idx_l1_active_minus1 | 2 | ue(v) |
| 15 |         } | | |
| 16 |     } | | |
| 17 |     if( nal_ref_idc != 0 ) | | |
| 18 |         dec_ref_pic_marking( ) | 2 | |
| 19 |     if( entropy_coding_mode_flag && slice_type != I ) | | |
| 20 |         cabac_init_idc | 2 | ue(v) |
| 21 |     slice_qp_delta | 2 | se(v) |
| 22 |     MinCUForDeltaQPCoded | 2 | ue(v) |
| 23 |     alf_param() | | |
| 24 | if( slice_type == P \|\| slice_type == B ) { | | |
| 25 |     mc_interpolation_idc | 2 | ue(v) |
| 26 |     mv_competition_flag | 2 | u(1) |
| 27 |     if ( mv_competition_flag ) { | | |
| 28 |         mv_competition_temporal_flag | 2 | u(1) |
| 29 |     } | | |
| 30 | } | | |
| 31 | if ( slice_type == B && mv_competition_flag) | | |
| 32 |     collocated_from_l0_flag | 2 | u(1) |
| 33 | | | |
| 34 |     sifo_param() | | |
| 35 |     if (entropy_coding_mode_flag == 3) | | |
| 36 |         parallel_v2v_header() | 2 | |
| 37 | edge_based_prediction_flag | 2 | u(1) |
| 38 | if( edge_prediction_ipd_flag == 1 ) | | |
| 39 |     threshold_edge | 2 | u(8) |
| 40 | } | | |

IMAGE PROCESSING APPARATUS AND METHOD

CROSS-REFERENCE TO RELATED APPLICATIONS

This application is a continuation of U.S. Ser. No. 14/329,267 filed Jul. 11, 2014, which is a continuation of U.S. Ser. No. 13/700,156 filed Nov. 27, 2012, now U.S. Pat. No. 8,849,052, the entire contents of which are incorporated herein by reference. U.S. Ser. No. 13/700,156 is a national stage of PCT/JP11/062797 filed Jun. 3, 2011, which claims priority under 35 U.S.C. 119 to Japanese Application Nos. 2010-129414 filed Jun. 4, 2010; 2010-222300 filed Sep. 30, 2010; 2011-053479 filed Mar. 10, 2011; and 2011-054816 filed Mar. 11, 2011.

TECHNICAL FIELD

The present technology relates to an image processing apparatus and a method and relates to an image processing apparatus and a method for performing a quantization process or an inverse quantization process.

BACKGROUND ART

Recently, an apparatus complying with a system such as MPEG (Moving Picture Experts Group), which digitally treats image information and compresses the same by an orthogonal transform such as a discrete cosine transform and motion compensation by using redundancy specific to the image information in order to efficiently transmit and accumulate the information at that time, has been widely used in both of information distribution in a broadcast station and information reception in standard home.

These days, there are growing needs for higher compression coding such as coding of an image of approximately 4096×2048 pixels, four times as many as those for a high-definition image, or distribution of the high-definition image in an environment of limited transmission capacity such as the Internet. Therefore, VCEG under ITU-T continuously studies improvement in coding efficiency.

A pixel size of a macroblock being a partial area of the image, which is a division unit (unit of coding process) of the image at the time of image coding in MPEG1, MPEG2, and ITU-T H.264/MPEG4-AVC being conventional image coding systems, is always 16×16 pixels. On the other hand, Non-Patent Document 1 suggests extending the number of pixels of the macroblock horizontally and vertically as elemental technology of next-generation image coding standard. This also suggests using the macroblock of 32×32 pixels and 64×64 pixels in addition to the pixel size of the macroblock of 16×16 pixels defined by the MPEG1, MPEG2, ITU-T H.264/MPEG4-AVC and the like. This is for improving the coding efficiency by performing the motion compensation and the orthogonal transform in a unit of larger area in areas with similar motion because it is predicted that the pixel size of the image to be coded increases horizontally and vertically in the future such as UHD (Ultra High Definition; 4000 pixels×2000 pixels), for example.

Non-Patent Document 1 adopts a hierarchical structure, thereby defining a larger block as a superset for the block not larger than 16×16 pixels while maintaining compatibility with the macroblock of current AVC.

Although Non-Patent Document 1 suggests applying the extended macroblock to inter slice, Non-Patent Document 2 suggests applying the extended macroblock to intra slice.

CITATION LIST

Non-Patent Documents

Non-Patent Document 1: Peisong Chenn, Yan Ye, Marta Karczewicz, "Video Coding Using Extended Block Sizes", COM16-C123-E, Qualcomm Inc Non-Patent Document 2: Sung-Chang Lim, Hahyun Lee, Jinho Lee, Jongho Kim, Haechul Choi, Seyoon Jeong, Jin Soo Choi, "Intra coding using extended block size", VCEG-AL28, July, 2009

SUMMARY OF THE INVENTION

Problems to be Solved by the Invention

When the extended macroblock as suggested in Non-Patent Documents 1 and 2 is applied, possibility that a flat area and an area including texture are mixed in a single macroblock becomes high.

However, since only one quantization parameter may be specified for one macroblock in Non-Patent Documents 1 and 2, it is difficult to perform adaptive quantization according to characteristics of the respective areas in a plane.

The present technology has been realized in view of such circumstances and an object thereof is to inhibit subjective image quality of a decoded image from deteriorating by performing a more appropriate quantization process.

Solution to Problems

An aspect of the present technology is an image processing apparatus, including: a decoding unit which decodes a coded stream to generate quantized data; a setting unit which sets a quantization parameter used when the quantized data generated by the decoding unit is inversely quantized for a coding unit in a layer lower than a reference coding unit in a reference layer of the coding unit being a unit of coding process when image data is coded; and an inverse quantization unit which inversely quantizes the quantized data generated by the decoding unit by using the quantization parameter set by the setting unit.

The setting unit may set the quantization parameter for a current coding unit by using a difference quantization parameter indicating a difference value between the quantization parameter set for the current coding unit being a target of an inverse quantization process and the quantization parameter set for the coding unit in the same layer as the current coding unit.

The difference quantization parameter may be the difference value between the quantization parameter set for the current coding unit and the quantization parameter set for the coding unit decoded before the current coding unit in order of decoding process.

The difference quantization parameter may be the difference value between the quantization parameter set for the current coding unit and the quantization parameter set for the coding unit decoded immediately before the current coding unit in the order of decoding process.

The reference coding unit may be a largest coding unit being the coding unit in a highest layer.

The image processing apparatus may further include: a receiving unit which receives the coded stream and minimum coding unit size data indicating a minimum size of the coding unit for which the difference quantization parameter is set, and the setting unit may set the quantization parameter for the current coding unit according to the minimum coding unit size data received by the receiving unit.

The receiving unit may obtain the minimum coding unit size data from a slice header of the coded stream.

When a size indicated by the minimum coding unit size data is 16 pixels, the difference quantization parameter for the coding unit of which size is smaller than 16 pixels may be set to 0.

The setting unit may set the quantization parameter for a current coding unit by using a difference quantization parameter indicating a difference value between the quantization parameter set for the current coding unit being a target of a decoding process and the quantization parameter set for a slice to which the current coding unit belongs.

The setting unit may set the quantization parameter for the current coding unit by using the difference quantization parameter indicating the difference value between the quantization parameter set for the current coding unit and the quantization parameter set for the slice to which the current coding unit belongs when the current coding unit is a first coding unit in order of decoding process in a layer of the reference coding unit.

The reference coding unit may be a largest coding unit being the coding unit in a highest layer.

The image processing apparatus may further include: a receiving unit which receives the coded stream and minimum coding unit size data indicating a minimum size of the coding unit for which the difference quantization parameter is set, and the setting unit may set the quantization parameter for the current coding unit according to the minimum coding unit size data received by the receiving unit.

The receiving unit may obtain the minimum coding unit size data from a slice header of the coded stream.

The difference quantization parameter for the coding unit of which size is smaller than 16 pixels may be set to 0 when a size indicated by the minimum coding unit size data is 16 pixels.

The setting unit may set the quantization parameter set for the reference coding unit as the quantization parameter set for the coding unit in a layer lower than the reference coding unit when a value of the difference quantization parameter is 0 for the coding unit in the layer lower than the reference coding unit.

The image processing apparatus may further include: a receiving unit which receives difference identification data for identifying whether the value of the difference quantization parameter is 0 for the coding unit in the layer lower than the reference coding unit, and the setting unit may set the quantization parameter set for the reference coding unit as the quantization parameter set for the coding unit in the layer lower than the reference coding unit by using the difference identification data received by the receiving unit.

An aspect of the present technology is an image processing method, including: generating quantized data by decoding a coded stream; setting a quantization parameter used when the generated quantized data is inversely quantized for a coding unit in a layer lower than a reference coding unit in a reference layer of the coding unit being a unit of coding process when image data is coded; and inversely quantizing the generated quantized data by using the set quantization parameter.

Another aspect of the present technology is an image processing apparatus, including: a setting unit which sets a quantization parameter used when image data is quantized for a coding unit in a layer lower than a reference coding unit in a reference layer of the coding unit being a unit of coding process when the image data is coded; a quantization unit which generates quantized data by quantizing the image data by using the quantization parameter set by the setting unit; and a coding unit which codes the quantized data generated by the quantization unit to generate a coded stream.

The setting unit may set a difference quantization parameter indicating a difference value between the quantization parameter set for a current coding unit being a target of a coding process and the quantization parameter set for the coding unit in the same layer as the current coding unit, and the image processing apparatus may further include: a transmitting unit which transmits the difference quantization parameter set by the setting unit and the coded stream generated by the coding unit.

The setting unit may set, as the difference quantization parameter, the difference value between the quantization parameter set for the current coding unit and the quantization parameter set for the coding unit coded before the current coding unit in order of coding process.

The setting unit may set, as the difference quantization parameter, the difference value between the quantization parameter set for the current coding unit and the quantization parameter set for the coding unit coded immediately before the current coding unit in the order of coding process.

The reference coding unit may be a largest coding unit being the coding unit in a highest layer.

The setting unit may set minimum coding unit size data indicating a minimum size of the coding unit for which the difference quantization parameter is set, and the transmitting unit may transmit the minimum coding unit size data set by the setting unit.

The transmitting unit may add, as a slice header, the minimum coding unit size data set by the setting unit to syntax of the coded stream generated by the coding unit.

The setting unit may set the difference quantization parameter for the coding unit of which size is smaller than 16 pixels to 0 when a size indicated by the minimum coding unit size data is set to 16 pixels.

The setting unit may set a difference quantization parameter indicating a difference value between the quantization parameter set for a current coding unit being a target of a coding process and the quantization parameter set for a slice to which the current coding unit belongs, and the image processing apparatus may further include: a transmitting unit which transmits the difference quantization parameter set by the setting unit and the coded stream generated by the coding unit.

The setting unit may set, as the difference quantization parameter, the difference value between the quantization parameter set for the current coding unit and the quantization parameter set for the slice to which the current coding unit belongs when the current coding unit is a first coding unit in order of coding process in a layer of the reference coding unit.

The reference coding unit may be a largest coding unit being the coding unit in a highest layer.

The setting unit may set minimum coding unit size data indicating a minimum size of the coding unit for which the difference quantization parameter is set, and the transmitting unit may transmit the minimum coding unit size data set by the setting unit.

The transmitting unit may add, as a slice header, the minimum coding unit size data set by the setting unit to syntax of the coded stream generated by the coding unit.

The setting unit may set the difference quantization parameter for the coding unit of which size is smaller than 16 pixels to 0 when a size indicated by the minimum coding unit size data is set to 16 pixels.

The setting unit may set the quantization parameter set for the reference coding unit as the quantization parameter set for the coding unit in the layer lower than the reference coding unit when a value of the difference quantization parameter is set to 0 for the coding unit in the layer lower than the reference coding unit.

The setting unit may set difference identification data for identifying whether the value of the difference quantization parameter is 0 for the coding unit in the layer lower than the reference coding unit, and the image processing apparatus may further include: a transmitting unit which transmits the difference identification data set by the setting unit and the coded stream generated by the coding unit.

Another aspect of the present technology is an image processing method, including: setting a quantization parameter used when image data is quantized for a coding unit in a layer lower than a reference coding unit in a reference layer of the coding unit being a unit of coding process when the image data is coded; generating quantized data by quantizing the image data by using the set quantization parameter; and generating a coded stream by coding the generated quantized data.

In an aspect of the present technology, the coded stream is decoded and the quantized data is generated, the quantization parameter used when the generated quantized data is inversely quantized is set for the coding unit in the layer lower than the reference coding unit in the reference layer of the coding unit being the unit of coding process when the image data is coded, and the generated quantized data is inversely quantized by using the set quantization parameter.

In another aspect of the present technology, the quantization parameter used when the image data is quantized is set for the coding unit in the layer lower than the reference coding unit in the reference layer of the coding unit being the unit of coding process when the image data is coded, the image data is quantized and the quantized data is generated by using the set quantization parameter, and the generated quantized data is coded and the coded stream is generated.

Effects of the Invention

According to the present technology, the quantization process or the inverse quantization process may be performed more appropriately.

BRIEF DESCRIPTION OF DRAWINGS

FIG. 2 is a view illustrating an example of correspondence relationship between a quantization parameter for a luminance signal and a quantization parameter for a chrominance signal.

FIG. 17 is a view illustrating an example of syntax.

FIG. 24 is a view comparing characteristics of methods of calculating a quantization parameter dQP.

FIG. 26 is a view illustrating an example of the syntax of a slice header.

MODE FOR CARRYING OUT THE INVENTION

Modes for carrying out the present technology (hereinafter, referred to as embodiments) are hereinafter described. Note that the description is given in the following order.

1. First Embodiment (Image Coding Apparatus)
2. Second Embodiment (Image Decoding Apparatus)
3. Third Embodiment (Image Coding Apparatus/Image Decoding Apparatus)
4. Fourth Embodiment (Image Coding Apparatus/Image Decoding Apparatus)
5. Fifth Embodiment (Image Coding Apparatus)
6. Sixth Embodiment (Multi-View Image Coding/Multi-View Image Decoding Apparatuses)
7. Seventh Embodiment (Hierarchical Image Coding/Hierarchical Image Decoding Apparatuses)
8. Eighth Embodiment (Application)

<1. First Embodiment>
[Image Coding Apparatus]

Figure 1:
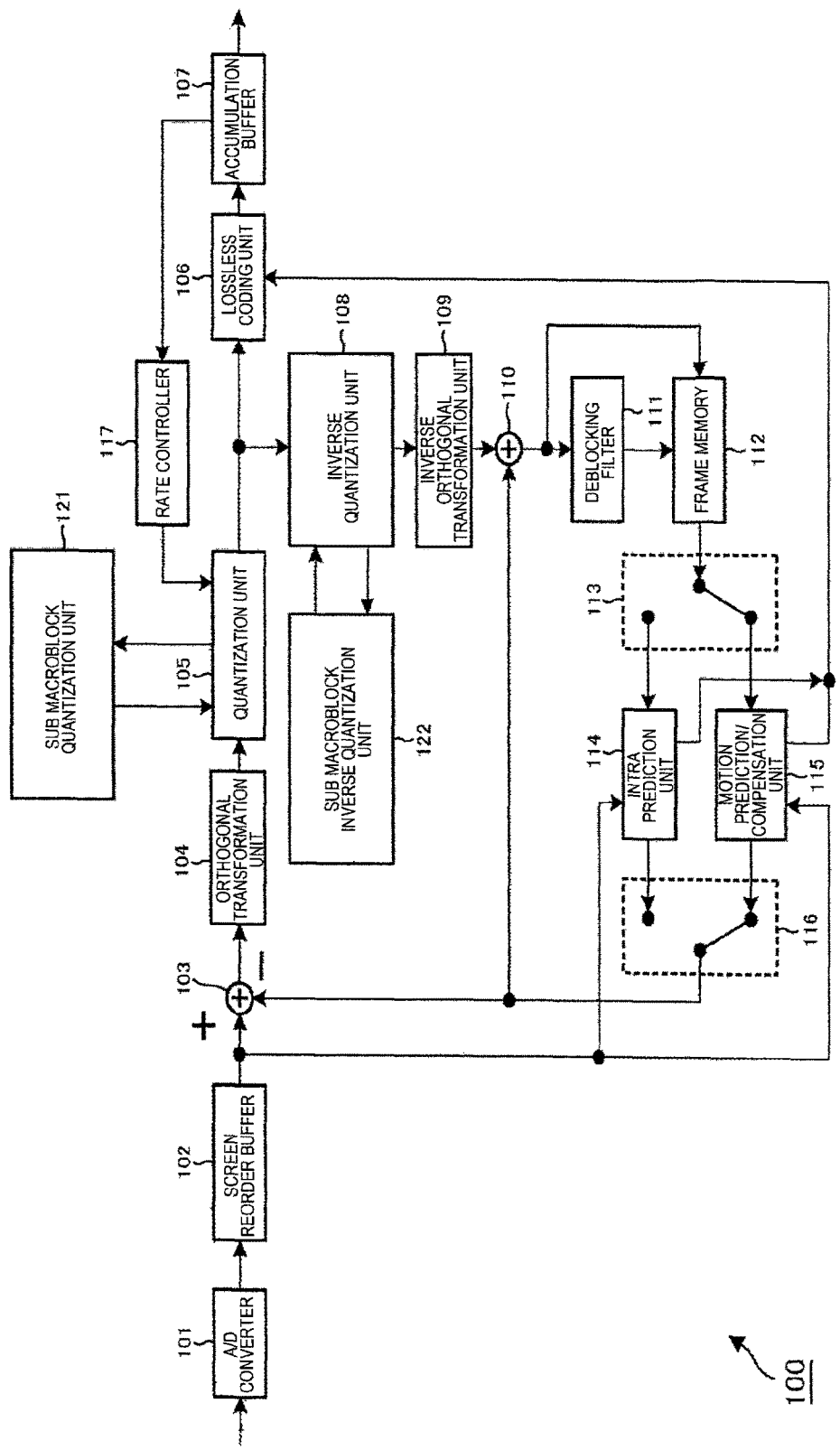
FIG. 1 is a block diagram illustrating a principal configuration example of an image coding apparatus to which the present technology is applied.
Figure 3:
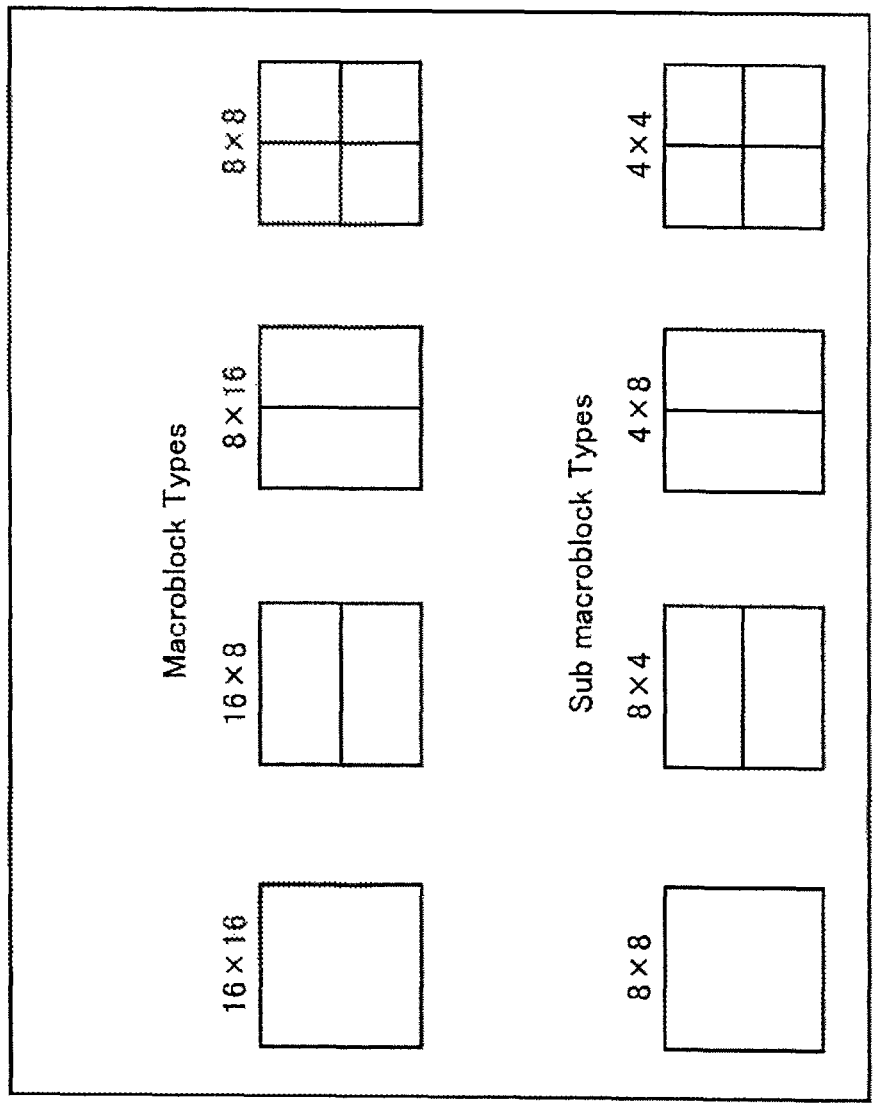
FIG. 3 is a view illustrating an example of a macroblock.

FIG. 1 illustrates a configuration of one embodiment of an image coding apparatus as an image processing apparatus to which the present technology is applied.

An image coding apparatus 100 illustrated in FIG. 1 is a coding apparatus, which codes an image in a manner similar to H.264/MPEG (Moving Picture Experts Group)-4 Part 10 (AVC (Advanced Video Coding)) (hereinafter, referred to as H.264/AVC) system, for example. However, the image coding apparatus 100 specifies a quantization parameter for each sub macroblock.

A macroblock is a partial area of the image, which is a unit of process when the image is coded. The sub macroblock is a small area obtained by dividing the macroblock into a plurality of parts.

In an example in FIG. 1, the image coding apparatus 100 includes an A/D (Analog/Digital) converter 101, a screen reorder buffer 102, an arithmetic unit 103, an orthogonal transformation unit 104, a quantization unit 105, a lossless coding unit 106, and an accumulation buffer 107. The image coding apparatus 100 also includes an inverse quantization unit 108, an inverse orthogonal transformation unit 109, an arithmetic unit 110, a deblocking filter 111, a frame memory 112, a selector 113, an intra prediction unit 114, a motion prediction/compensation unit 115, a selector 116, and a rate controller 117.

The image coding apparatus 100 further includes a sub macroblock quantization unit 121 and a sub macroblock inverse quantization unit 122.

The A/D converter 101 A/D converts input image data and outputs the same to the screen reorder buffer 102 for storage.

The screen reorder buffer 102 reorders the stored image with frames in order of display into order of frames for coding according to a GOP (Group of Picture) structure. The screen reorder buffer 102 supplies the image, in which order of the frames has been reordered, to the arithmetic unit 103. The screen reorder buffer 102 supplies the image, in which order of the frames has been reordered, also to the intra prediction unit 114 and the motion prediction/compensation unit 115.

The arithmetic unit 103 subtracts a predicted image supplied from the intra prediction unit 114 or the motion prediction/compensation unit 115 through the selector 116 from the image read from the screen reorder buffer 102 and outputs difference information to the orthogonal transformation unit 104.

For example, in a case of the image to which intra coding is performed, the arithmetic unit 103 subtracts, from the image read from the screen reorder buffer 102, the predicted image supplied from the intra prediction unit 114. Also, in a case of the image to which inter coding is performed, for example, the arithmetic unit 103 subtracts, from the image read from the screen reorder buffer 102, the predicted image supplied from the motion prediction/compensation unit 115.

The orthogonal transformation unit 104 performs an orthogonal transform such as a discrete cosine transform and a Karhunen-Loeve transform to the difference information supplied from the arithmetic unit 103 and supplies a transform coefficient to the quantization unit 105.

The quantization unit 105 quantizes the transform coefficient output from the orthogonal transformation unit 104. The quantization unit 105 sets the quantization parameter for each sub macroblock, which is an area smaller than the macroblock, in cooperation with the sub macroblock quantization unit 121 based on information supplied from the rate controller 117 and performs quantization. The quantization unit 105 supplies the quantized transform coefficient to the lossless coding unit 106.

The lossless coding unit 106 performs lossless coding such as variable-length coding and arithmetic coding to the quantized transform coefficient.

The lossless coding unit 106 obtains information indicating intra prediction and the like from the intra prediction unit 114 and obtains information indicating an inter prediction mode, motion vector information and the like from the motion prediction/compensation unit 115. Meanwhile, the information indicating the intra prediction (intra prediction) is hereinafter also referred to as intra prediction mode information. Also, information indicating an information mode indicating inter prediction (inter prediction) is hereinafter also referred to as inter prediction mode information.

The lossless coding unit 106 codes the quantized transform coefficient and makes various pieces of information such as a filter coefficient, the intra prediction mode information, the inter prediction mode information, and the quantization parameter a part of header information of coded data (multiplexes). The lossless coding unit 106 supplies the coded data obtained by the coding to the accumulation buffer 107 for accumulation.

For example, the lossless coding unit 106 performs a lossless coding process such as the variable-length coding or the arithmetic coding. The variable-length coding includes CAVLC (Context-Adaptive Variable Length Coding)

defined by the H.264/AVC system and the like. The arithmetic coding includes CABAC (Context-Adaptive Binary Arithmetic Coding) and the like.

The accumulation buffer 107 temporarily holds the coded data supplied from the lossless coding unit 106 and outputs the same as a coded image coded by the H.264/AVC system to subsequent recording apparatus and transmission channel not illustrated, for example, at a predetermined timing.

The transform coefficient quantized by the quantization unit 105 is also supplied to the inverse quantization unit 108. The inverse quantization unit 108 inversely quantizes the quantized transform coefficient by a method corresponding to the quantization by the quantization unit 105. The inverse quantization unit 108 performs inverse quantization by using the quantization parameter for each sub macroblock set by the quantization unit 105 in cooperation with the sub macroblock inverse quantization unit 122. The inverse quantization unit 108 supplies an obtained transform coefficient to the inverse orthogonal transformation unit 109.

The inverse orthogonal transformation unit 109 inversely orthogonally transforms the supplied transform coefficient using a method corresponding to an orthogonal transform process by the orthogonal transformation unit 104. An output obtained by inverse orthogonal transform (restored difference information) is supplied to the arithmetic unit 110.

The arithmetic unit 110 adds the predicted image supplied from the intra prediction unit 114 or the motion prediction/compensation unit 115 through the selector 116 to a result of the inverse orthogonal transform, that is, the restored difference information supplied from the inverse orthogonal transformation unit 109 to obtain a locally decoded image (decoded image).

For example, when the difference information corresponds to the image to which the intra coding is performed, the arithmetic unit 110 adds the predicted image supplied from the intra prediction unit 114 to the difference information. Also, for example, when the difference information corresponds to the image to which the inter coding is performed, the arithmetic unit 110 adds the predicted image supplied from the motion prediction/compensation unit 115 to the difference information.

An addition result is supplied to the deblocking filter 111 or the frame memory 112.

The deblocking filter 111 removes block distortion of the decoded image by appropriately performing a deblocking filter process and improves image quality by appropriately performing a loop filter process by using a Wiener filter, for example. The deblocking filter 111 classifies each pixel and performs an appropriate filter process for each class. The deblocking filter 111 supplies a result of the filter process to the frame memory 112.

The frame memory 112 outputs an accumulated reference image to the intra prediction unit 114 or the motion prediction/compensation unit 115 through the selector 113 at a predetermined timing.

For example, in the case of the image to which the intra coding is performed, the frame memory 112 supplies the reference image to the intra prediction unit 114 through the selector 113. Also, for example, when the inter coding is performed, the frame memory 112 supplies the reference image to the motion prediction/compensation unit 115 through the selector 113.

When the reference image supplied from the frame memory 112 is the image to which the intra coding is performed, the selector 113 supplies the reference image to the intra prediction unit 114. Also, when the reference image supplied from the frame memory 112 is the image to which the inter coding is performed, the selector 113 supplies the reference image to the motion prediction/compensation unit 115.

The intra prediction unit 114 performs the intra prediction (intra prediction) to generate the predicted image by using a pixel value in a screen. The intra prediction unit 114 performs the intra prediction in a plurality of modes (intra prediction modes).

The intra prediction unit 114 generates the predicted image in all of the intra prediction modes and evaluates each predicted image to select an optimal mode. Upon selecting the optimal intra prediction mode, the intra prediction unit 114 supplies the predicted image generated in the optimal mode to the arithmetic unit 103 and the arithmetic unit 110 through the selector 116.

Also, as described above, the intra prediction unit 114 appropriately supplies, to the lossless coding unit 106, the information such as the intra prediction mode information indicating an adopted intra prediction mode.

The motion prediction/compensation unit 115 performs motion prediction by using the input image supplied from the screen reorder buffer 102 and the reference image supplied from the frame memory 112 through the selector 113, performs a motion compensation process according to a detected motion vector and generates the predicted image (inter prediction image information) for the image to which the inter coding is performed.

The motion prediction/compensation unit 115 performs an inter prediction process in all of candidate inter prediction modes to generate the predicted image. The motion prediction/compensation unit 115 supplies the generated predicted image to the arithmetic unit 103 and the arithmetic unit 110 through the selector 116.

Also, the motion prediction/compensation unit 115 supplies the inter prediction mode information indicating an adopted inter prediction mode and motion vector information indicating a calculated motion vector to the lossless coding unit 106.

In the case of the image to which the intra coding is performed, the selector 116 supplies an output of the intra prediction unit 114 to the arithmetic unit 103 and the arithmetic unit 110, and in the case of the image to which the inter coding is performed, the selector 116 supplies an output of the motion prediction/compensation unit 115 to the arithmetic unit 103 and the arithmetic unit 110.

The rate controller 117 controls a rate of quantization operation of the quantization unit 105 such that overflow or underflow does not occur based on a compressed image accumulated in the accumulation buffer 107. The rate controller 117 supplies information indicating complexity of the image to the quantization unit 105 for each sub macroblock, which is the small area obtained by dividing the macroblock into a plurality of parts.

For example, the rate controller 117 provides activity, which is information indicating dispersion of the pixel values, to the quantization unit 105 as the information indicating the complexity of the image. It goes without saying that the information indicating the complexity of the image may be any information.

The sub macroblock quantization unit 121 obtains the information indicating the complexity of the image for each sub macroblock from the quantization unit 105, sets a quantization value (quantization step) for each sub macroblock based on the information, and returns the value to the quantization unit 105.

The sub macroblock inverse quantization unit 122 obtains the quantization parameter from the inverse quantization unit 108, obtains the quantization value for each sub macroblock by using the value of the parameter, and returns the same to the inverse quantization unit 108.

[Quantization of AVC]

Herein, the quantization defined by the AVC (Advanced Video Coding) is described as an example of a conventional quantization process.

Although an integer transform matrix [H] defined by the AVC does not satisfy a requirement of an orthogonal transform matrix represented by a following equation (1), the orthogonal transform process is performed by performing different quantization processes to respective components after integer transform and combining the integer transform and the quantization.

$$[H][H]^T=[I] \qquad (1)$$

In the AVC, it is possible to define a quantization parameter QP, which may have values from "0" to "51", for each macroblock in order to perform the quantization.

For example, suppose that A(QP) and B(QP) have values, which satisfy a following equation (2), regardless of the value of the QP.

$$A(QP)*B(QP)=2^{m+n} \qquad (2)$$

The orthogonal transform and the inverse orthogonal transform in the AVC may be realized by operation represented by following equations (3) and (4).

$$d=c*A(QP)/2^m \qquad (3)$$

$$c'=d*B(QP)/2^n \qquad (4)$$

Meanwhile, c represents an orthogonal transform coefficient before the quantization, d represents the orthogonal transform coefficient after the quantization, and c' represents the orthogonal transform coefficient after the inverse quantization.

By performing such a process, it is possible to realize the quantization and inverse quantization processes not by division but only by shift operation in the AVC.

Meanwhile, values of A and B differ depending on components.

The quantization parameter QP is designed such that the quantization process twice as coarse as the original one is performed when the value thereof increments by 6 such as from 6 to 12, for example.

Especially, deterioration in a chrominance signal is easily noticeable at a lower bit rate, that is, with a higher QP. Therefore, a default quantization parameter $QP_C$ for the chrominance signal is defined with respect to a quantization parameter $QP_Y$ for a luminance signal as indicated in a table in FIG. 2.

A user may control this relationship by setting information about ChromaQPOffset included in image compressed information.

Also, in a profile not lower than a High Profile, it is possible to independently set the quantization parameter for a Cb/Cr component by using ChromaQPOffset and 2ndChromaQPOffset.

[Quantization Parameter Calculation]

In the AVC coding system and coding systems disclosed in Non-Patent Documents 1 and 2, a quantization parameter MB_QP for each macroblock is calculated in the following manner.

That is, $QpBdOffset_Y$ is first calculated from bit_depth_luma_minus8 in a sequence parameter set as represented by a following equation (5).

$$QpBdOffset_Y=6*bit\_depth\_luma\_minus8 \qquad (5)$$

Next, an initial value of the quantization parameter in each picture is specified by pic_init_qp_minus26 in a picture parameter set.

Next, by slice_qp_delta defined in a slice layer, a quantization parameter $SliceQP_Y$ in the slice is calculated as represented by a following equation (6).

$$SliceQPY=26+pic\_init\_qp\_minus26+slice\_qp\_delta \qquad (6)$$

Finally, by using mb_qp_delta in a macroblock layer, the quantization parameter MB_QP for each macroblock is calculated as represented by a following equation (7).

$$MB\_QP=((MB\_QP_{Prev}+mb\_qp\_delta+52+2*QpBdOffset_Y)\%(52+QpBdOffset_Y))-QpBdOffset_Y \qquad (7)$$

Herein, $MB\_QP_{Prev}$ represents the quantization parameter for a previous macroblock.

In the present technology, in addition to this, information about submb_qp_delta is further included in a sub macroblock layer in image compression.

By using this information, the quantization parameter SubMB_QP for each sub macroblock is calculated as represented by a following equation (8).

$$SubMB\_QP=Clip(0,51,MB\_QP+submb\_qp\_delta) \qquad (8)$$

Herein, Clip(min,max,value) represents a function having a return value as represented by a following equation (9).

[Equation 1]

$$Clip(min,max,value)=min, \text{ if}(value<min) \text{ max}, \text{ if}(value>max)value, \text{ otherwise} \qquad (9)$$

That is, the quantization parameter SubMB_QP for each sub macroblock is calculated as represented by a following equation (10). Herein, a minimum quantization parameter defined in advance is minQP and a maximum quantization parameter defined in advance is maxQP.

[Equation 2]

$$SUBMB\_QP=Clip(minQP,maxQP,MB\_QP+submb\_qp\_delta) \qquad (10)$$

Meanwhile, when there is no submb_qp_delta in the image compressed information, a value thereof is set to "0" and the quantization parameter for the macroblock is also applied to the sub macroblock.

[Quantization Unit]

Figure 5:
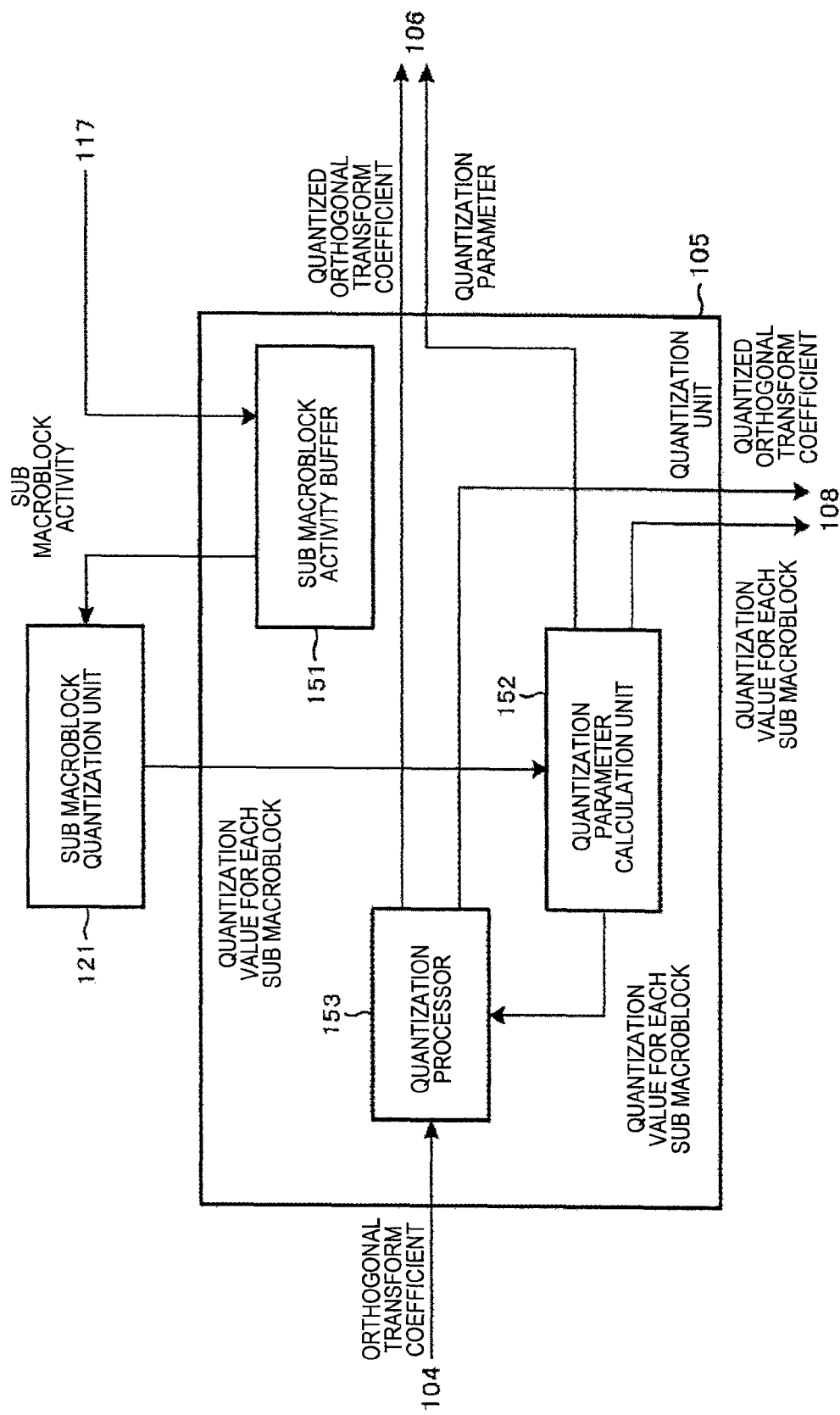
FIG. 5 is a block diagram illustrating a detailed configuration example of a quantization unit.

FIG. 5 is a block diagram illustrating a detailed configuration example of the quantization unit 105 in FIG. 1. As illustrated in FIG. 5, the quantization unit 105 includes a sub macroblock activity buffer 151, a quantization parameter calculation unit 152, and a quantization processor 153.

The sub macroblock activity buffer 151 holds the activity supplied from the rate controller 117. Although adaptive quantization based on the activity as defined in a MPEG-2 Test Model is performed in the AVC coding system, the rate controller 117 calculates the activity (also referred to as sub macroblock activity) for each sub macroblock. A method of calculating the sub macroblock activity is similar to that in a conventional case where the activity is calculated for each macroblock.

The sub macroblock activity buffer 151 holds the sub macroblock activity supplied from the rate controller 117 and supplies the held sub macroblock activity to the sub macroblock quantization unit 121 for each predetermined amount (for example, an amount of one screen).

The sub macroblock quantization unit 121 calculates the quantization value for each sub macroblock by using the sub macroblock activity supplied from the sub macroblock activity buffer 151. The quantization value for each sub macroblock may be calculated by a method similar to that in a case where the quantization value for each macroblock is calculated from the activity for each macroblock.

After obtaining the quantization value for each sub macroblock, the sub macroblock quantization unit 121 supplies the quantization value for each sub macroblock to the quantization parameter calculation unit 152.

The quantization parameter calculation unit 152 calculates various quantization parameters by using the quantization value for each sub macroblock supplied from the sub macroblock quantization unit 121.

For example, the quantization parameter calculation unit 152 calculates the quantization parameters such as pic_init_qp_minus26, slice_qp_delta, and mb_qp_delta. The quantization parameter calculation unit 152 may obtain the quantization value for each macroblock from the quantization value for each sub macroblock. Therefore, the quantization parameter calculation unit 152 calculates the various quantization parameters to set as in a case of the conventional AVC coding system.

The quantization parameter calculation unit 152 further obtains the quantization parameter submb_qp_delta indicating difference between the quantization parameter MB_QP for each macroblock and the quantization parameter SubMB_QP for each sub macroblock. It is required to transmit the quantization parameter for each sub macroblock to a decoding side. It becomes possible to decrease a code amount of the quantization parameter for each sub macroblock by obtaining a difference value in this manner. So to speak, the quantization parameter submb_qp_delta is a transmission format of the quantization parameter SubMB_QP. The quantization parameter SubMB_QP for each sub macroblock may be obtained by transforming the quantization value for each sub macroblock. Similarly, the quantization parameter MB_QP for each macroblock is obtained by transforming the quantization value for each macroblock. The quantization parameter calculation unit 152 calculates submb_qp_delta for each sub macroblock by using the above-described equation (35), for example.

The quantization parameter calculation unit 152 supplies the quantization value for each sub macroblock to the quantization processor 153. Also, the quantization parameter calculation unit 152 supplies calculated various quantization parameters (specifically, pic_init_qp_minus26, slice_qp_delta, mb_qp_delta and the like) to the lossless coding unit 106 and transmits the same together with a coded stream obtained by coding the image. Meanwhile, as described above, when the value of submb_qp_delta is "0", transmission of submb_qp_delta is omitted. That is, in this case, the quantization parameter other than submb_qp_delta is supplied to the lossless coding unit 106.

Further, the quantization parameter calculation unit 152 supplies the quantization value for each sub macroblock also to the inverse quantization unit 108.

The quantization processor 153 quantizes the orthogonal transform coefficient supplied from the orthogonal transformation unit 104 by using the quantization value for each sub macroblock.

The quantization processor 153 supplies a quantized orthogonal transform coefficient to the lossless coding unit 106 and the inverse quantization unit 108.

Meanwhile, the inverse quantization unit 108 inversely quantizes the orthogonal transform coefficient quantized by the above-described quantization unit 105 by using the sub macroblock inverse quantization unit 122. In an image decoding apparatus corresponding to the image coding apparatus 100 also, a process similar to the inverse quantization process is performed, so that the inverse quantization is described in detail when the image decoding apparatus is described.

In the conventional case such as the AVC coding system, only one quantization parameter may be set for one macroblock. Therefore, in a case where a planar area and an area including texture are mixed in one macroblock, it is difficult to set the quantization parameter appropriate for both of the areas.

Especially, the larger the size of the macroblock as an extended macroblock (extended partial area) proposed in Non-Patent Document 2 and the like, the higher the possibility that the images having different characteristics are mixed in the area, so that it becomes more difficult to perform the adaptive quantization corresponding to the characteristics of each area.

On the other hand, the image coding apparatus 100 may calculate an index indicating the complexity of the image for each sub macroblock by the rate controller 117 and calculate the quantization value for each sub macroblock by the sub macroblock quantization unit 121. That is, the quantization processor 153 may perform the quantization process by using the quantization value appropriate for each sub macroblock.

According to this, the image coding apparatus 100 may perform the quantization process more suitable for contents of the image. Especially, also in a case where the size of the macroblock is extended and both of the flat area and the area including the texture are included in a single macroblock, the image coding apparatus 100 may perform an adaptive quantization process suitable for each area to inhibit subjective image quality of the decoded image from deteriorating.

Figure 6:
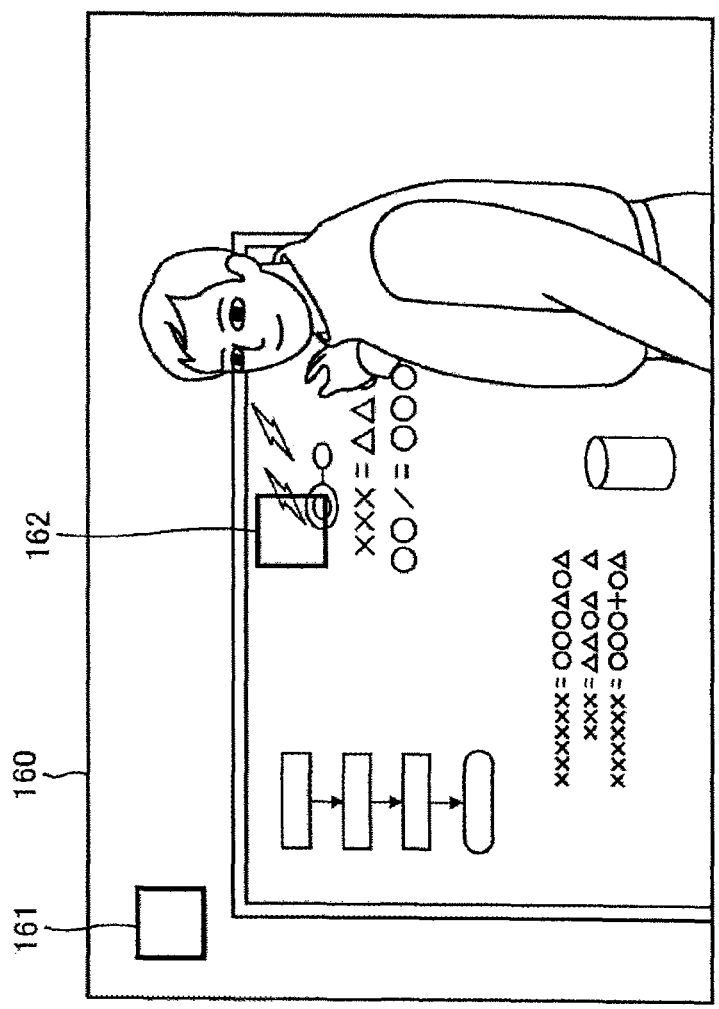
FIG. 6 is a view illustrating an example of an image in a unit of macroblock.

For example, in an image 160 illustrated in FIG. 6, a macroblock 161 includes only the flat area. Therefore, even when the image coding apparatus 100 performs the quantization process by using a single quantization parameter for such macroblock 161, there is no particular problem in image quality.

On the other hand, a macroblock 162 includes both of the flat area and a texture area. In the quantization process by using the single quantization parameter, it is not possible to perform the adaptive quantization appropriate for both of the flat area and the texture area. Therefore, if the image coding apparatus 100 performs the quantization process by using the single quantization parameter for such macroblock 161, the subjective image quality of the decoded image might be deteriorated.

In such a case also, the image coding apparatus 100 may calculate the quantization value for each sub macroblock as described above, so that it is possible to perform a more appropriate quantization process to inhibit the subjective image quality of the decoded image from deteriorating.

Also, when a total code amount for each picture is likely to overflow in the accumulation buffer 107, control by the quantization parameter is performed. Therefore, at that time, by allowing the quantization unit 105 to calculate the quantization value for each sub macroblock and perform the quantization as described above, the image coding apparatus 100 may control measurement against the overflow in a smaller unit.

Further, when the value of submb_qp_delta is "0", transmission of submb_qp_delta is omitted, so that it is possible to inhibit unnecessary reduction in coding efficiency. When the value of submb_qp_delta is "0", the quantization parameter SubMB_QP for each sub macroblock and the quantization parameter MB_QP for each macroblock are equal to each other. Therefore, it is possible to make the quantization parameter MB_QP for each macroblock the quantization parameter SubMB_QP for each sub macroblock on the decoding side, so that the value of submb_qp_delta ("0") is not required. Therefore, it is possible to omit the transmission of submb_qp_delta as described above. It goes without saying that submb_qp_delta having the value of "0" may be transmitted; however, it is possible to improve the coding efficiency by omitting the transmission of submb_qp_delta.

[Flow of Coding Process]

Next, a flow of each process executed by the above-described image coding apparatus 100 is described. First, an example of a flow of a coding process is described with reference to a flowchart in FIG. 7.

At step S101, the A/D converter 101 A/D converts the input image. At step S102, the screen reorder buffer 102 stores the A/D converted image and reorders pictures in order of display into order for coding.

At step S103, the arithmetic unit 103 calculates difference between the image reordered by the process at step S102 and the predicted image. The predicted image is supplied to the arithmetic unit 103 through the selector 116 from the motion prediction/compensation unit 115 in a case of the inter prediction and from the intra prediction unit 114 in a case of the intra prediction, respectively.

A data amount of difference data is smaller than that of original image data. Therefore, it is possible to compress the data amount as compared to a case where the image is directly coded.

At step S104, the orthogonal transformation unit 104 orthogonally transforms the difference information generated by the process at step S103. Specifically, the orthogonal transform such as the discrete cosine transform and the Karhunen-Loeve transform is performed and the transform coefficient is output.

At step S105, the quantization unit 105 and the sub macroblock quantization unit 121 obtain the quantization parameter. A flow of a quantization parameter calculation process is described later in detail.

At step S106, the quantization processor 153 of the quantization unit 105 quantizes the orthogonal transform coefficient obtained by the process at step S104 by using the quantization value for each sub macroblock calculated by the process at step S105.

The difference information quantized by the process at step S106 is locally decoded in a following manner. That is, at step S107, the inverse quantization unit 108 inversely quantizes the quantized orthogonal transform coefficient (also referred to as a quantized coefficient) generated by the process at step S106 by characteristics corresponding to characteristics of the quantization unit 105. At step S108, the inverse orthogonal transformation unit 109 inversely orthogonally transforms the orthogonal transform coefficient obtained by the process at step S107 by characteristics corresponding to characteristics of the orthogonal transformation unit 104.

At step S109, the arithmetic unit 110 adds the predicted image to the locally decoded difference information to generate the locally decoded image (image corresponding to an input to the arithmetic unit 103). At step S110, the deblocking filter 111 filters the image generated by the process at step S109. According to this, the block distortion is removed.

At step S111, the frame memory 112 stores the image from which the block distortion has been removed by the process at step S110. Meanwhile, the image, which is not subjected to the filter process by the deblocking filter 111, also is supplied from the arithmetic unit 110 to the frame memory 112 to be stored.

At step S112, the intra prediction unit 114 performs an intra prediction process in the intra prediction mode. At step S113, the motion prediction/compensation unit 115 performs an inter motion prediction process in which motion prediction and motion compensation in the inter prediction mode are performed.

At step S114, the selector 116 determines an optimal prediction mode based on each cost function value output from the intra prediction unit 114 and the motion prediction/compensation unit 115. That is, the selector 116 selects the predicted image generated by the intra prediction unit 114 or the predicted image generated by the motion prediction/compensation unit 115.

Also, selection information indicating the selected predicted image is supplied to the intra prediction unit 114 or the motion prediction/compensation unit 115 of which predicted image is selected. When the predicted image in the optimal intra prediction mode is selected, the intra prediction unit 114 supplies information indicating the optimal intra prediction mode (that is, the intra prediction mode information) to the lossless coding unit 106.

When the predicted image of an optimal inter prediction mode is selected, the motion prediction/compensation unit 115 outputs information indicating the optimal inter prediction mode and information corresponding to the optimal inter prediction mode as necessary to the lossless coding unit 106. The information corresponding to the optimal inter prediction mode includes the motion vector information, flag information, reference frame information and the like.

At step S115, the lossless coding unit 106 codes the transform coefficient quantized by the process at step S106. That is, the lossless coding such as the variable-length coding and the arithmetic coding is performed to a difference image (secondary difference image in a case of inter).

Meanwhile, the lossless coding unit 106 codes the quantization parameter calculated at step S105 to add to the coded data.

Also, the lossless coding unit 106 codes the information about the prediction mode of the predicted image selected by the process at step S114 to add to the coded data obtained by coding the difference image. That is, the lossless coding unit 106 codes the intra prediction mode information supplied from the intra prediction unit 114 or the information corresponding to the optimal inter prediction mode supplied from the motion prediction/compensation unit 115 and the like to add to the coded data.

At step S116, the accumulation buffer 107 accumulates the coded data output from the lossless coding unit 106. The coded data accumulated in the accumulation buffer 107 is appropriately read to be transmitted to the decoding side through the transmission channel.

At step S117, the rate controller 117 controls the rate of the quantization operation of the quantization unit 105 such that the overflow or the underflow does not occur based on the compressed image accumulated in the accumulation buffer 107 by the process at step S116.

When the process at step S117 is finished, the coding process is finished.

[Flow of Quantization Parameter Calculation Process]

Figure 7:
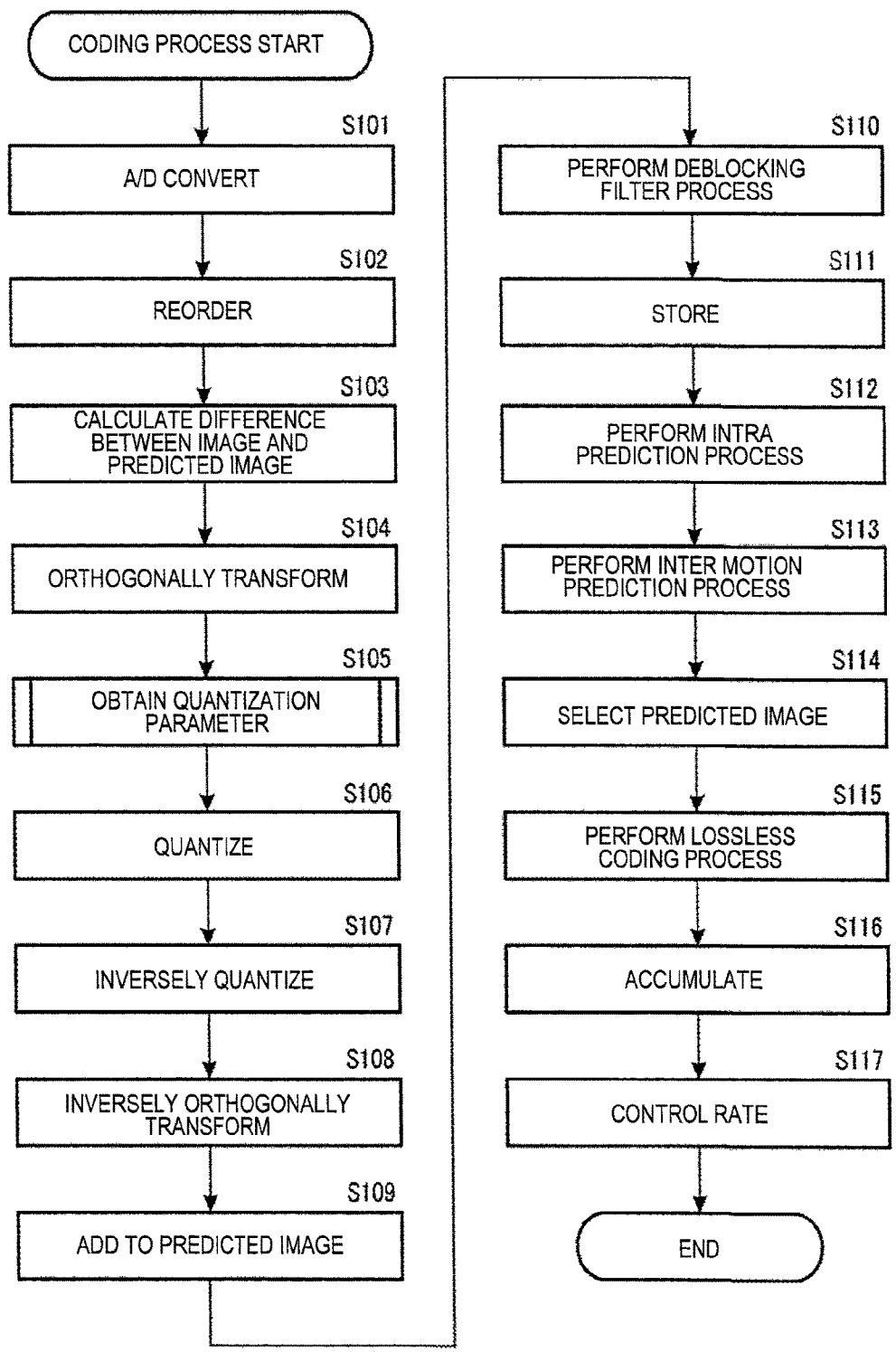
FIG. 7 is a flowchart illustrating an example of a flow of a coding process.

Next, an example of the flow of the quantization parameter calculation process executed at step S105 in FIG. 7 is described with reference to a flowchart in FIG. 8.

When the quantization parameter calculation process is started, at step S131, the sub macroblock activity buffer 151 obtains the sub macroblock activity supplied from the rate controller 117. The sub macroblock activity buffer 151 holds the obtained sub macroblock activity by the amount of one screen, for example.

At step S132, the sub macroblock quantization unit 121 obtains the sub macroblock activity by the amount of one screen, for example, from the sub macroblock activity buffer 151. Then, the sub macroblock quantization unit 121 calculates the quantization value for each sub macroblock by using the obtained sub macroblock activity.

At step S133, the quantization parameter calculation unit 152 obtains the quantization parameter pic_init_qp_minus26 by using the quantization value for each sub macroblock calculated at step S132.

At step S134, the quantization parameter calculation unit 152 obtains the quantization parameter slice_qp_delta by using the quantization value for each sub macroblock calculated at step S132.

At step S135, the quantization parameter calculation unit 152 obtains the quantization parameter mb_qp_delta by using the quantization value for each sub macroblock calculated at step S132.

At step S136, the quantization parameter calculation unit 152 obtains the quantization parameter submb_qp_delta by using the quantization value for each sub macroblock calculated at step S132.

After obtaining the various quantization parameters as described above, the quantization unit 105 finishes the quantization parameter operation process, returns the process to step S105 in FIG. 7, and allows the process at step S106 and subsequent steps to be executed.

Since the coding process and the quantization parameter calculation process are performed in the above-described manner, the image coding apparatus 100 may set the quantization value for each sub macroblock and perform the more appropriate quantization process.

Also, since the quantization parameter calculated in this manner is transmitted to the image coding apparatus, the image coding apparatus 100 may allow the image decoding apparatus to obtain the quantization value for each sub macroblock and perform the inverse quantization by using the same.

<2. Second Embodiment>
[Image Decoding Apparatus]

Figure 9:
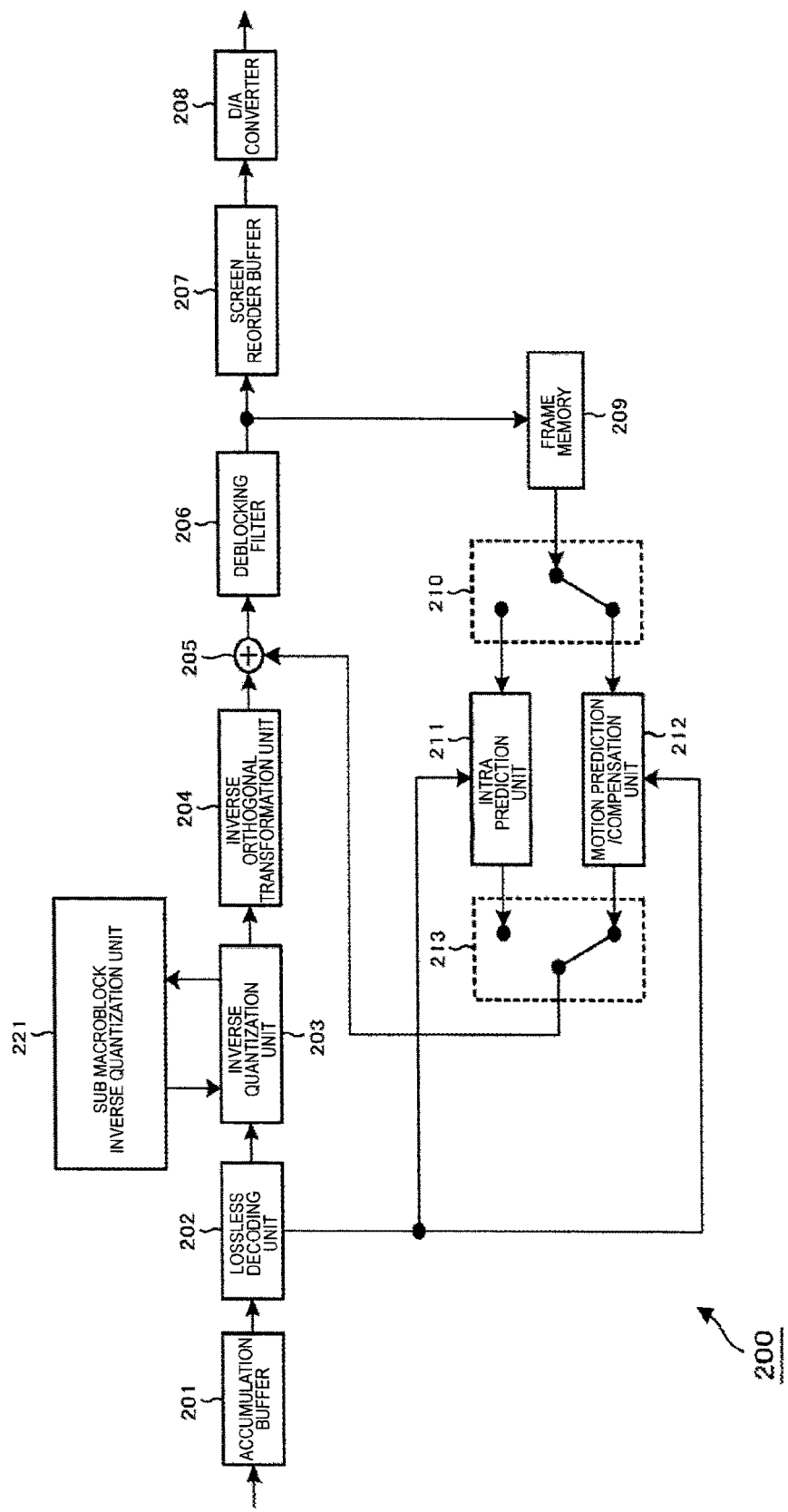
FIG. 9 is a block diagram illustrating a principal configuration example of an image decoding apparatus to which the present technology is applied.

FIG. 9 is a block diagram illustrating a principal configuration example of an image decoding apparatus to which the present technology is applied. An image decoding apparatus 200 illustrated in FIG. 9 is a decoding apparatus corresponding to an image coding apparatus 100.

Coded data coded by the image coding apparatus 100 is transmitted to the image decoding apparatus 200 corresponding to the image coding apparatus 100 through a predetermined transmission channel to be decoded.

As illustrated in FIG. 9, the image decoding apparatus 200 includes an accumulation buffer 201, a lossless decoding unit 202, an inverse quantization unit 203, an inverse orthogonal transformation unit 204, an arithmetic unit 205, a deblocking filter 206, a screen reorder buffer 207, and a D/A converter 208. The image decoding apparatus 200 also includes a frame memory 209, a selector 210, an intra prediction unit 211, a motion prediction/compensation unit 212, and a selector 213.

Further, the image decoding apparatus 200 includes a sub macroblock inverse quantization unit 221.

The accumulation buffer 201 accumulates the transmitted coded data. The coded data is coded by the image coding apparatus 100. The lossless decoding unit 202 decodes the coded data read from the accumulation buffer 201 at a predetermined timing by a system corresponding to a coding system of a lossless coding unit 106 in FIG. 1.

The inverse quantization unit 203 operates in cooperation with the sub macroblock inverse quantization unit 221 to inversely quantize coefficient data obtained by decoding by the lossless decoding unit 202 (quantized coefficient) by a system corresponding to a quantization system of a quantization unit 105 in FIG. 1. That is, the inverse quantization unit 203 inversely quantizes the quantized coefficient by a method similar to that of an inverse quantization unit 108 in FIG. 1 by using a quantization parameter calculated for each sub macroblock supplied from the image coding apparatus 100.

The inverse quantization unit 203 supplies the inversely quantized coefficient data, that is, an orthogonal transform coefficient to the inverse orthogonal transformation unit 204. The inverse orthogonal transformation unit 204 inversely orthogonally transforms the orthogonal transform coefficient by a system corresponding to an orthogonal transform system of an orthogonal transformation unit 104 in FIG. 1 to obtain decoded residual data corresponding to residual data before orthogonal transform by the image coding apparatus 100.

The decoded residual data obtained by inverse orthogonal transform is supplied to the arithmetic unit 205. A predicted image is supplied from the intra prediction unit 211 or the motion prediction/compensation unit 212 through the selector 213 to the arithmetic unit 205.

The arithmetic unit 205 adds the decoded residual data to the predicted image to obtain decoded image data corresponding to image data before subtraction of the predicted image by an arithmetic unit 103 of the image coding apparatus 100. The arithmetic unit 205 supplies the decoded image data to the deblocking filter 206.

The deblocking filter 206 removes block distortion from the supplied decoded image and thereafter supplies the same to the screen reorder buffer 207.

The screen reorder buffer 207 reorders an image. That is, frames reordered into order for coding by a screen reorder buffer 102 in FIG. 1 are reordered into original order of display. The D/A converter 208 D/A converts the image supplied from the screen reorder buffer 207 and outputs the same to a display (not illustrated) for display.

An output of the deblocking filter 206 is further supplied to the frame memory 209.

The frame memory 209, the selector 210, the intra prediction unit 211, the motion prediction/compensation unit 212, and the selector 213 correspond to a frame memory 112, a selector 113, an intra prediction unit 114, a motion prediction/compensation unit 115, and a selector 116 of the image coding apparatus 100, respectively.

The selector 210 reads an image to which an inter process is performed and a reference image from the frame memory 209 to supply the images to the motion prediction/compensation unit 212. Also, the selector 210 reads an image used for intra prediction from the frame memory 209 to supply the image to the intra prediction unit 211.

Information indicating an intra prediction mode and the like obtained by decoding header information is appropriately supplied from the lossless decoding unit 202 to the intra prediction unit 211. The intra prediction unit 211 generates the predicted image from the reference image obtained from the frame memory 209 based on this information and supplies the generated predicted image to the selector 213.

The motion prediction/compensation unit 212 obtains the information obtained by decoding the header information (prediction mode information, motion vector information, reference frame information, a flag, various parameters and the like) from the lossless decoding unit 202.

The motion prediction/compensation unit 212 generates the predicted image from the reference image obtained from the frame memory 209 based on the information supplied from the lossless decoding unit 202 and supplies the generated predicted image to the selector 213.

The selector 213 selects the predicted image generated by the motion prediction/compensation unit 212 or the intra prediction unit 211 and supplies the same to the arithmetic unit 205.

The sub macroblock inverse quantization unit 221 obtains the quantization parameter from the inverse quantization unit 203 and obtains a quantization value for each sub macroblock by using an equation (10) and returns the same to the inverse quantization unit 203.

[Inverse Quantization Unit]

Figure 10:
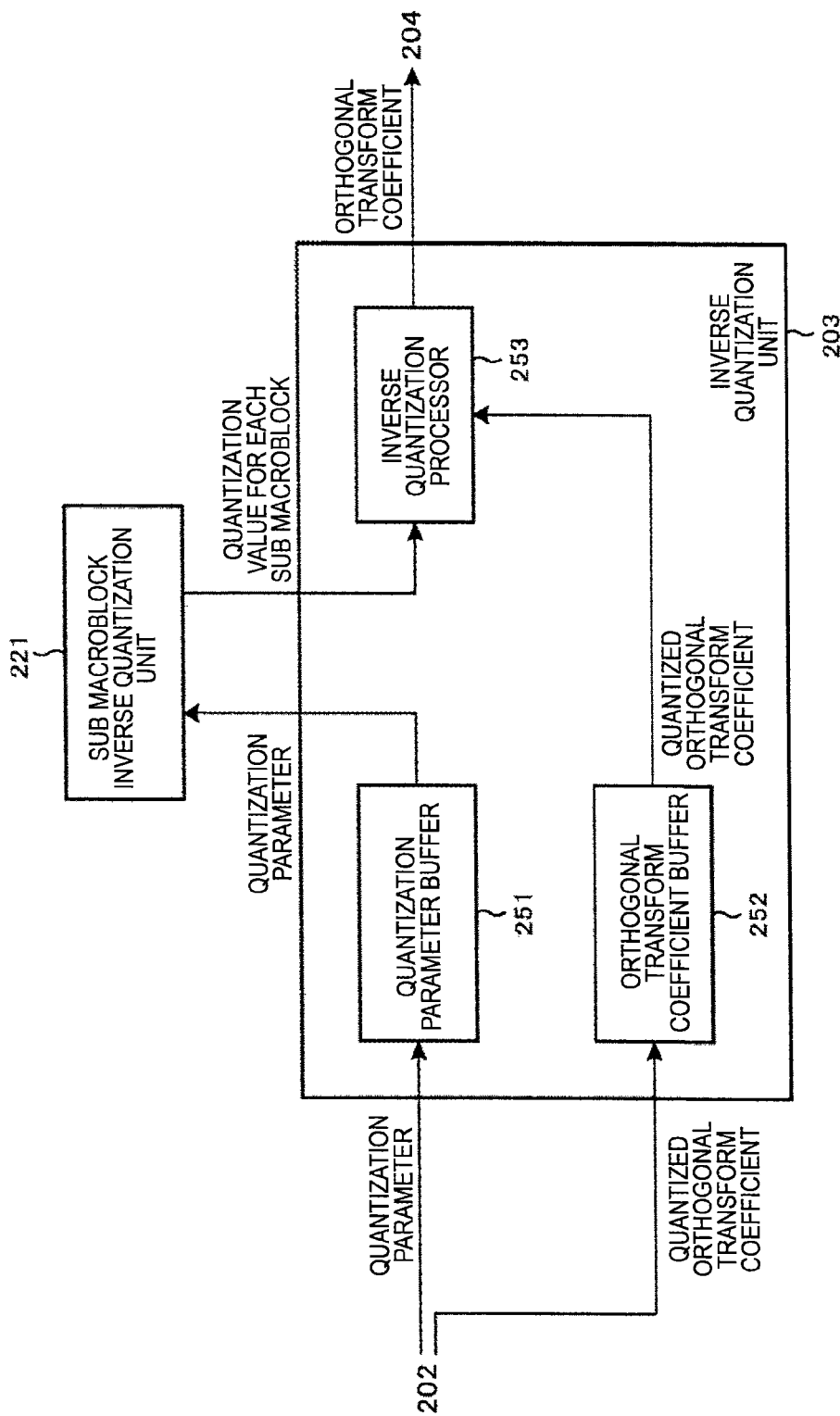
FIG. 10 is a block diagram illustrating a detailed configuration example of an inverse quantization unit.

FIG. 10 is a block diagram illustrating a detailed configuration example of the inverse quantization unit 203.

As illustrated in FIG. 10, the inverse quantization unit 203 includes a quantization parameter buffer 251, an orthogonal transform coefficient buffer 252, and an inverse quantization processor 253.

The parameter about quantization in each layer such as a picture parameter set and a slice header of the coded data supplied from the image coding apparatus 100 is decoded by the lossless decoding unit 202 to be supplied to the quantization parameter buffer 251. The quantization parameter buffer 251 appropriately holds the quantization parameter, and supplies the quantization parameter to the sub macroblock inverse quantization unit 221 at a predetermined timing.

The sub macroblock inverse quantization unit 221 calculates a quantization parameter SubMB_QP for each sub macroblock as represented by equations (5) to (10), for example, by using the quantization parameter supplied from the quantization parameter buffer 251 and transforms the same to the quantization value for each sub macroblock to supply the quantization value to the inverse quantization processor 253.

Meanwhile, as described above in the first embodiment, when a value of submb_qp_delta is "0", submb_qp_delta is not transmitted. The sub macroblock inverse quantization unit 221 applies a value of a quantization parameter MB_QP for each macroblock to the quantization parameter SubMB_QP for each sub macroblock when there is no submb_qp_delta in the quantization parameter supplied from the quantization parameter buffer 251.

Also, the quantized orthogonal transform coefficient obtained by decoding the coded data supplied from the image coding apparatus 100 by the lossless decoding unit 202 is supplied to the orthogonal transform coefficient buffer 252. The orthogonal transform coefficient buffer 252 appropriately holds the quantized orthogonal transform coefficient and supplies the same to the inverse quantization processor 253 at a predetermined timing.

The inverse quantization processor 253 inversely quantizes the quantized orthogonal transform coefficient supplied from the orthogonal transform coefficient buffer 252 by using the quantization value for each sub macroblock supplied from the sub macroblock inverse quantization unit 221. The inverse quantization processor 253 supplies the orthogonal transform coefficient obtained by inverse quantization to the inverse orthogonal transformation unit 204.

As described above, the inverse quantization unit 203 may perform an inverse quantization process by using the quantization value calculated for each sub macroblock. According to this, the image decoding apparatus 200 may perform the inverse quantization process more suitable for contents of the image. Especially, even in a case where the macroblock size is extended and both of a flat area and an area including texture are included in a single macroblock, the image decoding apparatus 200 may perform an adaptive inverse quantization process suitable for each area to inhibit subjective image quality of the decoded image from deteriorating.

Meanwhile, the inverse quantization unit 108 of the image coding apparatus 100 illustrated in FIG. 1 also has a configuration similar to that of the inverse quantization unit 203 and performs a similar process. However, the inverse quantization unit 108 obtains the quantization parameter supplied from the quantization unit 105 and the quantized orthogonal transform coefficient and performs the inverse quantization.

Also, the inverse quantization unit 108 provides the quantization parameter to a sub macroblock inverse quantization unit 122, which performs a process similar to that of the sub macroblock inverse quantization unit 221, and allows the sub macroblock inverse quantization unit 122 to generate the quantization value for each sub macroblock.

[Flow of Decoding Process]

Figure 11:
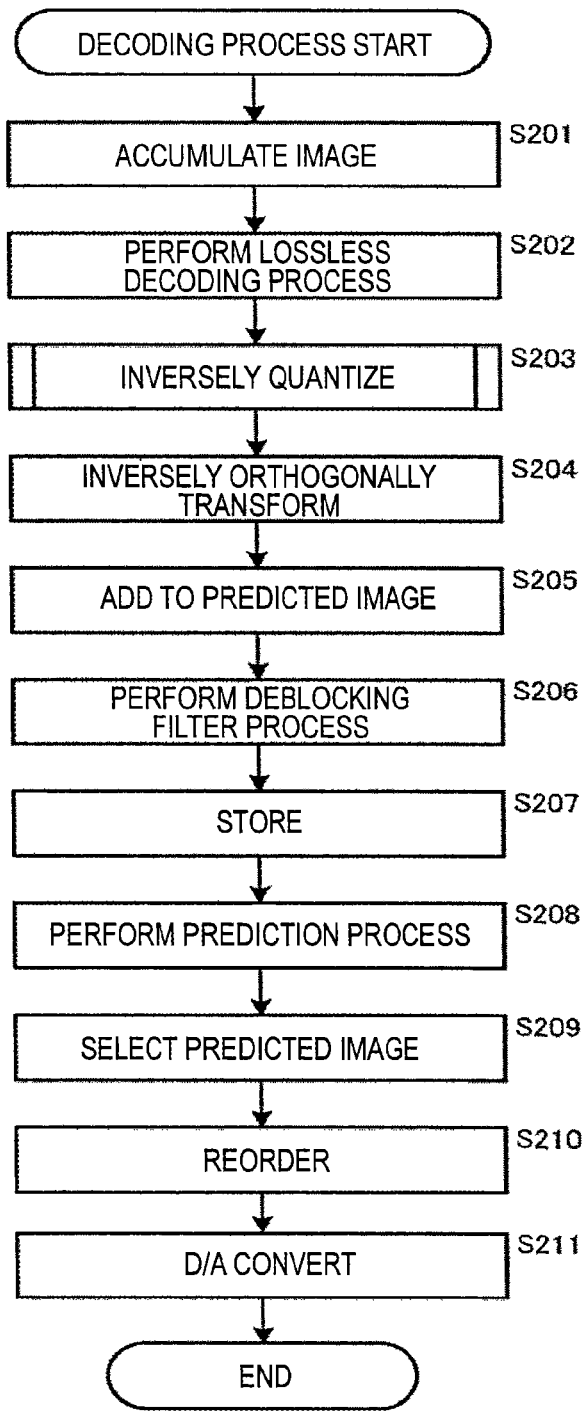
FIG. 11 is a flowchart illustrating an example of a flow of a decoding process.

Next, a flow of each process executed by the above-described image decoding apparatus 200 is described. First, an example of a flow of a decoding process is described with reference to a flowchart in FIG. 11.

When the decoding process is started, the accumulation buffer 201 accumulates the transmitted coded data at step S201. At step S202, the lossless decoding unit 202 decodes the coded data supplied from the accumulation buffer 201. That is, an I picture, a P picture, and a B picture coded by the lossless coding unit 106 in FIG. 1 are decoded.

At that time, the motion vector information, the reference frame information, the prediction mode information (intra prediction mode or inter prediction mode), and the information such as the flag and the quantization parameter are also decoded.

When the prediction mode information is the intra prediction mode information, the prediction mode information is supplied to the intra prediction unit 211. When the prediction mode information is the inter prediction mode information, the motion vector information corresponding to the prediction mode information is supplied to the motion prediction/compensation unit 212.

At step S203, the inverse quantization unit 203 inversely quantizes the quantized orthogonal transform coefficient obtained by decoding by the lossless decoding unit 202. At step S204, the inverse orthogonal transformation unit 204 inversely orthogonally transforms the orthogonal transform coefficient obtained by the inverse quantization by the inverse quantization unit 203 by a method corresponding to the orthogonal transformation unit 104 in FIG. 1. According to this, difference information corresponding to an input of the orthogonal transformation unit 104 in FIG. 1 (output of the arithmetic unit 103) is decoded.

At step S205, the arithmetic unit 205 adds the predicted image to the difference information obtained by the process at step S204. According to this, original image data is decoded.

At step S206, the deblocking filter 206 appropriately filters the decoded image obtained by the process at step S205. According to this, block distortion is appropriately removed from the decoded image.

At step S207, the frame memory 209 stores the filtered decoded image.

At step S208, the intra prediction unit 211 or the motion prediction/compensation unit 212 performs a prediction process of the image according to the prediction mode information supplied from the lossless decoding unit 202.

That is, in a case where the intra prediction mode information is supplied from the lossless decoding unit 202, the intra prediction unit 211 performs an intra prediction process in the intra prediction mode. Also, in a case where the inter prediction mode information is supplied from the lossless decoding unit 202, the motion prediction/compensation unit 212 performs a motion prediction process in the inter prediction mode.

At step S209, the selector 213 selects the predicted image. That is, the predicted image generated by the intra prediction unit 211 or the predicted image generated by the motion prediction/compensation unit 212 is supplied to the selector 213. The selector 213 selects the unit of which predicted image is supplied and supplies the predicted image to the arithmetic unit 205. The predicted image is added to the difference information by the process at step S205.

At step S210, the screen reorder buffer 207 reorders the frames of the decoded image data. That is, the frames of the decoded image data reordered for the coding by the screen reorder buffer 102 of the image coding apparatus 100 (FIG. 1) are reordered into the original order of display.

At step S211, the D/A converter 208 D/A converts the decoded image data of which frames are reordered by the screen reorder buffer 207. The decoded image data is output to a display not illustrated and the image is displayed.

[Inverse Quantization Process]

Next, an example of a flow of the inverse quantization process is described with reference to a flowchart in FIG. 12.

When the inverse quantization process is started, the quantization parameter buffer 251 obtains a quantization parameter pic_init_qp_minus26 supplied from the lossless decoding unit 202 at step S231.

At step S232, the quantization parameter buffer 251 obtains a quantization parameter slice_qp_delta supplied from the lossless decoding unit 202.

At step S233, the quantization parameter buffer 251 obtains the quantization parameter mb_qp_delta supplied from the lossless decoding unit 202.

At step S234, the quantization parameter buffer 251 obtains a quantization parameter submb_qp_delta supplied from the lossless decoding unit 202. However, when there is no submb_qp_delta, the process at step S234 is omitted.

At step S235, the sub macroblock inverse quantization unit 221 calculates the quantization value for each sub macroblock by using various quantization parameters obtained by the processes at steps S231 to S234. However, when submb_qp_delta is not supplied from the image coding apparatus 100 and the process at step S234 is omitted, the sub macroblock inverse quantization unit 221 applies the quantization value for each macroblock to the quantization value for each sub macroblock.

At step S236, the inverse quantization processor 253 inversely quantizes the quantized orthogonal transform coefficient held by the orthogonal transform coefficient buffer 252 by using the quantization value for each sub macroblock calculated by the process at step S235.

When the process at step S236 is finished, the inverse quantization unit 203 returns the process to step S203 and allows the processes at step S204 and subsequent steps to be executed.

By performing the decoding process and the inverse quantization process as described above, the image decoding apparatus 200 may perform the inverse quantization process by using the quantization value calculated for each sub macroblock and perform the inverse quantization process more suitable for the contents of the image.

<3. Third Embodiment>

[submb_qp_present_flag]

Although it has been described above that submb_qp_delta is appropriately transmitted as the quantization parameter, it is also possible to further transmit a flag, which acknowledges presence of submb_qp_delta for each macroblock.

In this case, a configuration of an image coding apparatus 100 is similar to a configuration example illustrated in FIG. 1. Also, a configuration of a quantization unit 105 is similar to a configuration example illustrated in FIG. 5. However, a quantization parameter calculation unit 152 further calculates submb_qp_present_flag, which is flag information indicating whether submb_qp_delta of which value is not "0" is present, for each macroblock. When any submb_qp_delta of sub macroblocks belonging to the macroblock has the value not "0", submb_qp_present_flag is set to "1", for example. Also, when submb_qp_delta of all the sub macroblocks belonging to the macroblock are "0", submb_qp_present_flag is set to "0", for example.

It goes without saying that a value of submb_qp_present_flag is arbitrary and any value may be used as long as it is possible to identify a case where any submb_qp_delta has the value not "0" from a case where submb_qp_delta of all the sub macroblocks are "0".

When the quantization parameter calculation unit 152 sets the value in this manner, the quantization parameter calculation unit 152 supplies submb_qp_present_flag to the lossless coding unit 106 as one of the quantization parameters. The lossless coding unit 106 adds this submb_qp_present_flag to a macroblock header, for example, and codes the same. That is, submb_qp_present_flag is transmitted together with coded data as well as another quantization parameter.

Figure 13:
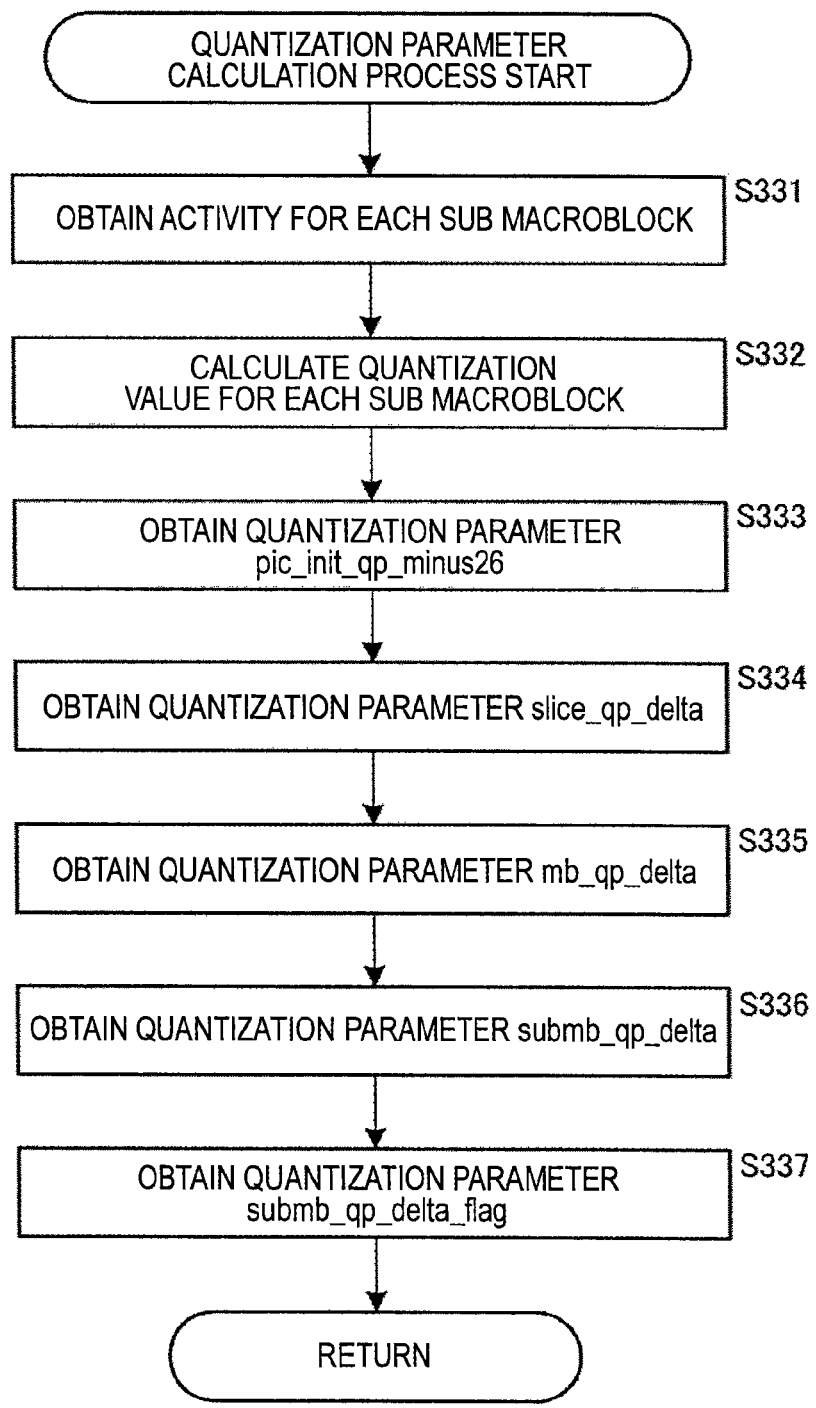
FIG. 13 is a flowchart illustrating another example of the flow of the quantization parameter calculation process.

Therefore, a coding process in this case is performed as in the case described above with reference to the flowchart in FIG. 7. Also, an example of a flow of a quantization parameter calculation process in this case is described with reference to a flowchart in FIG. 13. In this case also, the quantization parameter calculation process is performed in a manner basically similar to that in the case illustrated with reference to the flowchart in FIG. 8.

Figure 8:
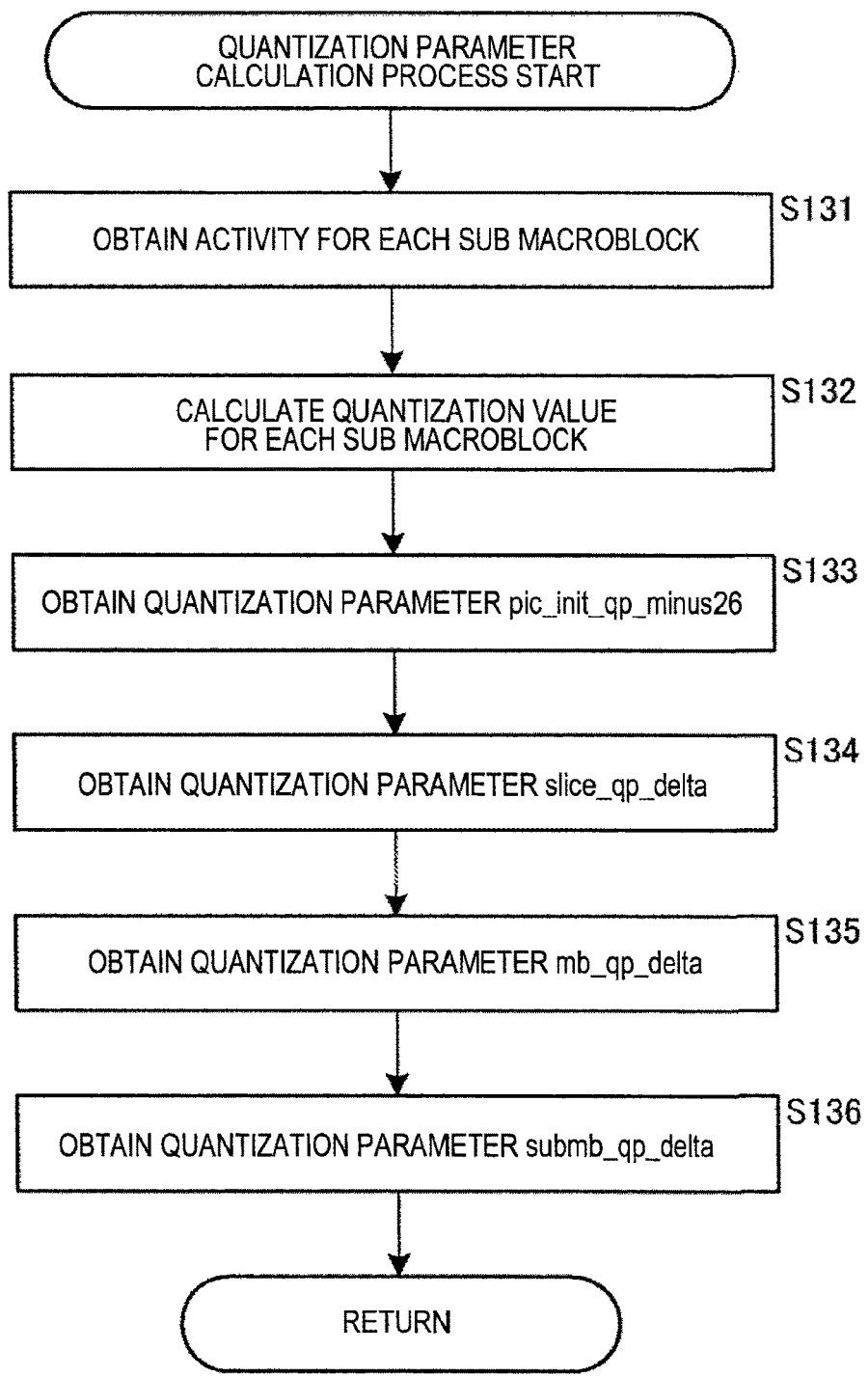
FIG. 8 is a flowchart illustrating an example of a flow of a quantization parameter calculation process.

That is, processes at steps S331 to S336 are performed as the processes at steps S131 to S136 in FIG. 8. However, in this case, the quantization parameter calculation unit 152 further calculates the quantization parameter submb_qp_present_flag at step S337.

As described above, the quantization parameter submb_qp_present_flag is calculated to be transmitted.

That is, submb_qp_present_flag is present in each macroblock header of the data. Then, submb_qp_delta is present in a sub macroblock header of the macroblock in which the value of submb_qp_present_flag is "1" and submb_qp_delta is not present in the sub macroblock header of the macroblock in which the value of submb_qp_present_flag is "0".

Such coded data is transmitted from the image coding apparatus 100 to an image decoding apparatus 200.

A configuration of the image decoding apparatus 200 in this case is similar to a configuration example illustrated in FIG. 9. Also, a configuration of an inverse quantization unit 203 is similar to a configuration example illustrated in FIG.

10. However, a sub macroblock inverse quantization unit 221 calculates a quantization value for each macroblock for the macroblock in which submb_qp_present_flag is set to "0" without waiting for supply of submb_qp_delta and applies the quantization value to the quantization value for each sub macroblock.

In other words, the sub macroblock inverse quantization unit 221 obtains submb_qp_delta only when submb_qp_present_flag is "1" and calculates the quantization value for each sub macroblock.

Figure 14:
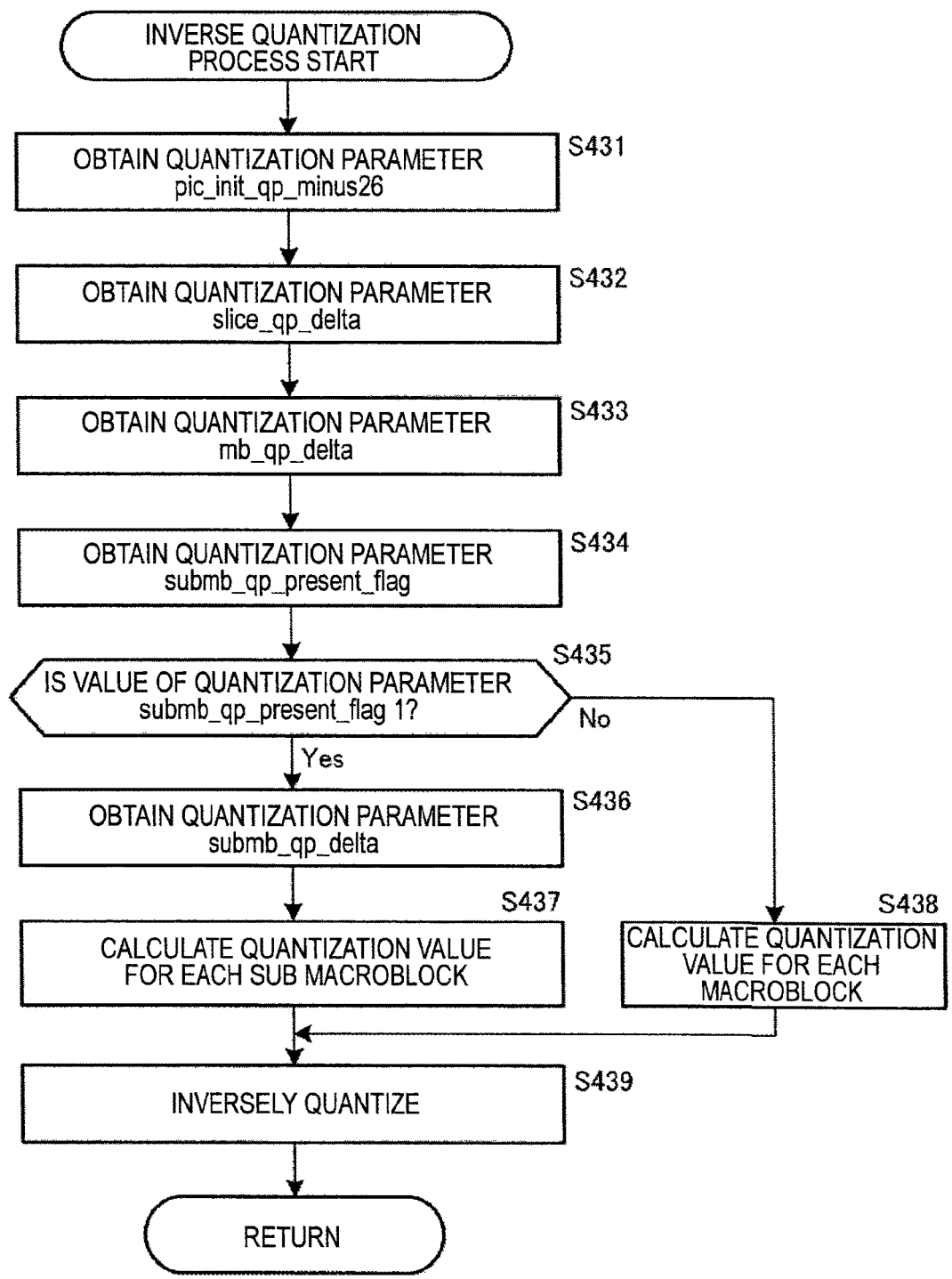
FIG. 14 is a flowchart illustrating another example of the flow of the inverse quantization process.

A decoding process in this case is performed in a manner similar to that described above with reference to the flowchart in FIG. 11. Also, an example of a flow of an inverse quantization process in this case is described with reference to a flowchart in FIG. 14. In this case also, the inverse quantization process is performed in a manner basically similar to that in the case described with reference to the flowchart in FIG. 12.

Figure 12:
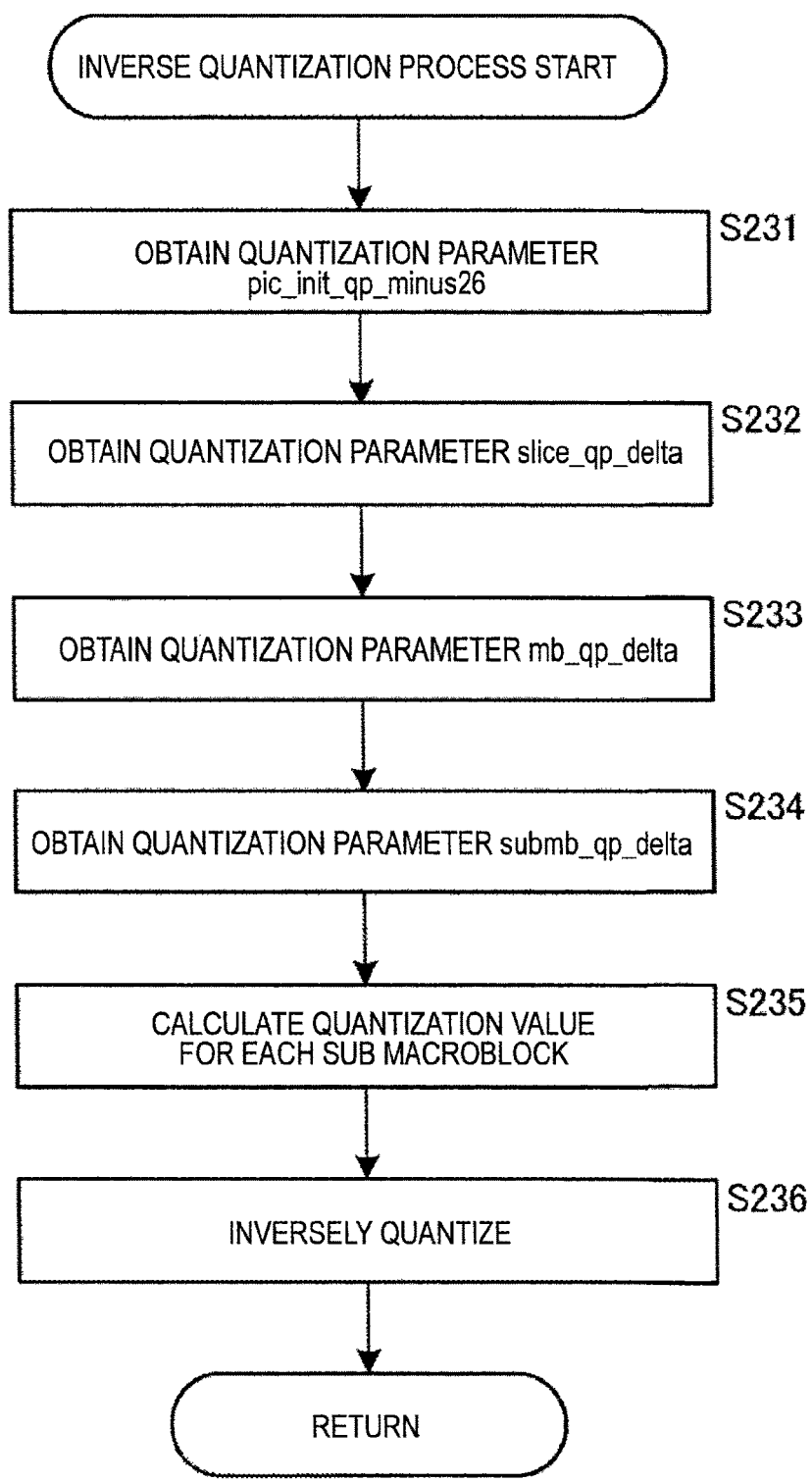
FIG. 12 is a flowchart illustrating an example of a flow of an inverse quantization process.

That is, processes at steps S431 to S433 are performed as the processes at steps S231 to S233 in FIG. 12. However, in this case, the quantization parameter buffer 251 obtains the quantization parameter submb_qp_present_flag stored in the macroblock header at step S434.

At step S435, the sub macroblock inverse quantization unit 221 determines whether the value of the quantization parameter submb_qp_present_flag is "1". When the value of the quantization parameter submb_qp_present_flag is "1", the quantization parameter buffer 251 obtains the quantization parameter submb_qp_delta at step S436. At step S437, the sub macroblock inverse quantization unit 221 calculates the quantization value for each sub macroblock. That is, processes similar to those at steps S234 and S235 in FIG. 12 are performed.

Also, when it is determined that the value of the quantization parameter submb_qp_present_flag is "0" at step S435, the sub macroblock inverse quantization unit 221 calculates the quantization value for each macroblock at step S438 and applies the same as the quantization value for each sub macroblock.

When the quantization value is calculated as in the above-described manner, the inverse quantization processor 253 performs inverse quantization by using the quantization value at step S439.

As described above, the image decoding apparatus 200 may more easily grasp the presence of the quantization parameter submb_qp_delta and may more easily calculate the quantization value without need for an unnecessary process of searching submb_qp_delta, which is not present, by transmitting submb_qp_present_flag indicating the presence of the quantization parameter submb_qp_delta for each macroblock to use at the time of the inverse quantization.

Figure 4:
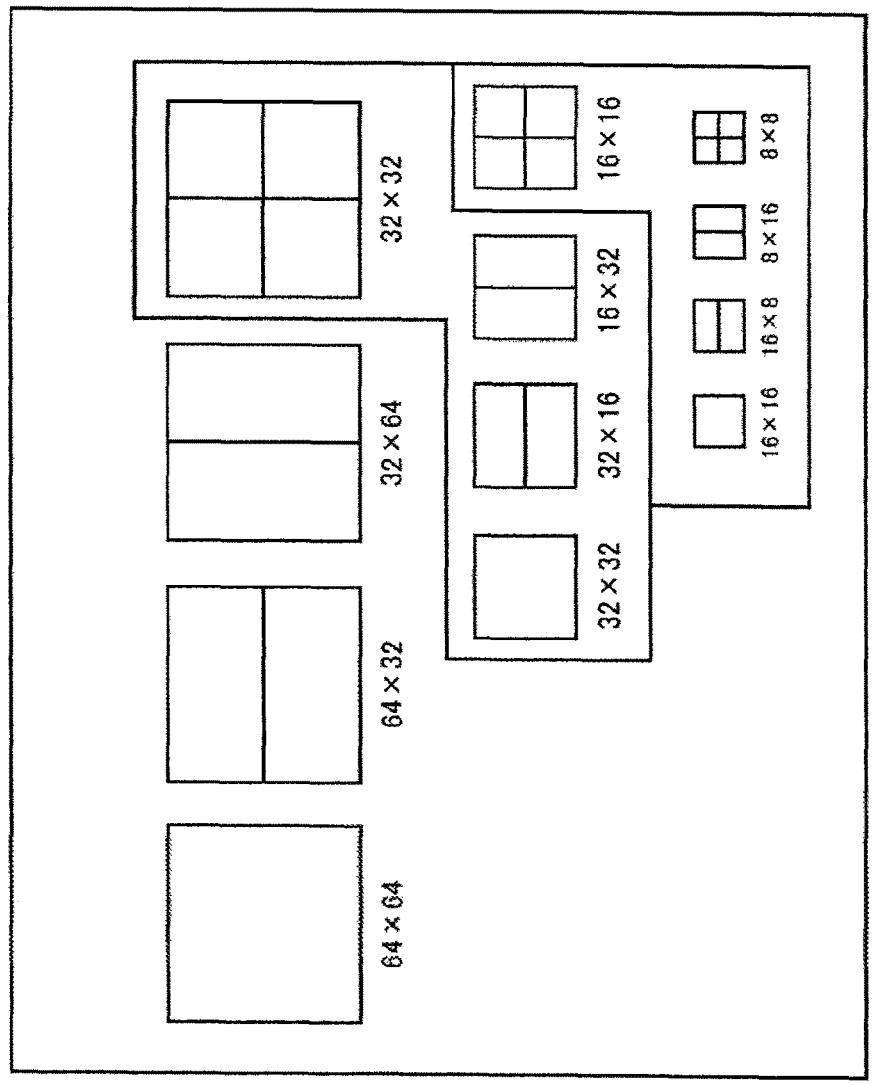
FIG. 4 is a view illustrating another example of the macroblock.

Although the image coding apparatus, which codes by the system equivalent to the AVC, and the image decoding apparatus, which decodes by the system equivalent to the AVC, are described above as an example in the first to third embodiments, the scope of application of the present technology is not limited thereto and the present technology may be applied to every image coding apparatus and image decoding apparatus, which perform the coding process based on a block having a hierarchical structure as illustrated in FIG. 4.

Also, the above-described various quantization parameters may be added to an arbitrary position of the coded data or may be transmitted to a decoding side separately from the coded data, for example. For example, the lossless coding unit 106 may describe the information in a bit stream as syntax. Also, the lossless coding unit 106 may store the information in a predetermined area as auxiliary information to transmit. For example, the information may be stored in a parameter set (for example, header and the like of sequence and picture) such as SEI (Supplemental Enhancement Information).

It is also possible for the lossless coding unit 106 to transmit the information from the image coding apparatus to the image decoding apparatus separately from the coded data (as another file). In this case, it is necessary to clarify correspondence relationship between the information and the coded data (such that the decoding side may grasp the relationship) but any method may be used therefor. For example, it is possible to separately create table information indicating the correspondence relationship or to embed link information indicating corresponding data in each data.

Meanwhile, it is also possible that the above-described quantization using the quantization value for each sub macroblock (calculation of the quantization parameter for each sub macroblock) is performed only for an extended macroblock not smaller than 32×32.

For example, a rate controller 117 calculates activity for each sub macroblock only when the current macroblock is the extended macroblock and calculates the activity for each macroblock when the current macroblock is a conventional macroblock not larger than 16×16 defined in an existing coding standard such as the AVC.

The sub macroblock quantization unit 121 calculates the quantization value for each sub macroblock only for the extended macroblock and calculates the quantization value for each macroblock for the conventional macroblock not larger than 16×16, for example.

The quantization parameter calculation unit 152 calculates the quantization parameter Submb_qp_delta only for the extended macroblock and does not calculate the quantization parameter submb_qp_delta for the conventional macroblock not larger than 16×16, for example.

The quantization processor 153 performs the quantization by using the quantization value for each sub macroblock only for the extended macroblock and performs the quantization by using the quantization value for each macroblock for the conventional macroblock not larger than 16×16, for example.

In the above-described manner, the image coding apparatus 100 may perform the quantization by using the quantization value for each sub macroblock only for the extended macroblock having a large area in which an effect of inhibiting deterioration in subjective image quality of a decoded image may be sufficiently expected and perform the quantization by using the quantization value for each macroblock for the macroblock having a conventional size in which the expectation for the effect is relatively small. According to this, the image coding apparatus 100 may inhibit increase in load caused by the quantization using the quantization value for each sub macroblock.

In this case, it is of course possible for the image decoding apparatus 200 to perform the inverse quantization by using the quantization value for each sub macroblock only for the extended macroblock as the image coding apparatus 100.

For example, the sub macroblock inverse quantization unit 221 calculates the quantization value for each sub macroblock only for the extended macroblock and calculates the quantization value for each macroblock for the conventional macroblock not larger than 16×16.

Therefore, the inverse quantization processor 253 performs the inverse quantization by using the quantization value for each sub macroblock only for the extended macroblock and performs the inverse quantization by using the quantization value for each macroblock for the conventional macroblock not larger than 16×16, for example.

In the above-described manner, the image decoding apparatus 200 may perform the inverse quantization by using the quantization value for each sub macroblock only for the extended macroblock having the large area in which the effect of inhibiting the deterioration in the subjective image quality of the decoded image may be sufficiently expected and perform the inverse quantization by using the quantization value for each macroblock for the macroblock having the conventional size in which the expectation for the effect is relatively small. According to this, the image decoding apparatus 200 may inhibit the increase in the load caused by the inverse quantization using the quantization value for each sub macroblock.

Meanwhile, when submb_qp_present_flag is transmitted as in the third embodiment, it may be configured to transmit the quantization parameter submb_qp_present_flag only for the extended macroblock. In other words, transmission of the quantization parameter submb_qp_present_flag may be omitted for the macroblock having the conventional size. Of course it may be configured to transmit the quantization parameter submb_qp_present_flag having the value indicating that there is no quantization parameter submb_qp_delta of which value is other than "0" for the macroblock having the conventional size.

<4. Fourth Embodiment>

[Summary]

Although it has been described above that the quantization parameter is specified for each sub macroblock, a manner of assigning the quantization parameter to the sub macroblock may be other than the above-described one. For example, it is also possible to define a quantization parameter SubMB_QP assigned to each sub macroblock as represented by a following equation (11) by using a quantization parameter submb_qp_delta for each sub macroblock and a quantization parameter previous_qp for sub macroblock coded immediately before the same.

$$SubMB\_QP = Clip(0, 51, previous\_qp + submb\_qp\_delta) \quad (11)$$

[Coding Unit]

Such a method is to be described below; it is hereinafter described by using a unit referred to as a coding unit in place of the above-described macroblock and sub macroblock.

For example, in a "Test Model Under Consideration" (JCTVC-B205), an extended macroblock described with reference to FIG. 4 is defined by a concept referred to as the coding unit.

The coding unit is a division unit of an image (one picture), which is a unit of process such as a coding process of image data. That is, the coding unit is a block (partial area) obtained by dividing the image (one picture) into a plurality of parts. That is, the coding unit corresponds to the above-described macroblock and sub macroblock.

Figure 15:
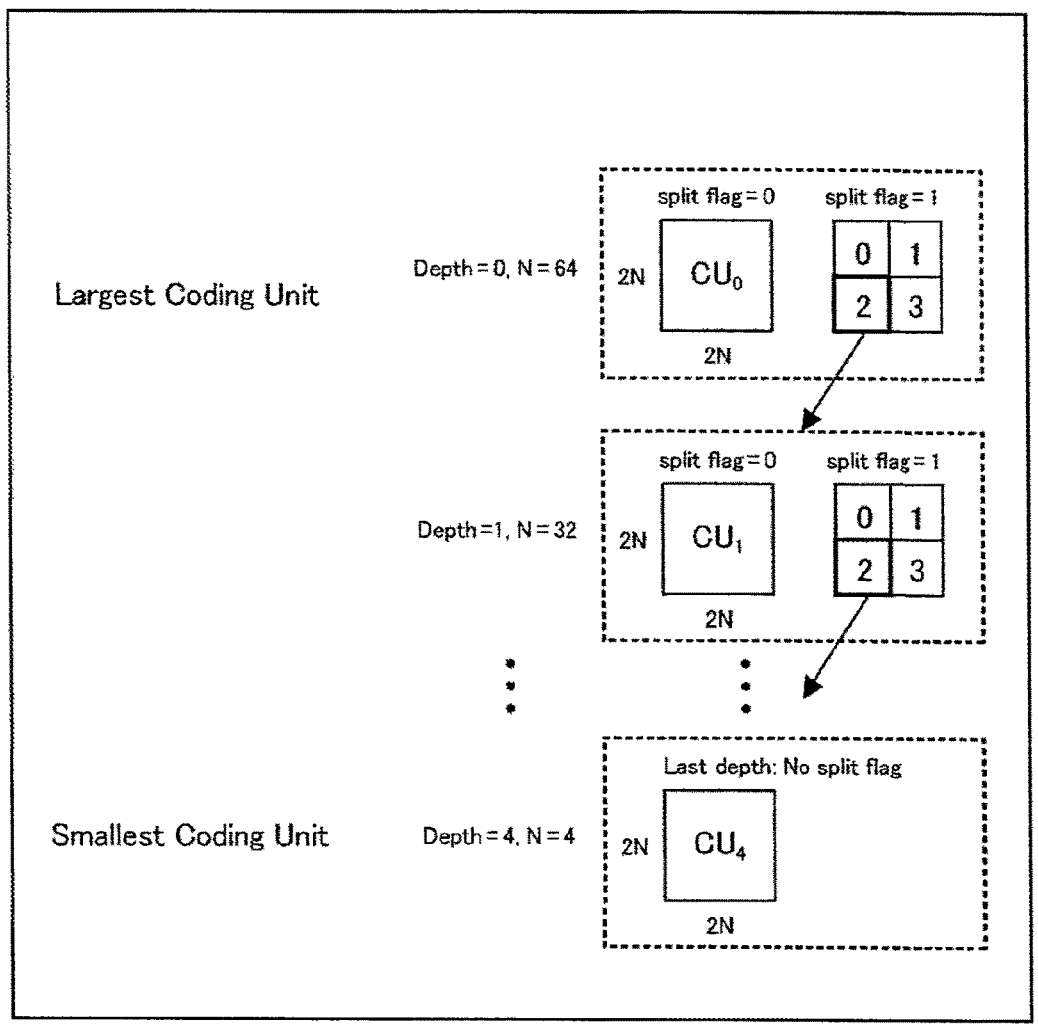
FIG. 15 is a view illustrating a configuration example of a coding unit.

FIG. 15 is a view illustrating a configuration example of the coding unit. As illustrated in FIG. 15, an area of the coding unit may be further divided into a plurality of parts and each area may be made the coding unit of one layer lower. That is, the coding units may be hierarchically configured (configured to have a tree structure). In addition, a size of the coding unit is arbitrary and the coding units having different sizes may be present in one picture.

In an example in FIG. 15, the size of the coding unit in a highest layer (depth=0) is set to 128×128 pixels, an area of 64×64 pixels obtained by dividing the same in half vertically and horizontally (into four) is made the coding unit in one layer lower (depth=1), and hierarchization of the coding units is similarly repeated and an area of 8×8 pixels is made the coding unit in a lowest layer (depth=4).

At that time, the coding unit in the highest layer is referred to as an LCU (Largest Coding Unit) and the coding unit of the lowest layer is referred to as a SCU (Smallest Coding Unit). That is, the LCU corresponds to the macroblock and the coding unit in the lower layer corresponds to the sub macroblock.

Meanwhile, the size and a shape of the coding unit of each layer and the number of layers are arbitrary. That is, it is not required that the sizes and the shapes of all the LCU and SCU be the same in the image (one picture), the number of layers of the coding unit may be different according to a position in the image, and a manner of dividing the area is also arbitrary. That is, the tree structure of the coding units may be an arbitrary structure.

It goes without saying that a degree of freedom of the hierarchical structure of the coding units may be partially limited such that the manners of dividing the area are the same but only the numbers of layers are different, for example. For example, as illustrated in FIG. 15, it is possible to configure such that one area (one picture or one coding unit) is divided in half vertically and horizontally (that is, into four) in any position and the sizes of the LCU and SCU in each position are defined, thereby defining the hierarchical structure of the coding units.

The sizes of the LCU and SCU may be specified by a sequence parameter set in image compressed information, for example. It goes without saying that they may be specified by another metadata and the like.

[Assignment of Quantization Parameter]

In this embodiment, the quantization parameter submb_qp_delta is assigned to each coding unit in place of the macroblock and the sub macroblock. However, in this case, the quantization parameter submb_qp_delta is not a difference value between a quantization parameter MB_QP for each macroblock and the quantization parameter SubMB_QP for each sub macroblock but the difference value between the quantization parameter previous_qp for a previously coded coding unit and the quantization parameter SubMB_QP for the current coding unit.

In other words, the quantization parameter submb_qp_delta indicating the difference value between the quantization parameter previous_qp used for previous coding and the quantization parameter SubMB_QP for the current coding unit is assigned to each coding unit. That is, the quantization parameter submb_qp_delta satisfying the above-described equation (11) is assigned to each coding unit.

Meanwhile, it is only required that an entire area of the image be quantized, so that the quantization parameter submb_qp_delta is actually assigned to a part of the coding units such as only to the SCU, for example.

As in the above-described other embodiments, it is possible to obtain the quantization parameter SubMB_QP for the current coding unit by transforming a quantization value obtained from activity for the coding unit. Therefore, the quantization parameter submb_qp_delta for each coding unit may be calculated by using the equation (11).

Figure 16:
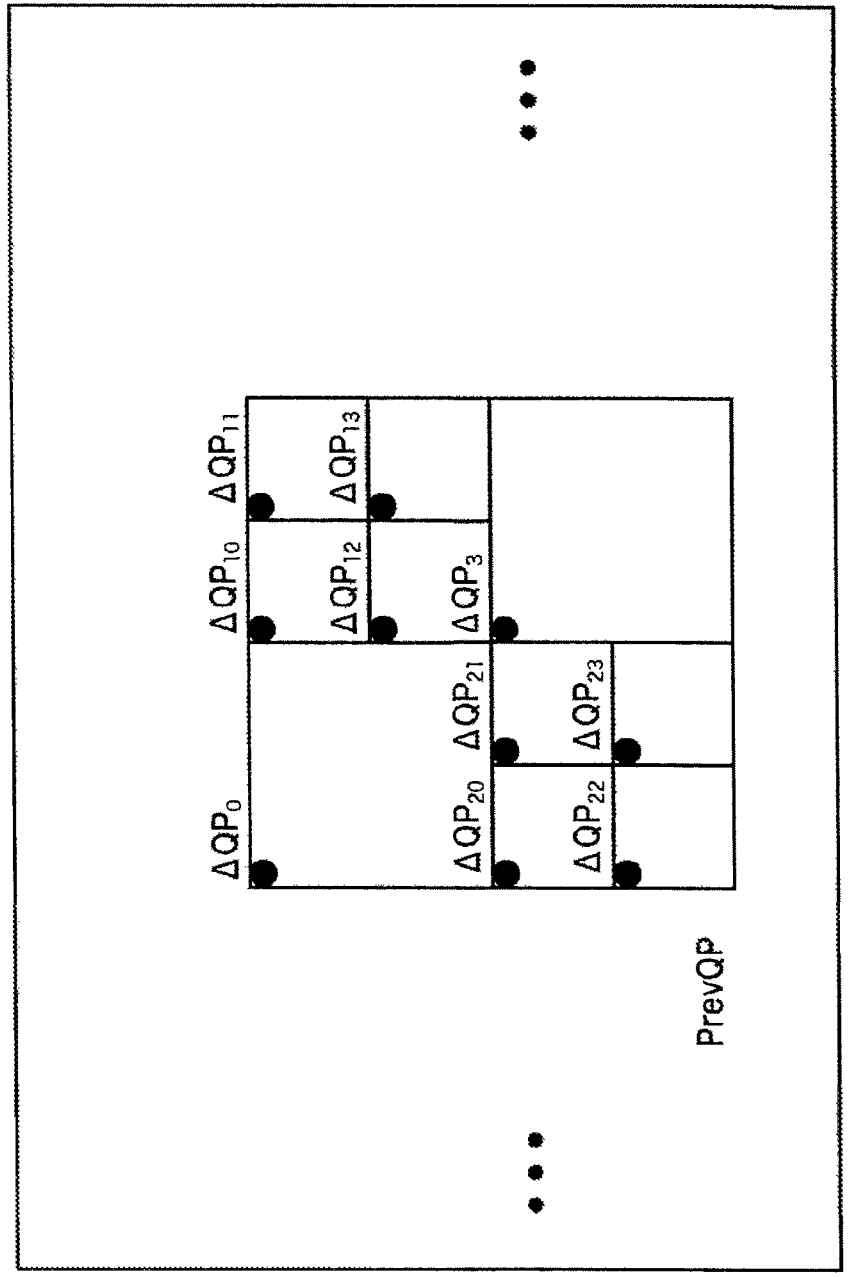
FIG. 16 is a view illustrating an example of the quantization parameter assigned to each coding unit.

FIG. 16 illustrates the configuration example of the coding unit in one LCU and an example of the quantization parameter assigned to each coding unit. As illustrated in FIG. 16, a difference value ΔQP between the quantization parameter previous_qp used for the previous coding and the quantization parameter SubMB_QP for the current coding unit is assigned to each coding unit (CU) as the quantization parameter.

More specifically, a quantization parameter $\Delta QP_0$ is assigned to an upper left coding unit 0 (Coding Unit 0) in the LCU. Also, a quantization parameter $\Delta QP_{10}$ is assigned to an upper left coding unit 10 (Coding Unit 10) out of four upper right coding units in the LCU. Further, a quantization parameter $\Delta QP_{11}$ is assigned to an upper right coding unit 11 (Coding Unit 11) out of the four upper right coding units in the LCU. Also, a quantization parameter $\Delta QP_{12}$ is assigned to a lower left coding unit 12 (Coding Unit 12) out of the four upper right coding units in the LCU. Further, a quantization parameter $\Delta QP_{13}$ is assigned to a lower right coding unit 13 (Coding Unit 13) out of the four upper right coding units in the LCU.

A quantization parameter $\Delta QP_{20}$ is assigned to an upper left coding unit 20 (Coding Unit 20) out of four lower left coding units in the LCU. Further, a quantization parameter $\Delta QP_{21}$ is assigned to an upper right coding unit 21 (Coding Unit 21) out of the four lower left coding units in the LCU. Also, a quantization parameter $\Delta QP_{22}$ is assigned to a lower left coding unit 22 (Coding Unit 22) out of the four lower left coding units in the LCU. Further, a quantization parameter $\Delta QP_{23}$ is assigned to a lower right coding unit 23 (Coding Unit 23) out of the four lower left coding units in the LCU. A quantization parameter $\Delta QP_3$ is assigned to a lower right coding unit 3 (Coding Unit 3) in the LCU.

The quantization parameter for the coding unit processed immediately before the LCU is set to PrevQP. Further, suppose that the upper left coding unit 0 (Coding Unit 0) in the LCU is the current coding unit first processed in the LCU.

A quantization parameter CurrentQP for the current coding unit is calculated as represented by a following equation (12).

$$\text{CurrentQP} = \text{PrevQP} + \Delta QP_0 \quad (12)$$

Suppose that the coding unit to be processed after the coding unit 0 is the upper left coding unit 10 (Coding Unit 10) out of the upper right four coding units in the LCU illustrated in FIG. 16.

When the coding unit 10 becomes the processing target, the quantization parameter CurrentQP of the current coding unit is calculated as represented by following equations (13) and (14).

$$\text{PrevQP} = \text{CurrentQP} \quad (13)$$

$$\text{CurrentQP} = \text{PrevQP} + \Delta QP_{10} \quad (14)$$

In this manner, by making the quantization parameter assigned to each coding unit the difference value between the quantization parameter for the previously coded coding unit and the current quantization parameter, it is not necessary to calculate the quantization parameter for each macroblock, so that a quantization process may be performed more easily.

Meanwhile, when the difference value between the quantization parameter for the already coded coding unit and the current quantization parameter is calculated, it is also possible to calculate the difference value from the coding unit coded before the current coding unit (coding unit coded before the previously coded coding unit in the LCU). However, the difference value between the quantization parameter for the previously coded coding unit and the current quantization parameter is preferable.

That is, when the difference value between the quantization parameter for the previously coded coding unit and the current quantization parameter is calculated, it is only required that only the quantization parameter for the previously coded coding unit be stored in a memory and the quantization parameter may be managed in a FIFO (First In First Out) system. Therefore, when the difference value of the quantization parameter is calculated, the quantization parameter is easily managed and a used amount of memory is small, so that there is an advantage in mounting.

Meanwhile, such a quantization parameter cu_qp_delta for each coding unit is defined by syntax of the coding unit as illustrated in FIG. 17, for example, to be transmitted to a decoding side. That is, the quantization parameter cu_qp_delta for each coding unit corresponds to the above-described quantization parameter sub_qp_delta.

[Image Coding Apparatus]

Figure 18:
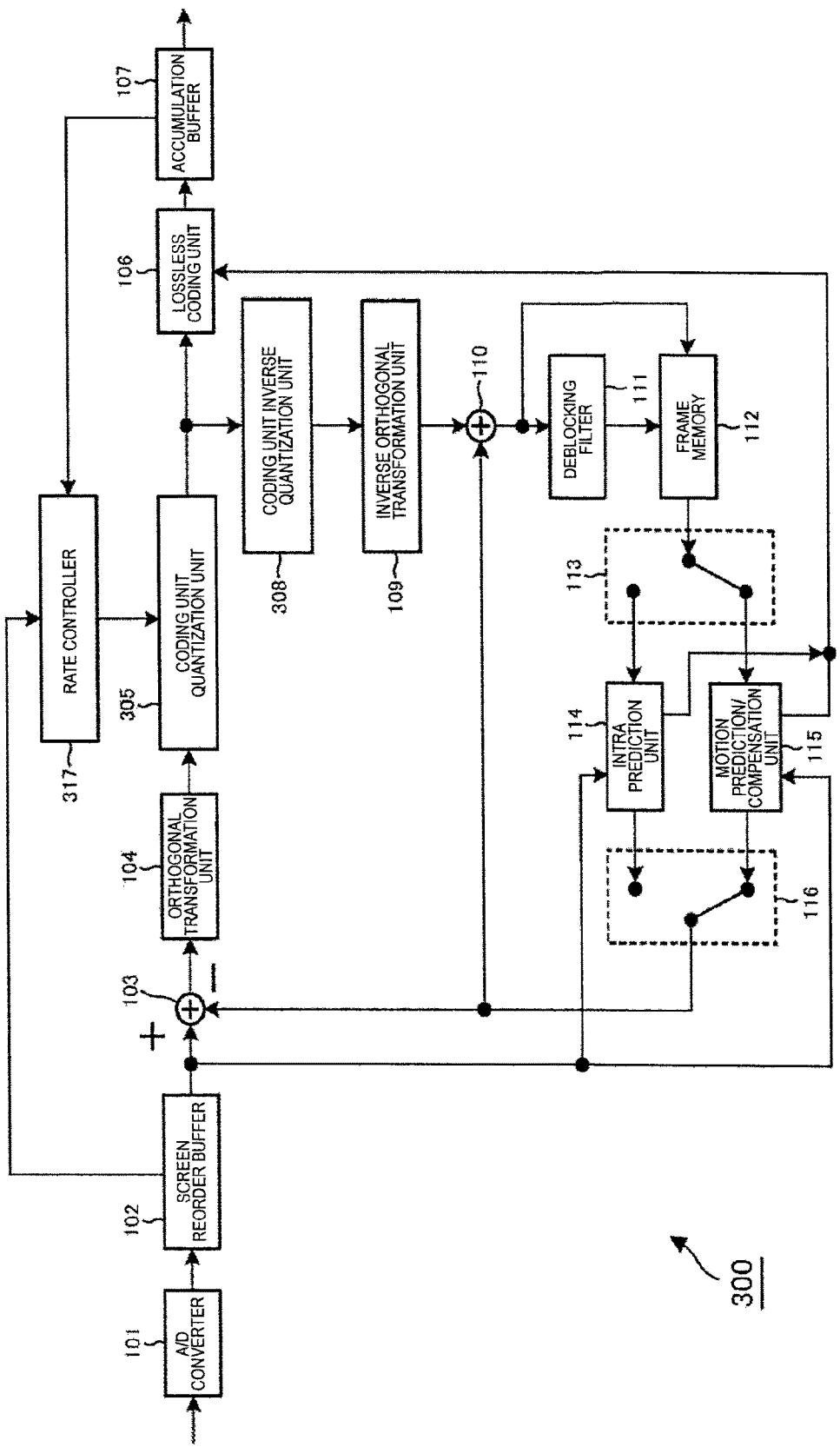
FIG. 18 is a block diagram illustrating another configuration example of the image coding apparatus to which the present technology is applied.

FIG. 18 is a block diagram illustrating a principal configuration example of an image coding apparatus to which the present technology is applied. An image coding apparatus 300 illustrated in FIG. 18 assigns the quantization parameter cu_qp_delta to each coding unit as described above.

As illustrated in FIG. 18, the image coding apparatus 300 has a configuration basically similar to that of an image coding apparatus 100 in FIG. 1. However, the image coding apparatus 300 includes a coding unit quantization unit 305 and a rate controller 317 in place of a quantization unit 105, a rate controller 117, and a sub macroblock quantization unit 121 of the image coding apparatus 100. Also, the image coding apparatus 300 includes a coding unit inverse quantization unit 308 in place of an inverse quantization unit 108 and a sub macroblock inverse quantization unit 122 of the image coding apparatus 100.

The rate controller 317 controls a rate of quantization operation of the coding unit quantization unit 305 such that overflow or underflow does not occur based on a compressed image accumulated in an accumulation buffer 107. Further, the rate controller 317 provides information indicating complexity of the image for each coding unit to the coding unit quantization unit 305. The coding unit quantization unit 305 performs quantization for each coding unit by using the activity. Also, the coding unit quantization unit 305 calculates the quantization parameter for each coding unit. The coding unit quantization unit 305 supplies an orthogonal transform coefficient (coefficient data) quantized for each coding unit and the calculated quantization parameter for each coding unit to the lossless coding unit 106 and codes the same to transmit. Further, the coding unit quantization unit 305 also provides the orthogonal transform coefficient (coefficient data) quantized for each coding unit and the calculated quantization parameter for each coding unit also to the coding unit inverse quantization unit 308.

The coding unit inverse quantization unit 308 performs inverse quantization for each coding unit by using the quantization parameter for each coding unit supplied from the coding unit quantization unit 305. The coding unit inverse quantization unit 308 supplies the orthogonal transform coefficient (coefficient data) inversely quantized for each coding unit to the inverse orthogonal transformation unit 109. The coding unit inverse quantization unit 308 is to be described later in detail in description of an image decoding apparatus.

[Detailed Configuration about Quantization]

Figure 19:
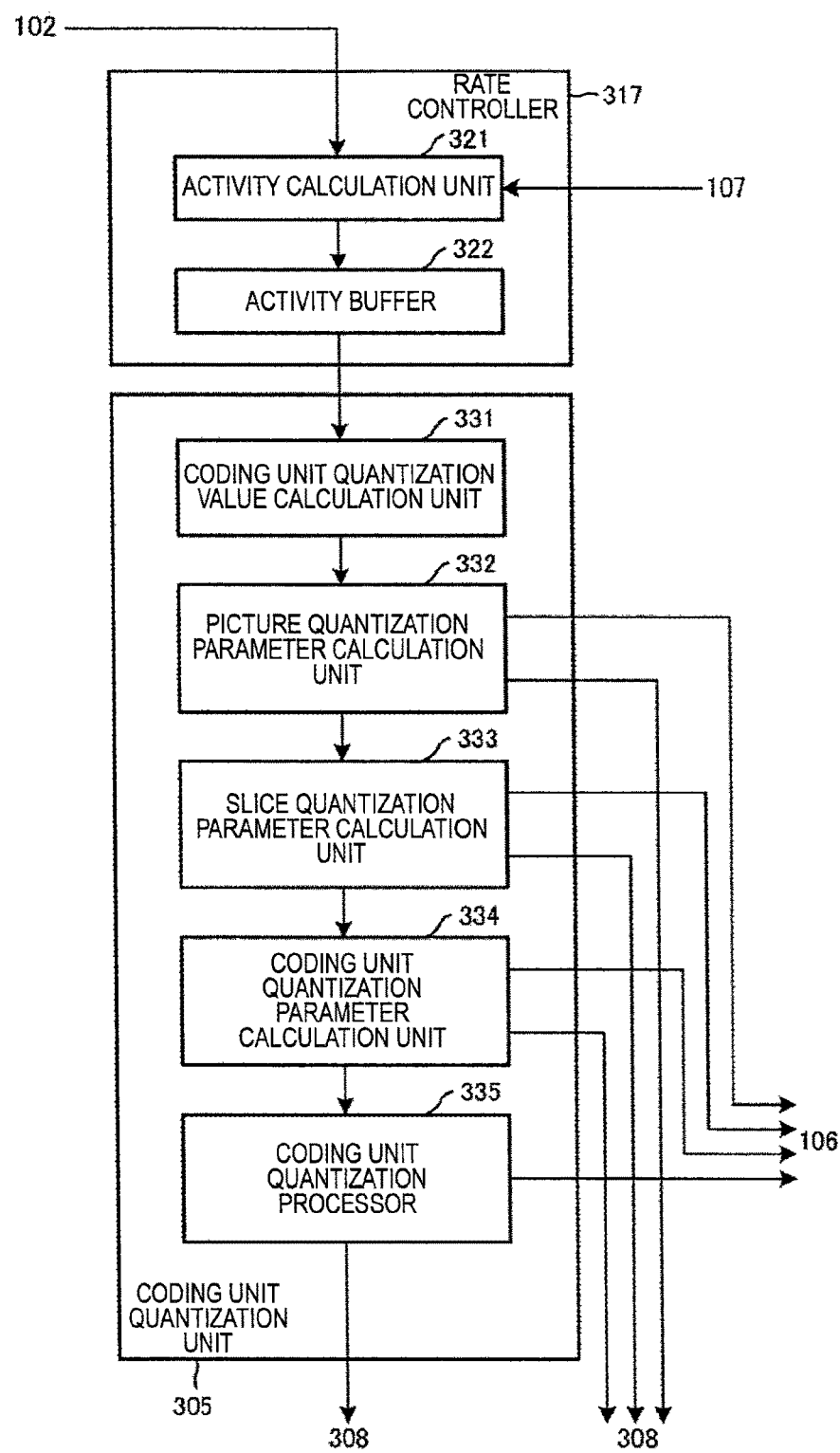
FIG. 19 is a block diagram illustrating a detailed configuration example of a coding unit quantization unit and a rate controller.

FIG. 19 is a block diagram illustrating a detailed configuration example of the rate controller 317 and the coding unit quantization unit 305.

As illustrated in FIG. 19, the rate controller 317 includes an activity calculation unit 321 and an activity buffer 322.

The activity calculation unit 321 obtains the image being a target of the coding process (current coding unit) from a screen reorder buffer 102 and calculates the activity being information indicating dispersion of pixel values as information indicating the complexity of the image. That is, the activity calculation unit 321 calculates the activity for each coding unit. Meanwhile, it is only required that the quantization process be performed for an entire image, so that it is also possible that the activity is calculated only for a part of the coding units such as only for the SCU, for example.

The activity buffer 322 holds the activity for each coding unit calculated by the activity calculation unit 321 and provides the same to the quantization unit 105 at a predetermined timing. The activity buffer 322 holds the obtained activity for each coding unit by an amount of one screen, for example.

A method of calculating the activity is arbitrary and may be a method similar to that of the above-described MPEG2 Test Model, for example. Also, contents of the information indicating the complexity of the image also are arbitrary and may be the information other than such activity.

The coding unit quantization unit 305 includes a coding unit quantization value calculation unit 331, a picture quantization parameter calculation unit 332, a slice quantization parameter calculation unit 333, a coding unit quantization parameter calculation unit 334, and a coding unit quantization unit 335.

The coding unit quantization value calculation unit 331 calculates the quantization value for each coding unit based on the activity for each coding unit (information indicating the complexity of the image for each coding unit) supplied from the rate controller 317. The quantization value for each coding unit may be calculated by a method similar to that in a case where the quantization value for each LCU is calculated from the activity for each LCU. Meanwhile, it is only required that the quantization process be performed for the entire image, so that it is also possible that the quantization value for each coding unit is calculated only for a part of the coding units. Hereinafter, it is assumed that the quantization value for each coding unit is calculated only for the SCU as an example.

After obtaining the quantization value for each coding unit, the coding unit quantization value calculation unit 331 supplies the quantization value for each coding unit to the picture quantization parameter calculation unit 332.

The picture quantization parameter calculation unit 332 obtains a quantization parameter pic_init_qp_minus26 for each picture by using the quantization value for each coding unit.

The slice quantization parameter calculation unit 333 obtains a quantization parameter slice_qp_delta for each slice by using the quantization value for each coding unit.

The coding unit quantization parameter calculation unit 334 obtains a quantization parameter cu_qp_delta for each coding unit by using the quantization parameter prevQP used for the previous coding.

The quantization parameters generated by the picture quantization parameter calculation unit 332 to the coding unit quantization parameter calculation unit 334 are supplied to the lossless coding unit 106, coded, and transmitted to the decoding side, and supplied also to the coding unit inverse quantization unit 308.

The coding unit quantization unit 335 quantizes the orthogonal transform coefficient of the current coding unit by using the quantization value for each coding unit.

The coding unit quantization unit 335 supplies the orthogonal transform coefficient quantized for each coding unit to the lossless coding unit 106 and the coding unit inverse quantization unit 308.

[Flow of Coding Process]

The image coding apparatus 300 performs the coding process basically as in the case of the image coding apparatus 100 in FIG. 1 described with reference to FIG. 6.

[Flow of Quantization Parameter Calculation Process]

Figure 20:
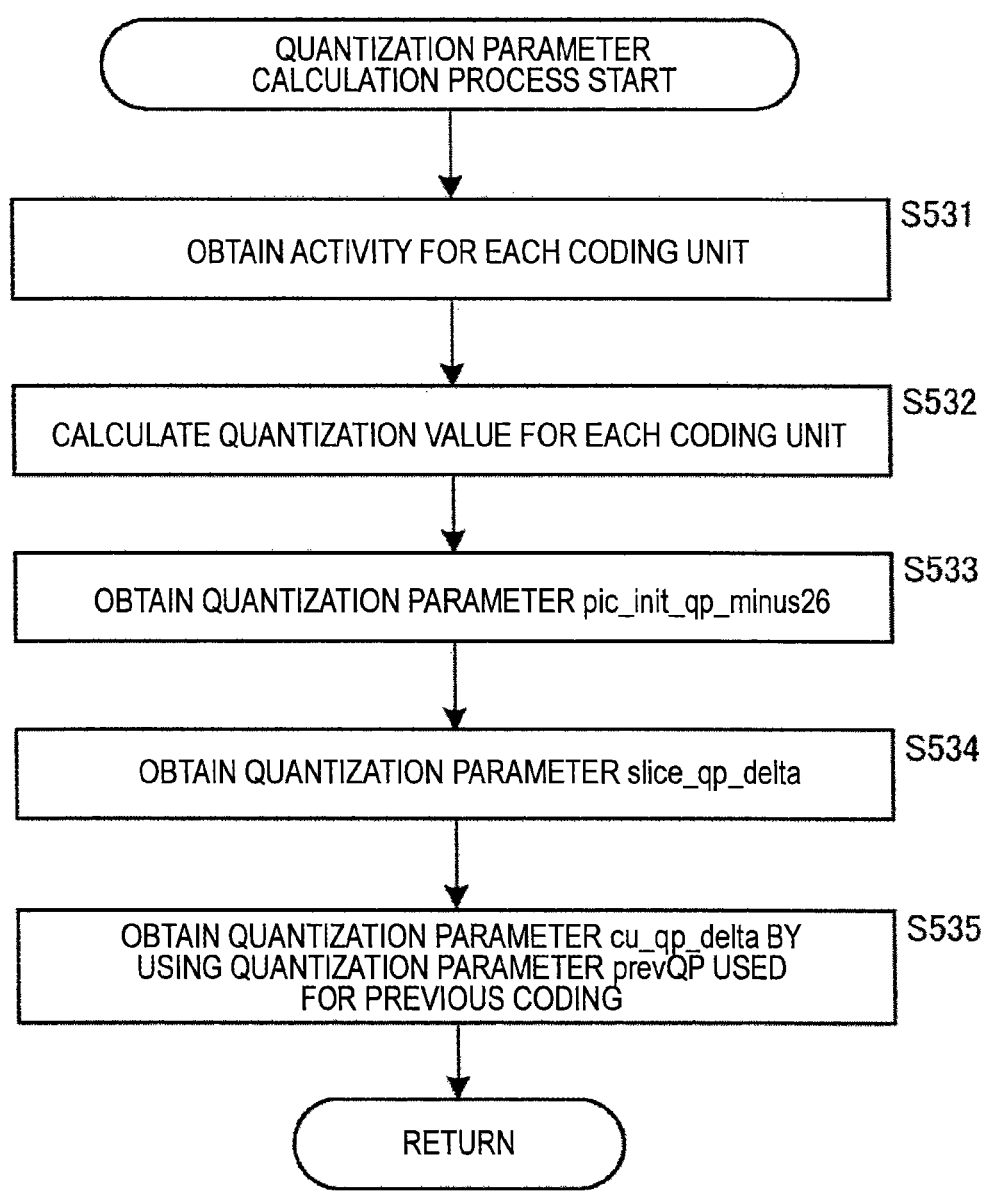
FIG. 20 is a flowchart illustrating still another example of the flow of the quantization parameter calculation process.

An example of a flow of a quantization parameter calculation process executed in the coding process is described with reference to a flowchart in FIG. 20.

When the quantization parameter calculation process is started, at step S531, the coding unit quantization value calculation unit 331 obtains the activity for each coding unit supplied from the rate controller 317.

At step S532, the coding unit quantization value calculation unit 331 calculates the quantization value for each coding unit by using the activity for each coding unit.

At step S533, the picture quantization parameter calculation unit 332 obtains the quantization parameter pic_init_qp_minus26 by using the quantization value for each coding unit calculated at step S532.

At step S534, the slice quantization parameter calculation unit 333 obtains the quantization parameter slice_qp_delta by using the quantization value for each coding unit calculated at step S532.

At step S535, the coding unit quantization parameter calculation unit 334 obtains the quantization parameter cu_qp_delta for each coding unit ($\Delta QP_0$ to $\Delta QP_{23}$ and the like in FIG. 16) by using the quantization parameter prevQP used for the previous coding.

After obtaining the various quantization parameters in the above-described manner, the coding unit quantization unit 305 finishes the quantization parameter calculation process and performs subsequent processes of the coding process.

Since the coding process and the quantization parameter calculation process are performed in the above-described manner, the image coding apparatus 300 may set the quantization value for each coding unit and perform a more appropriate quantization process according to contents of the image.

Also, since the quantization parameter calculated in this manner is transmitted to the image decoding apparatus, the image coding apparatus 300 may allow the image decoding apparatus to perform the inverse quantization for each coding unit.

Meanwhile, the coding unit inverse quantization unit 308 included in the image coding apparatus 300 performs a process similar to that of the coding unit inverse quantization unit included in the image decoding apparatus corresponding to the image coding apparatus 300. That is, the image coding apparatus 300 may also perform the inverse quantization for each coding unit.

[Image Decoding Apparatus]

Figure 21:
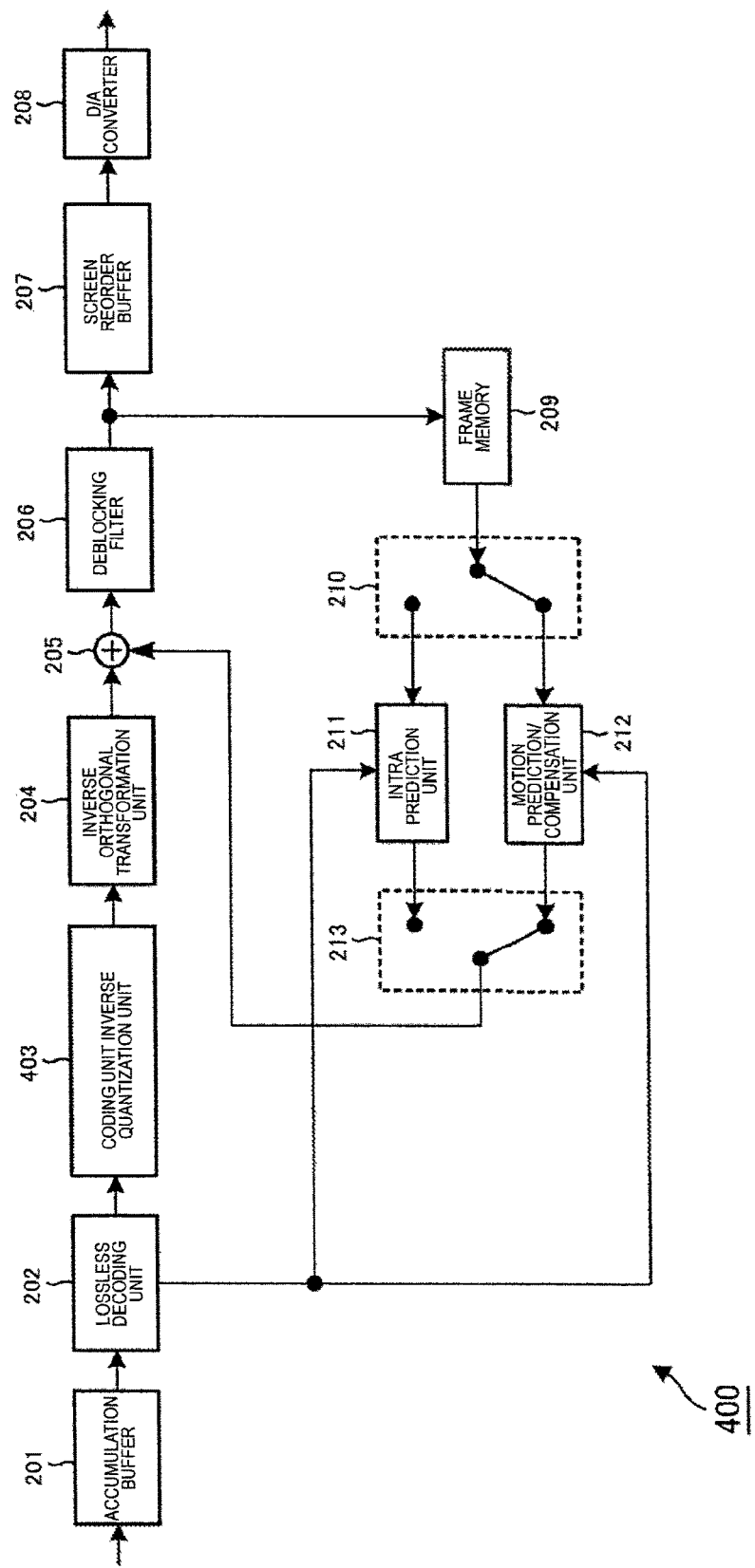
FIG. 21 is a block diagram illustrating another configuration example of the image decoding apparatus to which the present technology is applied.

FIG. 21 is a block diagram illustrating a principal configuration example of the image decoding apparatus to which the present technology is applied. An image decoding apparatus 400 illustrated in FIG. 21, which corresponds to the above-described image coding apparatus 300, correctly decodes a coded stream (coded data) generated by the coding of the image data by the image coding apparatus 300 to generate a decoded image.

As illustrated in FIG. 21, the image decoding apparatus 400 has a configuration basically similar to that of an image decoding apparatus 200 in FIG. 8 and performs a similar process. However, the image decoding apparatus 400 includes a coding unit inverse quantization unit 403 in place of an inverse quantization unit 203 and a sub macroblock inverse quantization unit 221 of the image decoding apparatus 200.

The coding unit inverse quantization unit 403 inversely quantizes the orthogonal transform coefficient quantized for each coding unit by the image coding apparatus 300 by using the quantization parameter and the like for each coding unit supplied from the image coding apparatus 300.

Figure 22:
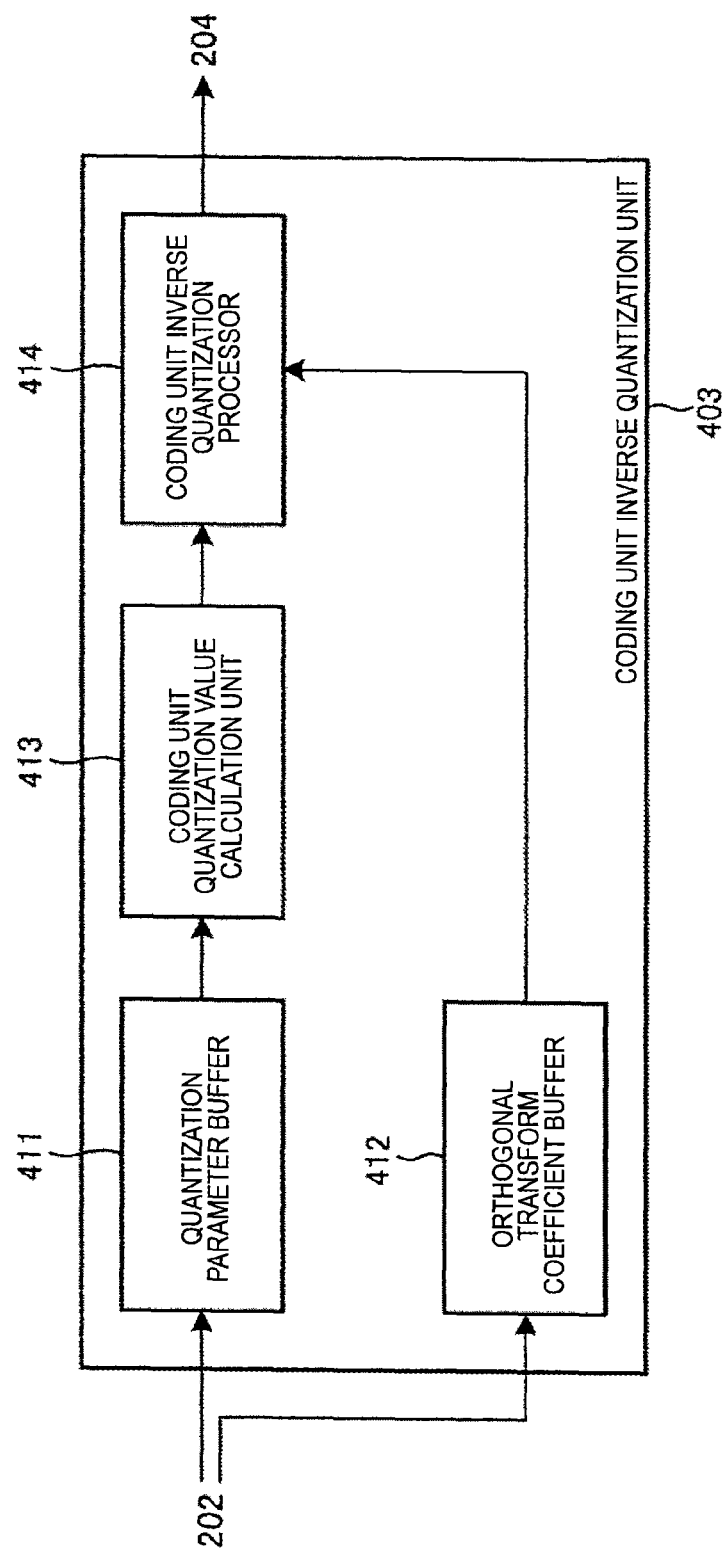
FIG. 22 is a block diagram illustrating a detailed configuration example of a coding unit inverse quantization unit.

FIG. 22 is a block diagram illustrating a principal configuration example of the coding unit inverse quantization unit 403. As illustrated in FIG. 22, the coding unit inverse quantization unit 403 includes a quantization parameter buffer 411, an orthogonal transform coefficient buffer 412, a coding unit quantization value calculation unit 413, and a coding unit inverse quantization processor 414.

The quantization parameter in each layer such as a picture parameter set and a slice header of the coded data supplied from the image coding apparatus 300 is decoded by a lossless decoding unit 202 to be supplied to the quantization parameter buffer 411. The quantization parameter buffer 411 appropriately holds the quantization parameter and supplies the same to the coding unit quantization value calculation unit 413 at a predetermined timing.

The coding unit quantization value calculation unit 413 calculates the quantization value for each coding unit as represented by equations (36) to (39), for example, by using the quantization parameter supplied from the quantization parameter buffer 411 and supplies the quantization value to the coding unit inverse quantization processor 414.

Also, the quantized orthogonal transform coefficient obtained by decoding of the coded data supplied from the image coding apparatus 300 by the lossless decoding unit 202 is supplied to the orthogonal transform coefficient buffer 412. The orthogonal transform coefficient buffer 412 appropriately holds the quantized orthogonal transform coefficient to supply to the coding unit inverse quantization processor 414 at a predetermined timing.

The coding unit inverse quantization processor 414 inversely quantizes the quantized orthogonal transform coefficient supplied from the orthogonal transform coefficient buffer 412 by using the quantization value for each coding unit supplied from the coding unit quantization value calculation unit 413. The coding unit inverse quantization processor 414 supplies the orthogonal transform coefficient obtained by the inverse quantization to an inverse orthogonal transformation unit 204.

As described above, the coding unit inverse quantization unit 403 may perform an inverse quantization process by using the quantization value calculated for each coding unit. According to this, the image decoding apparatus 400 may perform the inverse quantization process more suitable for the contents of the image. Especially, even in a case where a size of the macroblock is extended (the size of the LCU is large) and both of a flat area and an area including texture are included in a single LCU, the image decoding apparatus 400 may perform an adaptive inverse quantization process suitable for each area to inhibit subjective image quality of the decoded image from deteriorating.

Meanwhile, the coding unit inverse quantization unit 308 of the image coding apparatus 300 illustrated in FIG. 18 also has a configuration similar to that of the coding unit inverse quantization unit 403 and performs a similar process. However, the coding unit inverse quantization unit 308 obtains the quantization parameter and the quantized orthogonal transform coefficient supplied from the coding unit quantization unit 305 and performs the inverse quantization.

[Flow of Decoding Process]

The image decoding apparatus 400 performs a decoding process in a manner basically similar to that in a case of the image decoding apparatus 200 in FIG. 8 described with reference to the flowchart in FIG. 10.

[Flow of Inverse Quantization Process]

Figure 23:
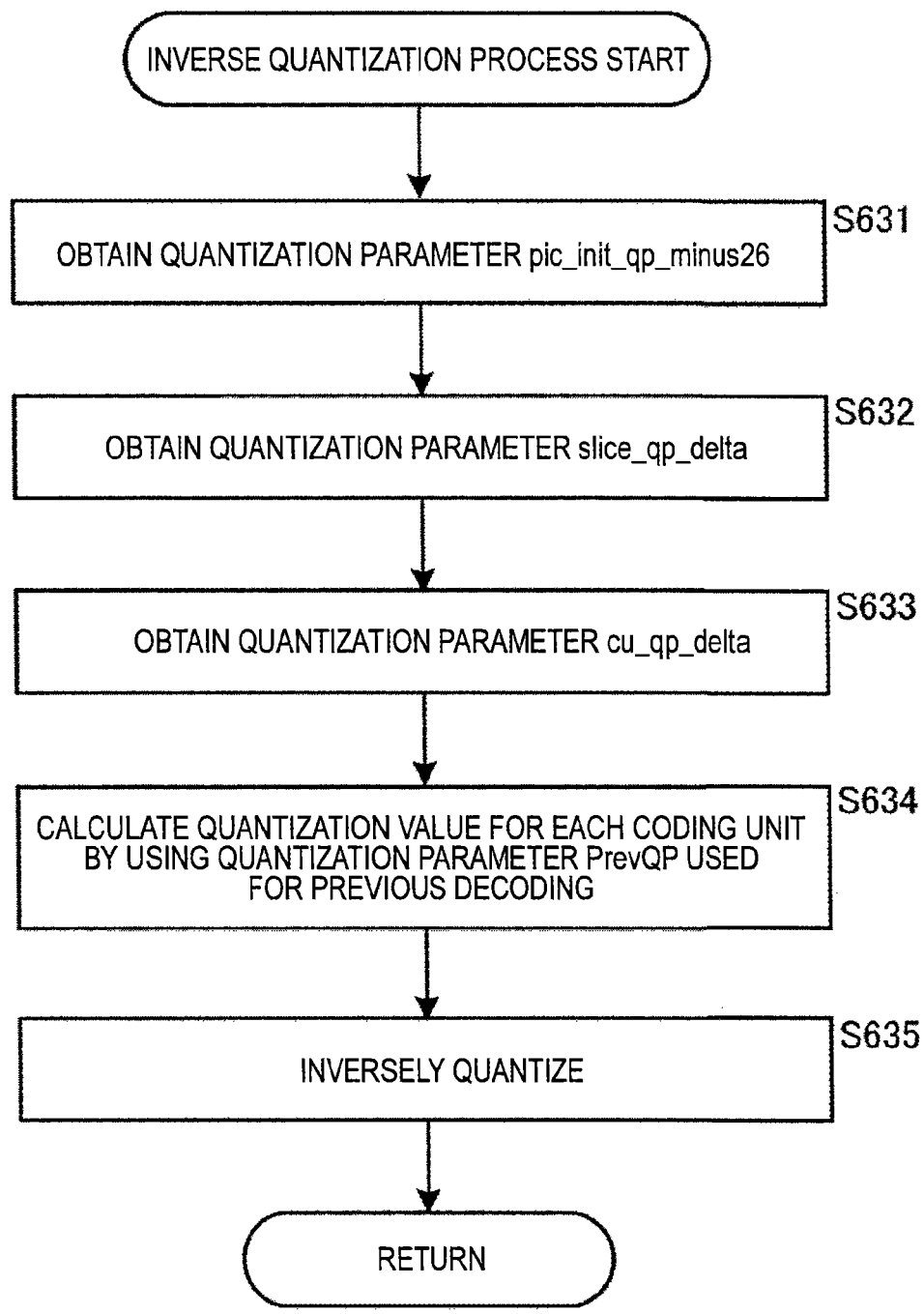
FIG. 23 is a flowchart illustrating still another example of the flow of the inverse quantization process.

An example of a flow of the inverse quantization process executed in the decoding process by the image decoding apparatus 400 is described with reference to a flowchart in FIG. 23.

When the inverse quantization process is started, the quantization parameter buffer 411 obtains the quantization parameter pic_init_qp_minus26 supplied from the lossless decoding unit 202 at step S631.

At step S632, the quantization parameter buffer 411 obtains the quantization parameter slice_qp_delta supplied from the lossless decoding unit 202.

At step S633, the quantization parameter buffer 411 obtains the quantization parameter cu_qp_delta supplied from the lossless decoding unit 202.

At step S634, the coding unit quantization value calculation unit 413 calculates the quantization value for each coding unit by using the various quantization parameters obtained by the processes at steps S631 to S633 and the previously used quantization parameter PrevQP.

At step S635, the coding unit inverse quantization processor 414 inversely quantizes the quantized orthogonal transform coefficient held by the orthogonal transform coefficient buffer 412 by using the quantization value for each coding unit calculated by the process at step S634.

When the process at step S635 is finished, the coding unit inverse quantization unit 403 returns the process to the decoding process and allows subsequent processes to be executed.

As described above, by performing the decoding process and the inverse quantization process, the image decoding apparatus 400 may perform the inverse quantization process by using the quantization value calculated for each coding unit and perform the inverse quantization process more suitable for the contents of the image.

As described above, in order to decrease a code amount of the quantization parameter for each coding unit (sub macroblock), a difference value dQP between a predetermined quantization parameter and the quantization parameter SubMB_QP (quantization parameter submb_qp_delta) is obtained to be transmitted instead of transmitting the quantization parameter SubMB_QP itself. Two methods represented by following equations (15) and (16) have been described above as methods of calculating the quantization parameter dQP.

$$dQP=CurrentQP-LCUQP \qquad (15)$$

$$dQP=CurrentQP-PreviousQP \qquad (16)$$

In the equations (15) and (16), CurrentQP represents the quantization parameter for the current coding unit (CU). Also, LCUQP represents the quantization parameter for the LCU to which the current CU belongs (that is, the current LCU). Further, PreviousQP represents the quantization parameter for the CU processed immediately before the current CU.

That is, in a case of the equation (15), the difference value between the quantization parameter for the current LCU and the quantization parameter for the current CU is transmitted. Also, in a case of the equation (16), the difference value between the quantization parameter of the previously processed CU and the quantization parameter of the current CU is transmitted.

The method of calculating such quantization parameter dQP for transmission is arbitrary and may be other than the above-described two examples.

For example, it is also possible to transmit the difference value between a quantization parameter SliceQP for the slice to which the current CU belongs (that is, the current slice) and the quantization parameter for the current CU as represented by a following equation (17).

$$dQP = CurrentQP - SliceQP \quad (17)$$

The quantization parameter CurrentQP may be obtained by transformation of the quantization value of the current CU calculated by the coding unit quantization value calculation unit 331 by the coding unit quantization parameter calculation unit 334 in FIG. 19, for example. Also, the quantization parameter SliceQP may be obtained by the slice quantization parameter calculation unit 333 in FIG. 19 using the quantization parameter pic_init_qp_minus26 obtained by the picture quantization parameter calculation unit 332 and the quantization parameter slice_qp_delta obtained by itself, for example.

Therefore, for example, the coding unit quantization parameter calculation unit 334 in FIG. 19 may obtain the quantization parameter dQP by using the values. The coding unit quantization parameter calculation unit 334 supplies the quantization parameter dQP to the lossless coding unit 106 to transmit to the decoding side.

The quantization parameter pic_init_qp_minus26 and the quantization parameter slice_qp_delta are defined in the "Test Model Under Consideration" (JCTVC-B205), for example, and may be set by a method similar to that of a conventional coding system.

On the decoding side, the quantization parameter for the CU may be obtained from the quantization parameter dQP transmitted from a coding side.

For example, the coding unit quantization value calculation unit 413 obtains the quantization parameter SubMB_QP for the CU as represented by a following equation (18) from the quantization parameter dQP and transforms the same to obtain the quantization value.

$$SubMB\_QP = Clip(minQP, maxQP, SliceQP + submb\_qp\_delta) \quad (18)$$

In the equation (18), minQP represents a minimum quantization parameter defined in advance and maxQP represents a maximum quantization parameter defined in advance.

In this manner, in a case where the quantization parameter SliceQP is used for obtaining the quantization parameter dQP also, the quantization and the inverse quantization may be performed as the above-described two methods. That is, not only the quantization and the inverse quantization more suitable for the contents of the image may be performed, but also the code amount of the quantization parameter may be decreased.

A table in which characteristics of the processes of the methods are compared to each other is illustrated in FIG. 24. In the table illustrated in FIG. 24, a method on the top (referred to as a first method) is a method of obtaining the quantization parameter dQP by using the quantization parameter for the LCU. A second top method (referred to as a second method) is a method of obtaining the quantization parameter dQP by using the quantization parameter for the CU processed immediately before the current CU. A method on the bottom (referred to a as third method) is a method of obtaining the quantization parameter dQP by using the quantization parameter for the current slice.

In the table in FIG. 24, easiness of a pipeline process and coding efficiency are compared to each other as the characteristics of the methods. As indicated in the table in FIG. 24, the pipeline process is easier in the first method than in the second method. The pipe line process is easier in the third method than in the first method. Further, the coding efficiency is better in the first method than in the third method. The coding efficiency is better in the second method than in the first method.

That is, in general, the closer the area is to the current area, the higher the correlativity with the current area (such as the coding unit and the sub macroblock). Therefore, it is possible to further improve the coding efficiency of the quantization parameter dQP by obtaining the quantization parameter dQP by using the area closer to the current area.

However, in general, the farther the area is from the current area, the earlier this is processed. Therefore, time until the current area is processed becomes longer. That is, allowed time for processing delay and the like becomes longer. Therefore, when the quantization parameter dQP is obtained by using the area farther from the current area, delay is less likely to occur, which is advantageous for the pipeline process.

As described above, the methods have different characteristics, so that an appropriate method differs depending on a condition having priority. Meanwhile, it is also possible that each method may be selected. A selecting method is arbitrary. For example, a user and the like may determine in advance the method to be applied. For example, it is also possible that any method is adaptively selected according to an arbitrary condition (for each arbitrary unit of process or when an arbitrary event occurs, for example).

When any method is adaptively selected, it is also possible to generate flag information indicating the selected method and transmit the flag information from the coding side (quantization side) to the decoding side (inverse quantization side). In this case, the decoding side (inverse quantization side) may select the same method as that of the coding side (quantization side) by referring to the flag information.

Also, the method of calculating the quantization parameter dQP is arbitrary and may be other than the above-described method. The number of prepared calculating methods is also arbitrary. Also, the value may be variable. It is also possible to transmit information defining the quantization parameter dQP from the coding side (quantization side) to the decoding side (inverse quantization side).

Figure 25:
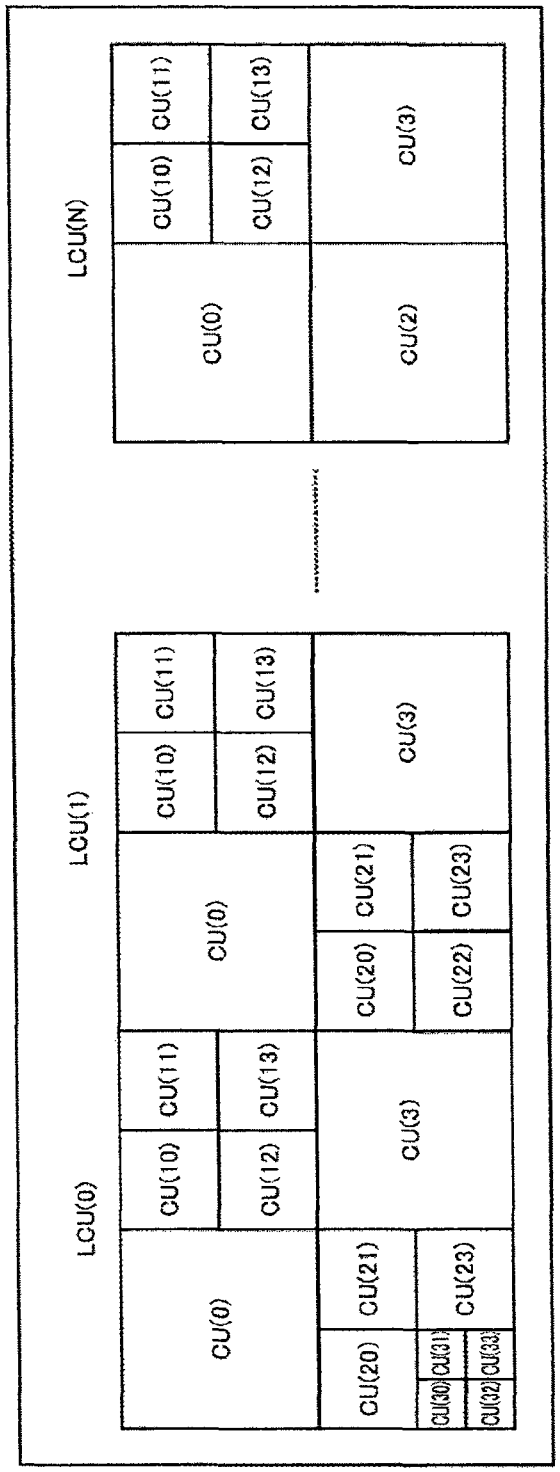
FIG. 25 is a view illustrating an example of the quantization parameter assigned to each coding unit.

The method of calculating the difference value of the quantization parameter is illustrated in consideration of the characteristics of the above-described methods. FIG. 25 illustrates an example of configurations of the LCU and CU. The (number) indicates order of coding (decoding) process of the coding units.

In an LCU(0), the order of coding of the coding units is as follows:

CU(0)
→CU (10)→CU(11)→CU(12)→CU(13)
→CU(20)→CU (21)
→CU(30)→CU(31)→CU(32)→CU(33)
→CU(23)
→CU(3)

In this case, the difference value of the quantization parameter is as follows:

The coding unit CU(0) at the head of the LCU transmits the difference value between the quantization parameter SliceQP for the slice to which the CU(0) belongs (that is, the current slice) and the quantization parameter for the current CU(0) by using the equation (17).

$$dQP(CU(0)) = CurrentQP(CU0) - SliceQP$$

Next, the coding units CU(10) to CU(3) other than the one at the head of the LCU transmit the difference value between the quantization parameter (CurrentCU) for the current CU and the previously coded CU (PrevisousCU) by using the equation (16).

$$dQP=CurrentQP(CUi)-PreviousQP(CUi-1)$$

That is, when it is described with reference to FIG. 25, the difference values of the quantization parameter are as follows:

$$dQP(CU(10))=CurrentQP(CU(10))-PrevisouQP(CU(0))$$

$$dQP(CU(11))=CurrentQP(CU(11))-PrevisouQP(CU(10))$$

$$dQP(CU(12))=CurrentQP(CU(12))-PrevisouQP(CU(11))$$

$$dQP(CU(13))=CurrentQP(CU(13))-PrevisouQP(CU(12))$$

$$dQP(CU(20))=CurrentQP(CU(20))-PrevisouQP(CU(13))$$

$$dQP(CU(21))=CurrentQP(CU(21))-PrevisouQP(CU(20))$$

$$dQP(CU(30))=CurrentQP(CU(30))-PrevisouQP(CU(21))$$

$$dQP(CU(31))=CurrentQP(CU(31))-PrevisouQP(CU(30))$$

$$dQP(CU(32))=CurrentQP(CU(32))-PrevisouQP(CU(31))$$

$$dQP(CU(33))=CurrentQP(CU(33))-PrevisouQP(CU32))$$

$$dQP(CU(23))=CurrentQP(CU(23))-PrevisouQP(CU33))$$

$$dQP(CU(3))=CurrentQP(CU(3))-PrevisouQP(CU23)$$

For other LCU(1) to LCU(N) also, the difference values of the quantization parameter are similarly calculated to be transmitted.

In this manner, it is possible to satisfy both of the easiness of the pipeline process and the coding efficiency by adopting advantage of the characteristics of each method (indicated by double circle in the drawing) by calculating and transmitting the difference value of the quantization parameter.

Meanwhile, in view of mounting, when closed control is performed in the LUC, the coding unit CU(0) at the head of the LCU may calculate the difference value of the quantization parameter by using the equation (15).

Meanwhile, the quantization parameter dQP described above is not required to be set for all the coding units, and this may be set only for the CU for which it is desirable to set a value different from a reference quantization parameter such as LCUQP, PreviousQP, and SliceQP.

For this purpose, it is also possible to add syntax MinCUForDQPCoded to the slice header (SliceHeader), for example.

FIG. 26 is a view illustrating an example of the syntax of the slice header. The number on a left end of each row is a row number assigned for description.

In an example in FIG. 26, MinCUForDQPCoded is set in a 22nd line. This MinCUForDQPCoded specifies a minimum CU size for which dQP is set. For example, even when a minimum size of the CU is 8×8, if it is specified that MinCUForDQPCoded=16, the coding unit quantization parameter calculation unit 334 of the image coding apparatus 300 sets dQP only for the CU having a size not smaller than 16×16 and does not set dQP for the CU having the size of 8×8. That is, in this case, dQP for the CU having the size not smaller than 16×16 is transmitted. Meanwhile, MinCUForDQPCoded may be set as a flag (for example 0:4×4, 1:8×8, 2:16×16 and the like) to identify (select) the minimum CU size for which dQP is set from the CU size (4×4, 8×8, 16×16, 32×32 and the like) set at the time of coding (decoding) as a method of specifying the minimum CU size for which dQP is set.

For example, when one who makes an encoder only wants to control with the CU having the size of 16×16, it is required to transmit all dQP as 0 in the CU having the size of 8×8 and this might deteriorate the coding efficiency.

Therefore, by setting such syntax MinCUForDQPCoded, it is possible to omit the transmission of dQP for the CU having the size of 8×8 in this case, thereby inhibiting the coding efficiency from deteriorating.

The coding unit quantization value calculation unit 413 of the image decoding apparatus 400 grasps that dQP for the CU having the size of 8×8 is not transmitted according to such syntax and calculates the quantization value by using the reference quantization parameter such as LCUQP, PreviousQP, and SliceQP.

Meanwhile, MinCUForDQPCoded may be stored in other than the slice header. For example, this may be stored in the picture parameter set (PictureParameterSet). It is possible to support operation to change this value after scene change, for example, by storing the same in the slice header or the picture parameter set.

However, when MinCUFcrDQPCoded is stored in the slice header, it is possible to support a case where the picture is multi-sliced and processed in parallel for each slice also, which is more desirable.

<5. Fifth Embodiment>
[Summary]

Although it has been described above that the quantization parameter for each sub macroblock (coding unit smaller than the LCU) is transmitted from the image coding apparatus to the image decoding apparatus, in this case, it is required that the image decoding apparatus also may obtain the quantization parameter for each sub macroblock (coding unit smaller than the LCU) and perform the quantization for each sub macroblock (coding unit smaller than the LCU) by using the quantization parameter.

Therefore, it may be configured such that the image coding apparatus sets the quantization parameter for each macroblock (LCU) and provides the quantization parameter for each macroblock (LCU) to the image decoding apparatus while performing a quantization process for each sub macroblock (coding unit smaller than the LCU).

For example, when calculating activity for each macroblock (LCU) by the above-described TestModel 5, the image coding apparatus calculates the activity for each block (coding unit) of 8×8, 16×16 and the like, smaller than the macroblock (LCU) even when a size of the macroblock (LCU) is 64×64, 128×128 and the like.

Then, the image coding apparatus determines a quantization parameter value for each 8×8 block or 16×16 block based on the activity for each 8×8 block or 16×16 block based on a method of the TestModel5.

However, the quantization parameter is set for each macroblock (LCU).

Figure 27:
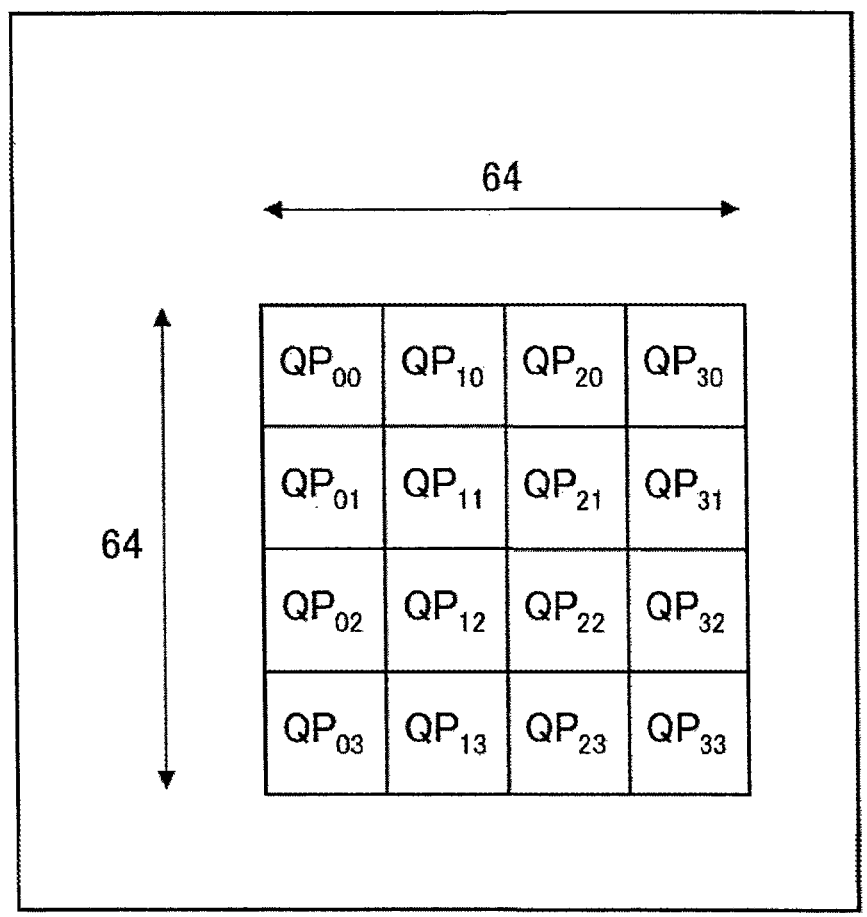
FIG. 27 is a view illustrating an example of a method of calculating activity.

For example, suppose that the size of the LCU (macroblock) is 64×64 pixels as illustrated in FIG. 27. When the image coding apparatus calculates the activity for each 16×16 coding unit to calculate the quantization parameter for the LCU, the activity for each coding unit (block) becomes $QP_{00}$ to $QP_{33}$.

Figure 28:
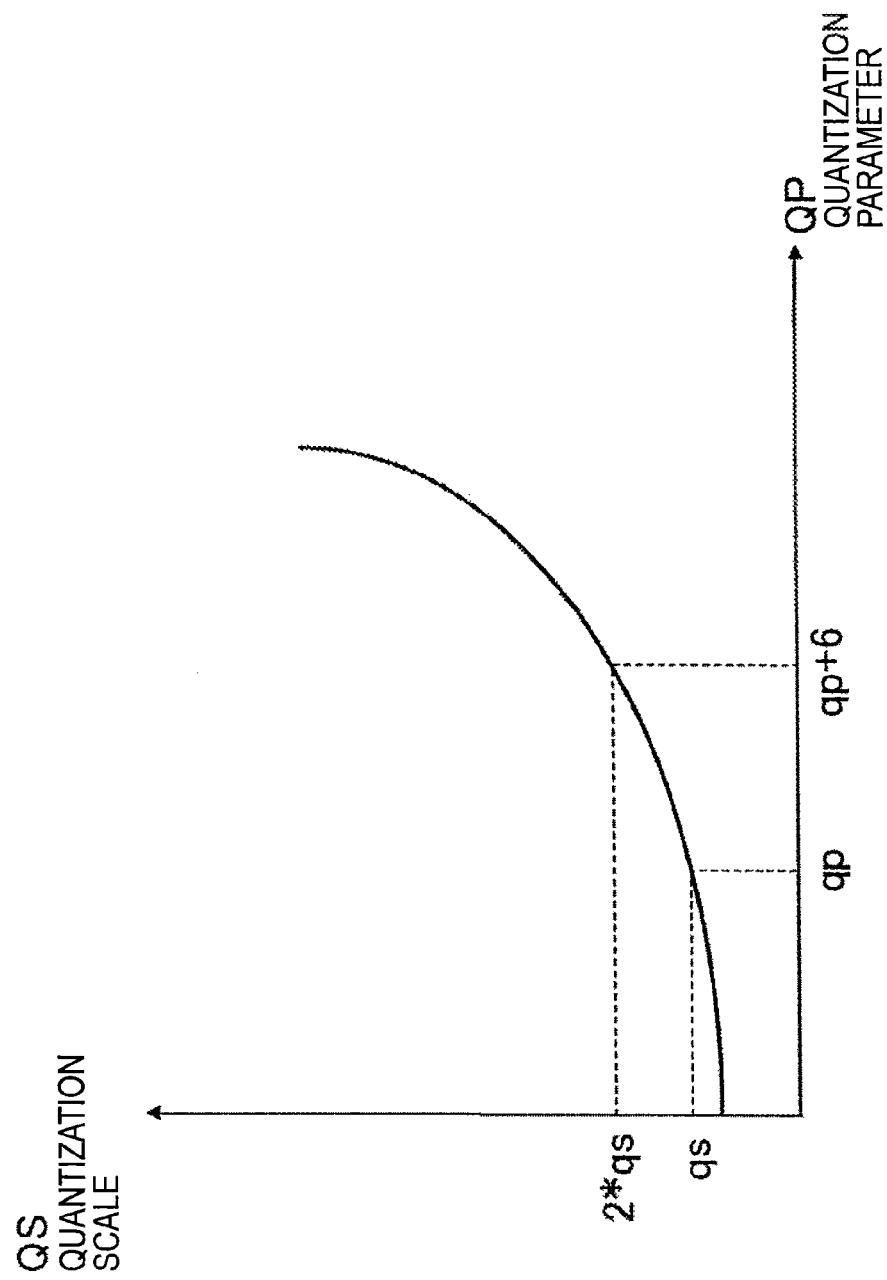
FIG. 28 is a view illustrating a relationship between the quantization parameter and a quantization scale.

In a case of the AVC, a quantization parameter QP is designed such that the quantization process twice as coarse as the original one is performed when a value thereof increments by 6 such as from 6 to 12, for example, as illustrated in FIG. 28.

Deterioration in a chrominance signal is easily noticeable especially at a lower bit rate, that is, with a higher QP. Therefore, a default quantization parameter $QP_C$ for the chrominance signal is defined in advance with respect to a quantization parameter $QP_Y$ for a luminance signal.

A user may control this relationship by setting information about ChromaQPOffset included in image compressed information.

On the other hand, in a case of this embodiment, the image coding apparatus determines a quantization parameter $QP_{MB}$ for the macroblock as represented by a following equation (19) at a first step.

[Equation 3]

$$QP_{MB} = \min_{ij=0,3} QP_{ij} \qquad (19)$$

At a second step, the quantization process for each block is performed by using values of the $QP_{00}$ to $QP_{33}$. As a result, a position of a non-zero coefficient in each block is stored in a memory.

At a third step, the quantization process for each block is performed by using a value of the $QP_{MB}$.

At a fourth step, only a value in the position of the coefficient being the non-zero coefficient also at the second step out of the non-zero obtained at the third step is transmitted to lossless coding information as coded information.

By performing such a process, although only the $QP_{MB}$ is transmitted to the image compressed information as the quantization parameter, it becomes possible to realize adaptive quantization and improve subjective image quality of the image compressed information being an output by performing a pseudo process for each block by using the values of the $QP_{00}$ to $QP_{33}$.

[Image Coding Apparatus]

Figure 29:
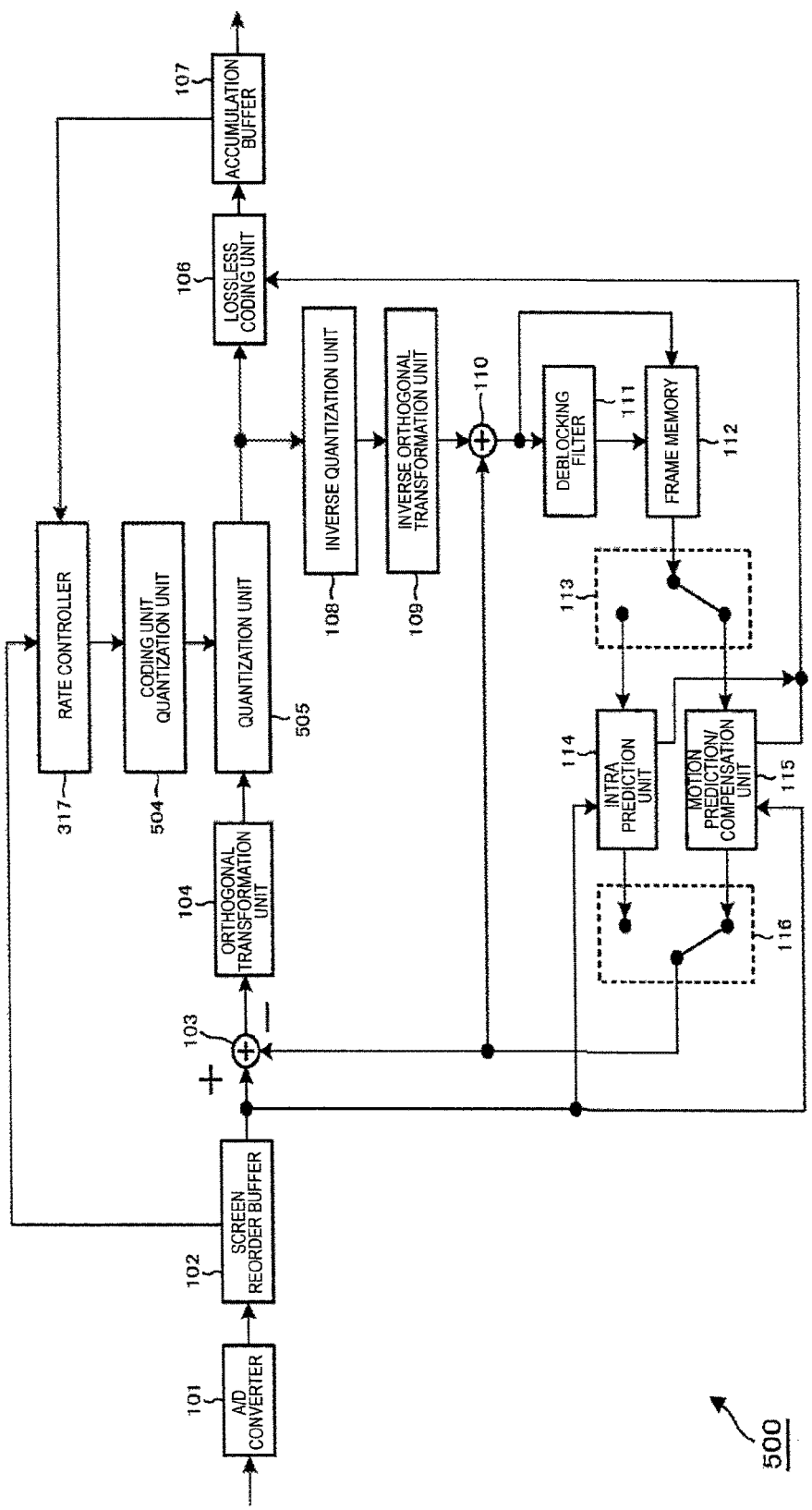
FIG. 29 is a block diagram illustrating still another configuration example of the image coding apparatus to which the present technology is applied.

FIG. 29 is a block diagram illustrating a principal configuration example of the image coding apparatus to which the present technology is applied. As illustrated in FIG. 29, an image coding apparatus 500 in this case has a configuration basically similar to that of an image coding apparatus 100 in FIG. 1 and performs a similar process.

However, the image coding apparatus 500 includes a rate controller 317, a coding unit quantization unit 504, and a quantization unit 505 in place of a quantization unit 105, a rate controller 117, and a sub macroblock quantization unit 121 of the image coding apparatus 100.

Although the image coding apparatus 100 in FIG. 1 includes a sub macroblock inverse quantization unit 122 in addition to an inverse quantization unit 108, the image coding apparatus 500 only includes the inverse quantization unit 108. That is, an inverse quantization process is performed for each LCU (macroblock) as in conventional AVC and the like. This also applies to the image decoding apparatus corresponding to the image coding apparatus 500.

The coding unit quantization unit 504 performs the quantization for each coding unit (for example, SCU) by using the activity for each coding unit obtained by the rate controller 317.

The quantization unit 505 obtains the quantization parameter for each LCU and performs the quantization for each coding unit by using the same. Then, the quantization unit 505 replaces the non-zero coefficient out of quantized orthogonal transform coefficients of the coding units obtained by the coding unit quantization unit 504 with a result of the quantization process by the quantization unit 505 (quantized orthogonal transform coefficient) in the same position.

A result of this replacement is supplied to the lossless coding unit 106 and the inverse quantization unit 108 as a result of the quantization. Also, the quantization parameter for each LCU calculated by the quantization unit 505 is supplied to the lossless coding unit 106 and the inverse quantization unit 108.

The inverse quantization unit 108 and an inverse quantization unit of the image decoding apparatus (not illustrated) perform inverse quantization by using the quantization parameter for each LCU as in the case of the conventional AVC and the like.

[Configurations of Rate Controller, Coding Unit Quantization Unit, and Quantization Unit]

Figure 30:
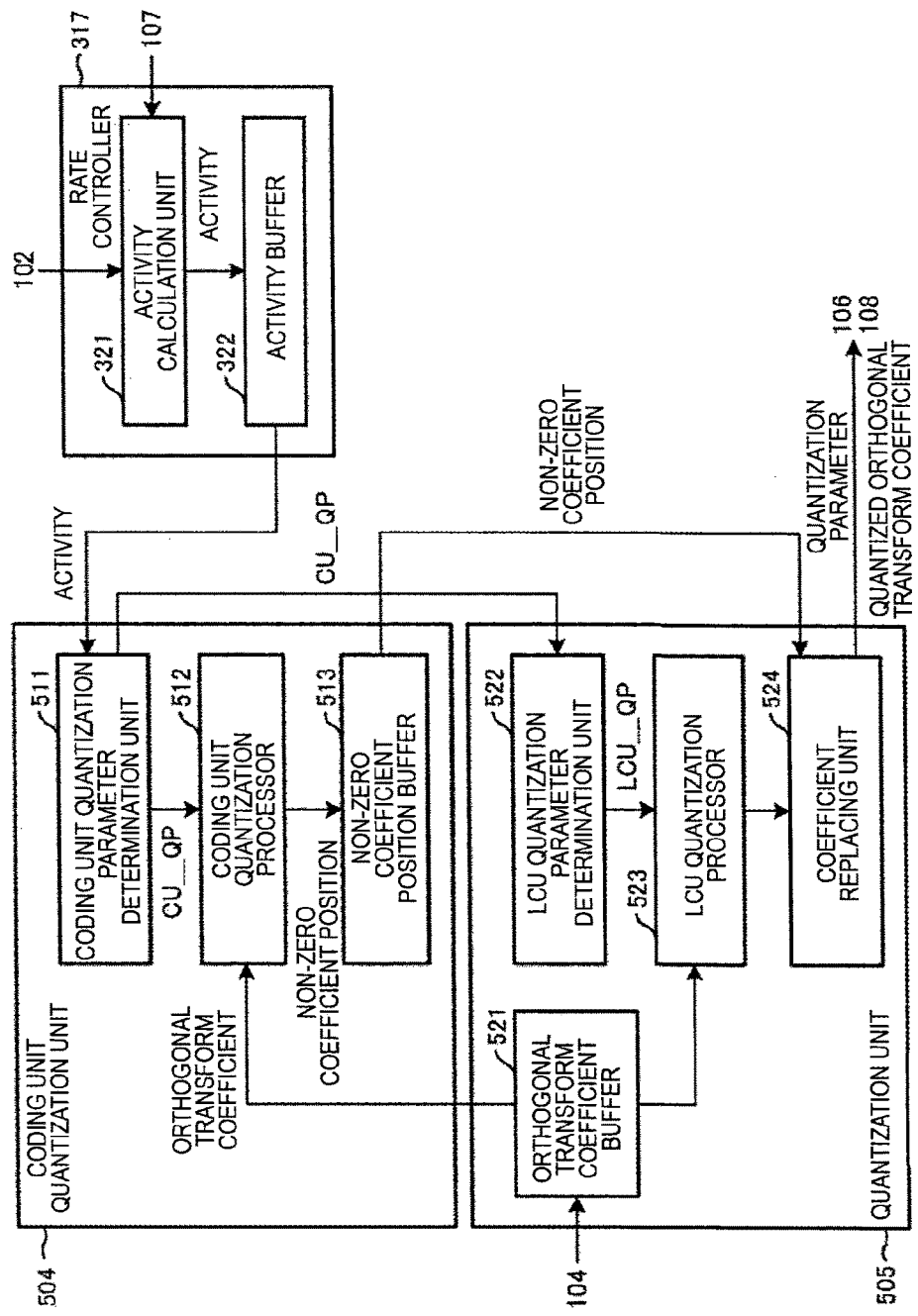
FIG. 30 is a block diagram illustrating a detailed configuration example of the coding unit quantization unit, the quantization unit, and the rate controller.

FIG. 30 is a block diagram illustrating a detailed configuration example of the rate controller, the coding unit quantization unit, and the quantization unit in FIG. 29.

As illustrated in FIG. 30, the coding unit quantization unit 504 includes a coding unit quantization parameter determination unit 511, a coding unit quantization processor 512, and a non-zero coefficient position buffer 513.

The coding unit quantization parameter determination unit 511 determines a quantization parameter CU_QP for each coding unit (for example, SCU) in a layer lower than the LCU by using the activity for each coding unit (for example, SCU) in the layer lower than the LCU supplied from an activity buffer 322 of the rate controller 317. The coding unit quantization parameter determination unit 511 supplies the quantization parameter CU_QP for each coding unit to the coding unit quantization processor 512 and an LCU quantization parameter determination unit 522 of the quantization unit 505.

The coding unit quantization processor 512 quantizes the orthogonal transform coefficient supplied from an orthogonal transform coefficient buffer 521 of the quantization unit 505 for each coding unit (for example, SCU) in the layer lower than the LCU by using the quantization parameter CU_QP for each coding unit supplied from the coding unit quantization parameter determination unit 511. The coding unit quantization processor 512 supplies the position of the coding unit in which the value is not 0 (non-zero coefficient) out of the quantized orthogonal transform coefficients of the coding units obtained by the quantization to the non-zero coefficient position buffer 513 and allow the same to hold this position.

The non-zero coefficient position buffer 513 supplies the held position of the non-zero coefficient to a coefficient replacing unit 524 of the quantization unit 505 at a predetermined timing.

As illustrated in FIG. 30, the quantization unit 505 includes the orthogonal transform coefficient buffer 521, the LCU quantization parameter determination unit 522, an LCU quantization processor 523, and the coefficient replacing unit 524.

The orthogonal transform coefficient buffer 521 holds the orthogonal transform coefficient supplied from an orthogonal transformation unit 104 and supplies the held orthogonal transform coefficient to the coding unit quantization processor 512 and the LCU quantization processor 523 at a predetermined timing.

The LCU quantization parameter determination unit 522 determines a minimum value in the LCU of the quantization parameters CU_QP for each coding unit supplied from the coding unit quantization parameter determination unit 511 as a quantization parameter LCU_QP for each LCU as represented by the above-described equation (19). The LCU quantization parameter determination unit 522 supplies the quantization parameter LCU_QP (minimum value of CU_QP in the current LCU) for each LCU to the LCU quantization processor 523.

The LCU quantization processor 523 quantizes the orthogonal transform coefficient supplied from the orthogonal transform coefficient buffer 521 for each coding unit (for example, SCU) in the layer lower than the LCU by using the quantization parameter LCU_QP for each LCU supplied from the LCU quantization parameter determination unit 522. The LCU quantization processor 523 supplies the quantized orthogonal transform coefficient for each coding unit obtained by the quantization to the coefficient replacing unit 524.

The coefficient replacing unit 524 replaces the coefficient in the position different from the position of the non-zero coefficient supplied from the non-zero coefficient position buffer 513 out of the coefficients of which value is not 0 (non-zero coefficient) of the orthogonal transform coefficients quantized by the LCU quantization processor 523 with 0.

That is, the coefficient replacing unit 524 adopts a value of the result of the quantization as the quantized orthogonal transform coefficient only for the coding unit (in the layer lower than the LCU) in which the obtained value of the result of the quantization is not 0 in both of the quantization using the quantization parameter CU_QP determined for each coding unit in the layer lower than the LCU and the quantization using the quantization parameter LCU_QP determined for each LCU. On the other hand, the coefficient replacing unit 524 sets all the values of all of the quantized orthogonal transform coefficients to 0 for other coding units (in the layer lower than the LCU).

The coefficient replacing unit 524 supplies the quantized orthogonal transform coefficient of which value is appropriately replaced in this manner to the lossless coding unit 106 and the inverse quantization unit 108 together with the quantization parameter LCU_QP determined for each LCU.

The lossless coding unit 106 codes supplied coefficient data and quantization parameter to supply to the image decoding apparatus (capable of decoding coded data generated by the image coding apparatus 500) corresponding to the image coding apparatus 500. The image decoding apparatus performs the inverse quantization by using the quantization parameter LCU_QP for each LCU supplied from the image coding apparatus 500 as in the case of the conventional AVC and the like.

The inverse quantization unit 108 similarly inversely quantizes the coefficient data supplied from the coefficient replacing unit 524 by using the quantization parameter LCU_QP for each LCU supplied from the coefficient replacing unit 524.

Meanwhile, the inverse quantization unit 108 has a configuration basically similar to that of the inverse quantization unit 203 described with reference to FIG. 10. However, in the case of the inverse quantization unit 108, an inverse quantization processor 253 inversely quantizes the quantized orthogonal transform coefficient supplied from an orthogonal transform coefficient buffer 252 by using the quantization parameter (quantization parameter LCU_QP for each LCU) supplied from a quantization parameter buffer 251.

[Flow of Coding Process]

Next, an example of a flow of a coding process executed by the image coding apparatus 500 is described with reference to a flowchart in FIG. 31. In this case, each process of the coding process is performed in a manner basically similar to that in each process of the coding process described with reference to the flowchart in FIG. 7.

That is, processes at steps S701 to S704 are performed as the processes at steps S101 to S104 in FIG. 7. However, the quantization process at step S705 is performed in place of steps S105 and S106 in FIG. 7. Also, processes at steps S706 to S716 are performed as the processes at steps S106 to S117.

[Flow of Quantization Process]

Figure 31:
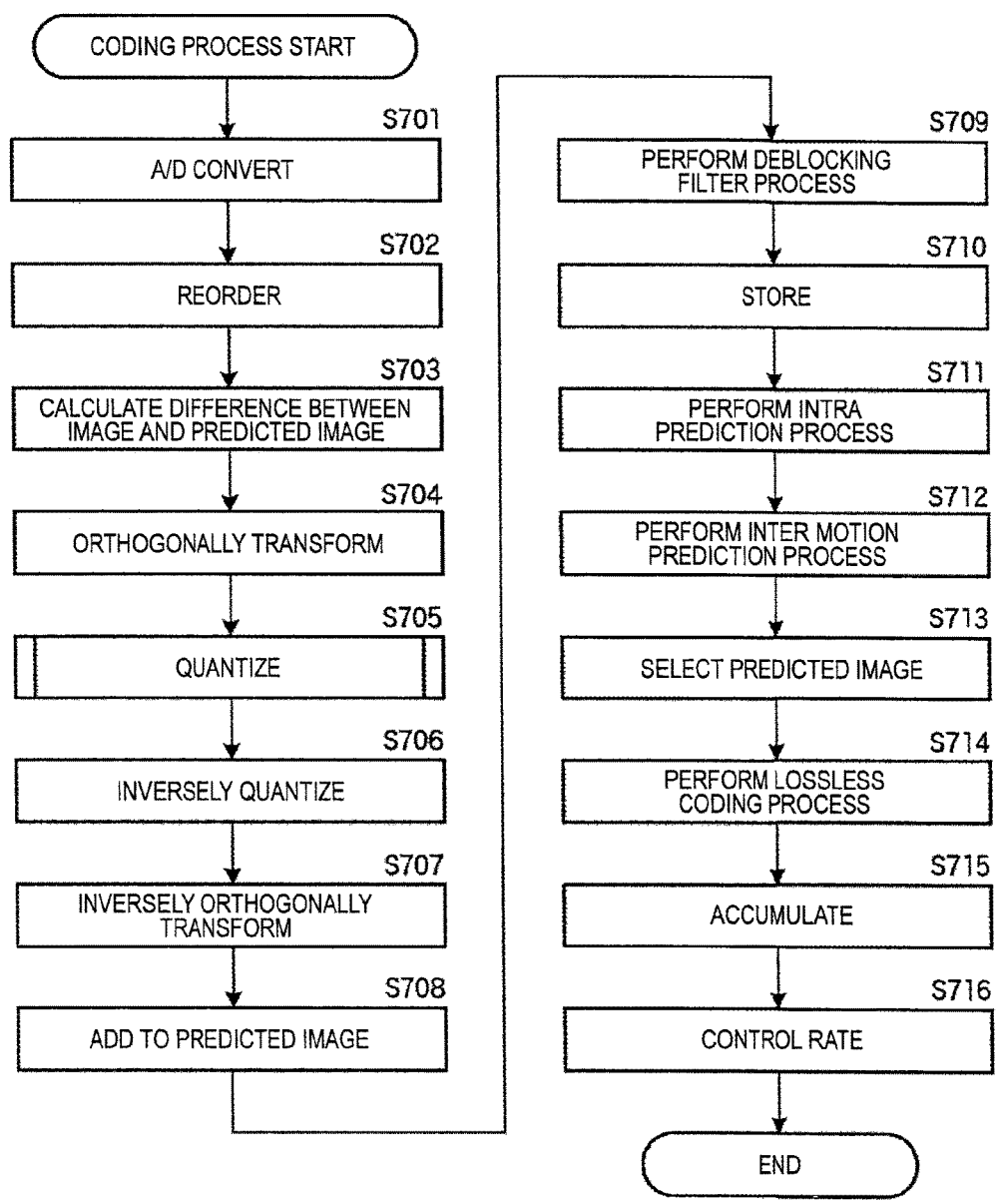
FIG. 31 is a flowchart illustrating another example of the flow of the coding process.
Figure 32:
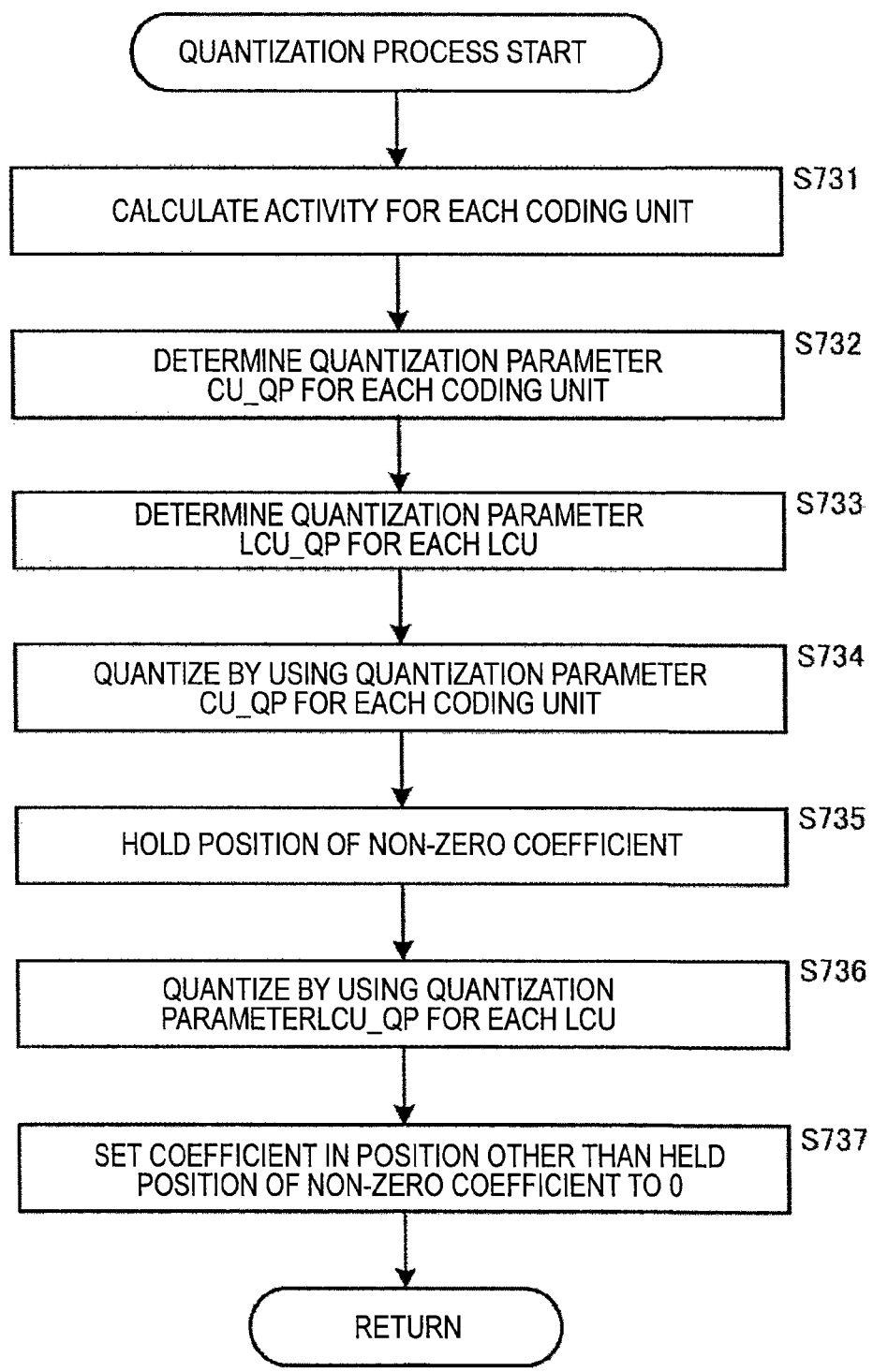
FIG. 32 is a flowchart illustrating an example of a flow of a quantization process.

Next, an example of a flow of the quantization process executed at step S705 in FIG. 31 is described with reference to a flowchart in FIG. 32.

When the quantization process is started, an activity calculation unit 321 calculates the activity for each coding unit at step S731.

At step S732, the coding unit quantization parameter determination unit 511 determines the quantization parameter CU_QP for each coding unit in the layer lower than the LCU.

At step S733, the LCU quantization parameter determination unit 522 determines the quantization parameter LCU_QP for each LCU.

At step S734, the coding unit quantization processor 512 performs the quantization by using the quantization parameter CU_QP for each coding unit in the layer lower than the LCU.

At step S735, the non-zero coefficient position buffer 513 holds the position of the non-zero coefficient generated by the quantization process at step S734.

At step S736, the LCU quantization processor 523 performs the quantization by using the quantization parameter LCU_QP for each LCU.

At step S737, the coefficient replacing unit 524 replaces the value of the quantized orthogonal transform coefficient of the coding unit in the layer lower than the LCU in the position different from the position of the non-zero coefficient held by the process at step S735 with 0.

When replacement is finished, the quantization process is finished and the process is returned to step S705 in FIG. 31, then the processes at step S706 and subsequent steps are executed.

As described above, in an image information coding apparatus and an image information decoding apparatus of which output and input are the image compressed information, respectively, based on a coding system using an extended macroblock, it is possible to perform the adaptive quantization based on characteristics of a flat area and a texture area even when they are mixed in a single LCU (macroblock) by performing the pseudo quantization process for each code unit (sub macroblock) in the layer lower than the LCU, thereby improving the subjective image quality.

<6. Sixth Embodiment>

[Application to Multi-View Image Coding/Multi-View Image Decoding]

Figure 33:
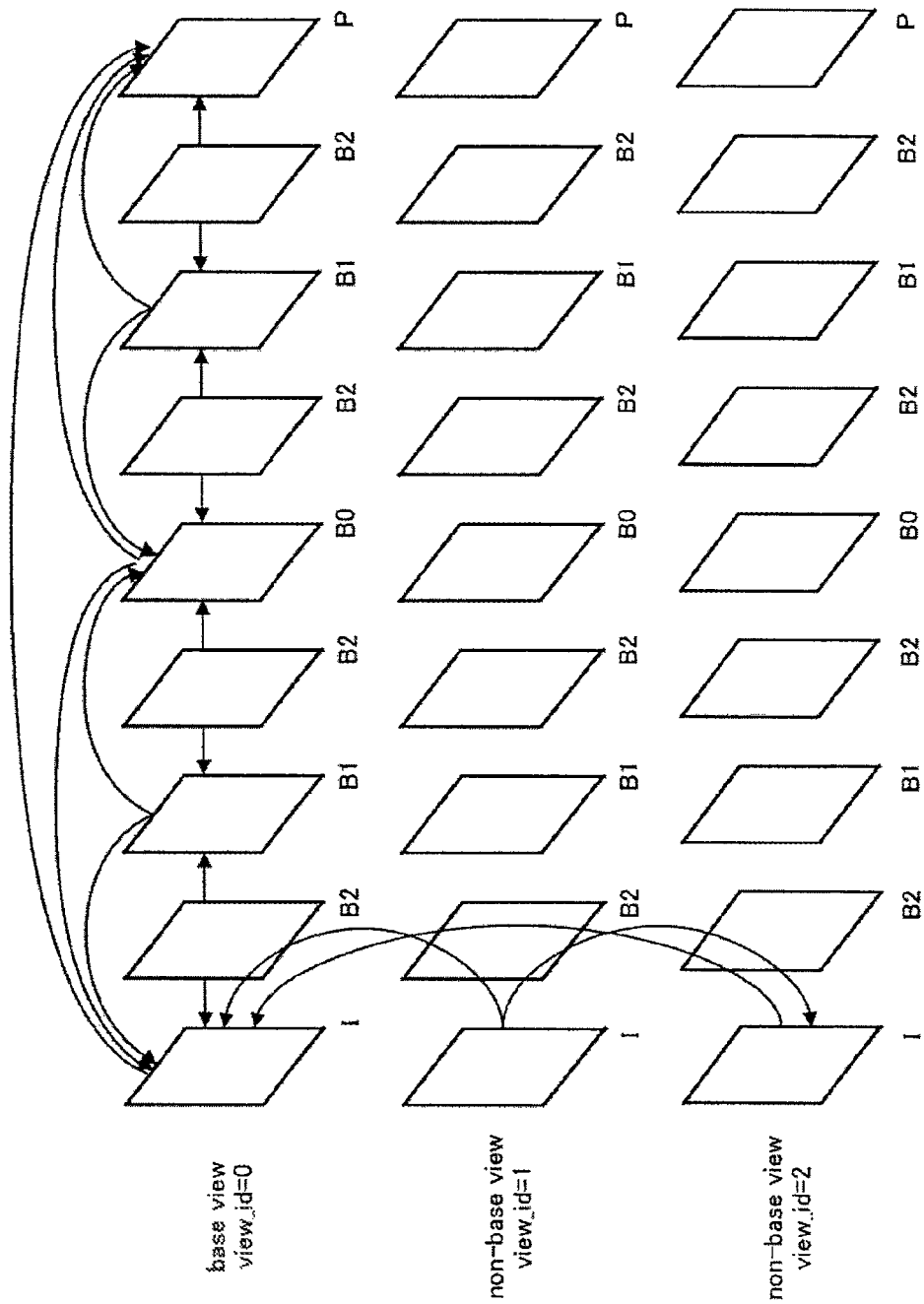
FIG. 33 is a view illustrating an example of a multi-view image coding system.

The above-described series of processes may be applied to multi-view image coding and multi-view image decoding. FIG. 33 illustrates an example of a multi-view image coding system.

As illustrated in FIG. 33, a multi-view image includes images from a plurality of viewpoints and an image from a predetermined viewpoint out of a plurality of viewpoints is specified as a base view image. An image from each viewpoint other than the base view image is treated as non-base view image.

When the multi-view image coding as illustrated in FIG. 33 is performed, it is also possible to obtain difference between quantization parameters of each view (identical view).

(1) base-view:
 (1-1) dQP(base view)=Current_CU_QP(base view)–LCU_QP(base view)
 (1-2) dQP(base view)=Current_CU_QP(base view)–Previous_CU_QP(base view)
 (1-3) dQP(base view)=Current_CU_QP(base view)–Slice_QP(base view)

(2) non-base-view:
 (2-1) dQP(non-base view)=Current_CU_QP(non-base view)–LCU_QP(non-base view)
 (2-2) dQP(non-base view)=CurrentQP(non-base view)–PrevisousQP(non-base view)
 (2-3) dQP(non-base view)=Current_CU_QP(non-base view)–Slice_QP(non-base view)

When the multi-view image coding is performed, it is also possible to obtain the difference between the quantization parameters for each view (different views).

(3) base-view/non-base view:
 (3-1) dQP(inter-view)=Slice_QP(base view)–Slice_QP(non-base view)
 (3-2) dQP(inter-view)=LCU_QP(base view)–LCU_QP(non-base view)

(4) non-base view/non-base view:
 (4-1) dQP(inter-view)=Slice_QP(non-base view i)–Slice_QP(non-base view j)
 (4-2) dQP(inter-view)=LCU_QP(non-base view i)–LCU_QP(non-base view j)

In this case, it is also possible to combine the above-described (1) to (4). For example, in the non-base view, a method of obtaining the difference between the quantization parameters in a slice level between the base view and the non-base view (3-1 and 2-3 are combined) and a method of obtaining the difference between the quantization parameters in an LCU level between the base view and the non-base view (3-2 and 2-1 are combined) are considered. In this manner, it is possible to improve coding efficiency also in a case where the multi-view coding is performed by repeatedly applying the difference.

As in the above-described method, it is also possible to set a flag to identify whether there is dQP of which value is not 0 for each dQP described above.

[Multi-View Image Coding Apparatus]

Figure 34:
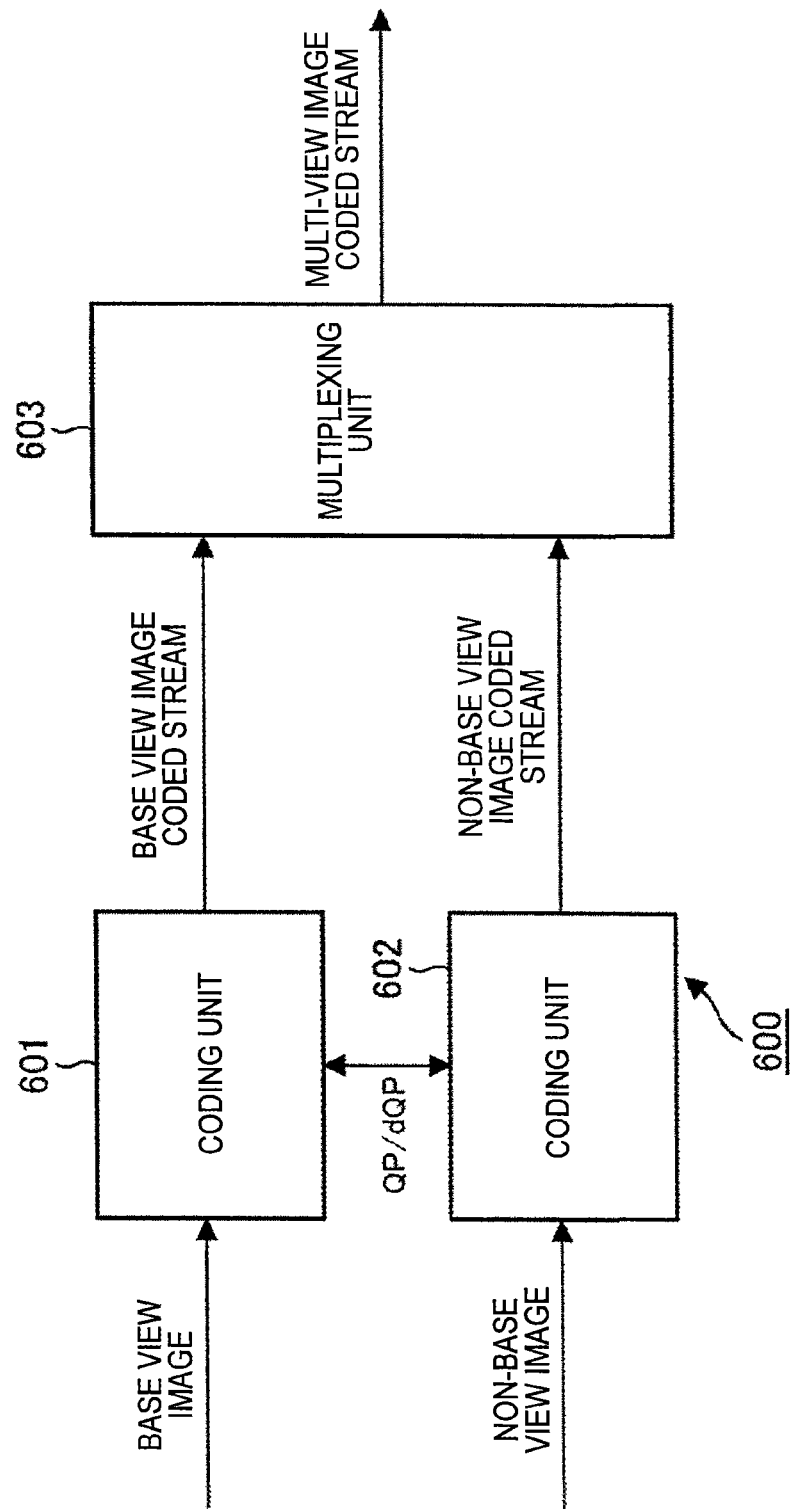
FIG. 34 is a view illustrating a principal configuration example of the multi-view image coding apparatus to which the present technology is applied.

FIG. 34 is a view illustrating a multi-view image coding apparatus, which performs the above-described multi-view image coding. As illustrated in FIG. 34, a multi-view image coding apparatus 600 includes a coding unit 601, a coding unit 602, and a multiplexing unit 603.

The coding unit 601 codes the base view image to generate a base view image coded stream. The coding unit 602 codes the non-base view image to generate a non-base view image coded stream. The multiplexing unit 603 multiplexes the base view image coded stream generated by the coding unit 601 and the non-base view image coded stream generated by the coding unit 602 to generate a multi-view image coded stream.

An image coding apparatus 100 (FIG. 1), an image coding apparatus 300 (FIG. 18), or an image coding apparatus 500 (FIG. 29) may be applied to the coding unit 601 and the coding unit 602 of the multi-view image coding apparatus 600. In this case, the multi-view image coding apparatus 600 sets a difference value between the quantization parameter set by the coding unit 601 and the quantization parameter set by the coding unit 602 to transmit.

[Multi-View Image Decoding Apparatus]

Figure 35:
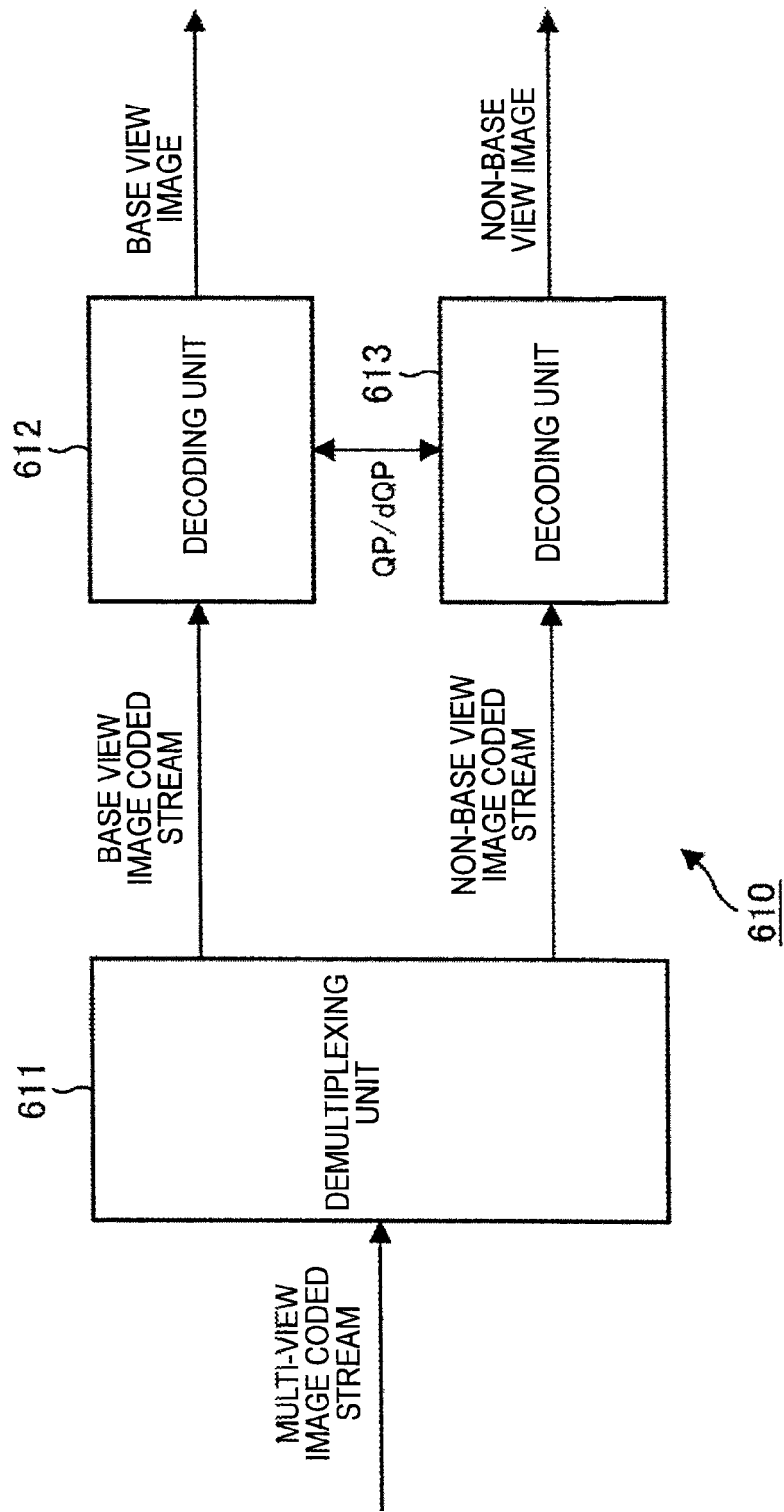
FIG. 35 is a view illustrating a principal configuration example of a multi-view image decoding apparatus to which the present technology is applied.

FIG. 35 is a view illustrating a multi-view image decoding apparatus, which performs the above-described multi-view image decoding. As illustrated in FIG. 35, a multi-view image decoding apparatus 610 includes a demultiplexing unit 611, a decoding unit 612, and a decoding unit 613.

The demultiplexing unit 611 demultiplexes the multi-view image coded stream in which the base view image coded stream and the non-base view image coded stream are multiplexed to extract the base view image coded stream and the non-base view image coded stream. The decoding unit 612 decodes the base view image coded stream extracted by the demultiplexing unit 611 to obtain the base view image. The decoding unit 613 decodes the non-base view image coded stream extracted by the demultiplexing unit 611 to obtain the non-base view image.

It is possible to apply an image decoding apparatus 200 (FIG. 9) or an image decoding apparatus 400 (FIG. 21) to the decoding unit 612 and the decoding unit 613 of the multi-view image decoding apparatus 610. In this case, the multi-view image decoding apparatus 610 sets the quantization parameter from the difference value between the quantization parameter set by the coding unit 601 and the quantization parameter set by the coding unit 602 to perform inverse quantization.

<7. Seventh Embodiment>

[Application to Hierarchical Image Point Coding/Hierarchical Image Decoding]

Figure 36:
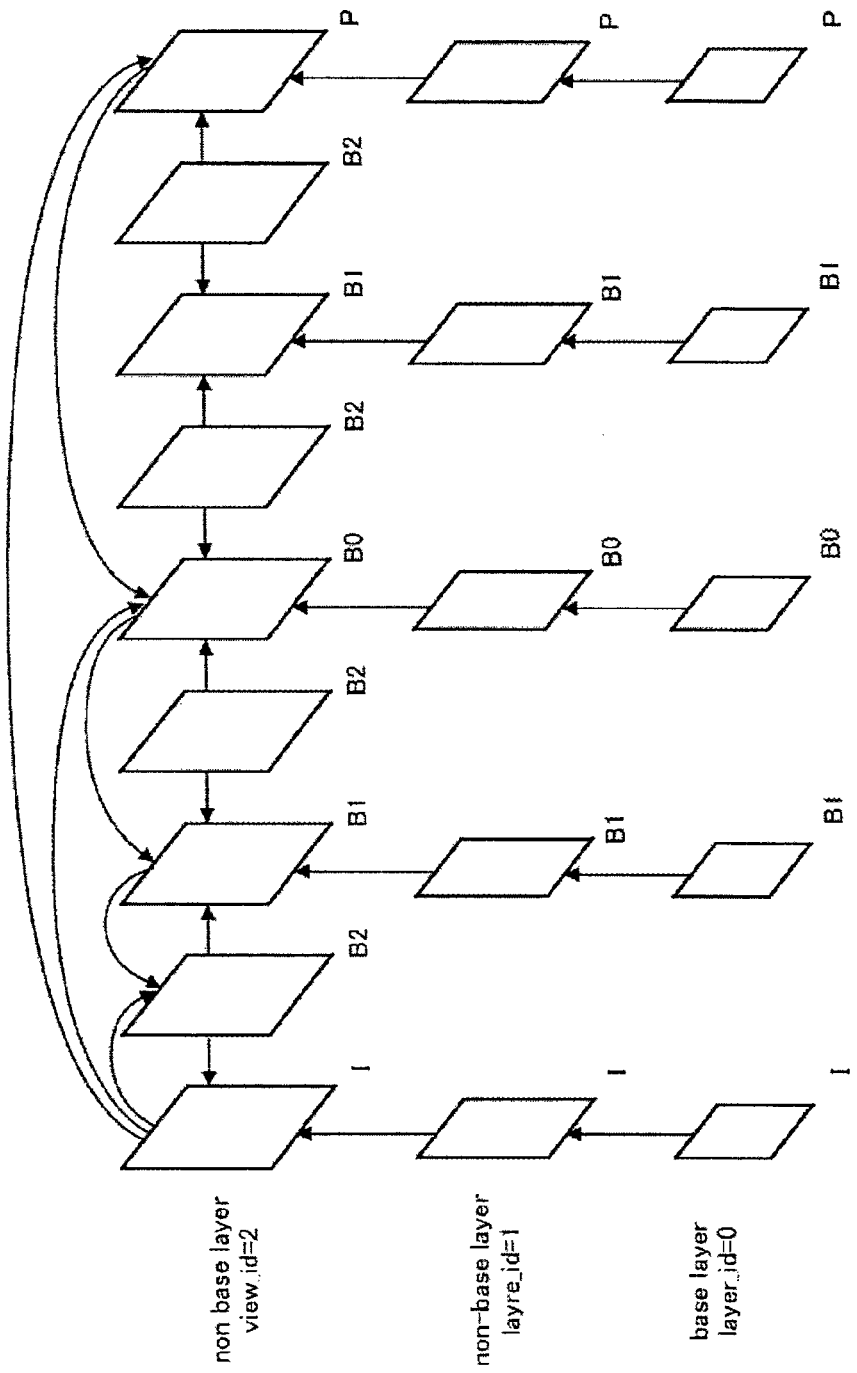
FIG. 36 is a view illustrating an example of a hierarchical image coding system.

The above-described series of processes may be applied to hierarchical image coding/hierarchical image decoding. FIG. 36 illustrates an example of a multi-view image coding system.

As illustrated in FIG. 36, a hierarchical image includes images of a plurality of layers (resolutions) and an image of a predetermined layer out of a plurality of resolutions is specified as a base layer image. An image of each layer other than the base layer image is treated as a non-base layer image.

When the hierarchical image coding (spatial scalability) as illustrated in FIG. 36 is performed, it is also possible to obtain difference between quantization parameters of each layer (identical layer):

(1) base-layer:
 (1-1) dQP(base layer)=Current_CU_QP(base layer)–LCU_QP(base layer)
 (1-2) dQP(base layer)=Current_CU_QP(base layer)–Previous_CU_QP(base layer)
 (1-3) dQP(base layer)=Current_CU_QP(base layer)–Slice_QP(base layer)

(2) non-base-layer:
 (2-1) dQP(non-base layer)=Current_CU_QP(non-base layer)–LCU_QP(non-base layer)
 (2-2) dQP(non-base layer)=CurrentQP(non-base layer)–PrevisousQP(non-base layer)

(2-3) dQP(non-base layer)=Current_CU_QP(non-base layer)−Slice_QP(non-base layer)

When the hierarchical coding is performed, it is also possible to obtain the difference between the quantization parameters of each layer (different layers).

(3) base-layer/non-base layer:

(3-1) dQP(inter-layer)=Slice_QP(base layer)−Slice_QP(non-base layer)

(3-2) dQP(inter-layer)=LCU_QP(base layer)−LCU_QP(non-base layer)

(4) non-base layer/non-base layer:

(4-1) dQP(inter-layer)=Slice_QP(non-base layer i)−Slice_QP(non-base layer j)

(4-2) dQP(inter-layer)=LCU_QP(non-base layer i)−LCU_QP(non-base layer j)

In this case, it is also possible to combine the above-described (1) to (4). For example, in the non-base layer, a method of obtaining the difference between the quantization parameters in a slice level between the base layer and the non-base layer (3-1 and 2-3 are combined) and a method of obtaining the difference between the quantization parameters in an LCU level between the base layer and the non-base layer (3-2 and 2-1 are combined) are considered. In this manner, by repeatedly applying the difference, it becomes possible to improve coding efficiency also when the hierarchical coding is performed.

It is also possible to set a flag to identify whether there is dQP of which value is not 0 for each dQP described above as in the above-described method.

[Hierarchical Image Coding Apparatus]

Figure 37:
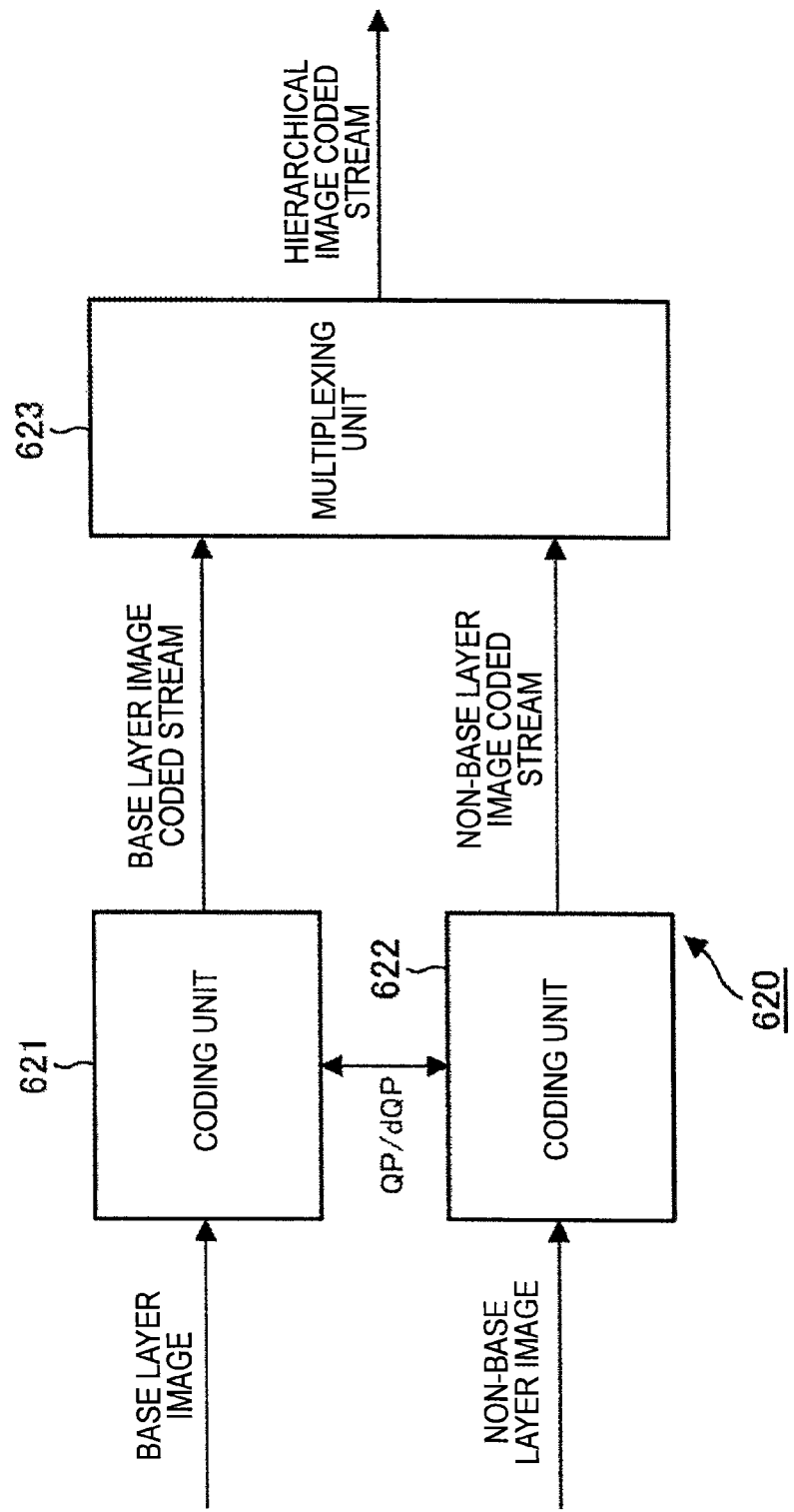
FIG. 37 is a view illustrating a principal configuration example of a hierarchical image coding apparatus to which the present technology is applied.

FIG. 37 is a view illustrating a hierarchical image coding apparatus, which performs the above-described hierarchical image coding. As illustrated in FIG. 37, a hierarchical image coding apparatus 620 includes a coding unit 621, a coding unit 622, and a multiplexing unit 623.

The coding unit 621 codes the base layer image to generate a base layer image coded stream. The coding unit 622 codes the non-base layer image to generate a non-base layer image coded stream. The multiplexing unit 623 multiplexes the base layer image coded stream generated by the coding unit 621 and the non-base layer image coded stream generated by the coding unit 622 to generate a hierarchical image coded stream.

An image coding apparatus 100 (FIG. 1), an image coding apparatus 300 (FIG. 18), or an image coding apparatus 500 (FIG. 29) may be applied to the coding unit 621 and the coding unit 622 of the hierarchical image coding apparatus 620. In this case, the hierarchical image coding apparatus 600 sets a difference value between the quantization parameter set by the coding unit 621 and the quantization parameter set by the coding unit 622 to transmit.

[Hierarchical Image Decoding Apparatus]

Figure 38:
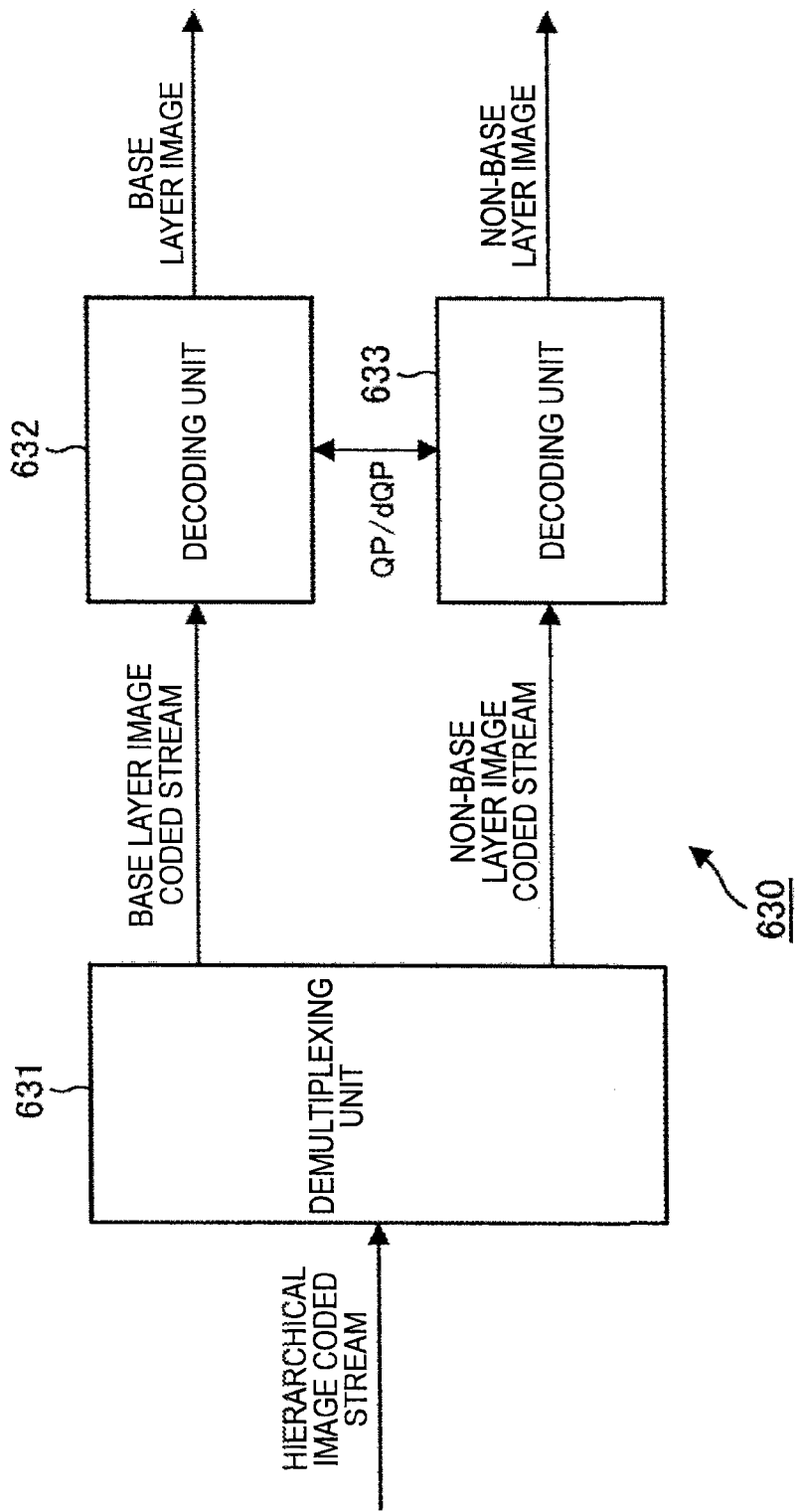
FIG. 38 is a view illustrating a principal configuration example of a hierarchical image decoding apparatus to which the present technology is applied.

FIG. 38 is a view illustrating a hierarchical image decoding apparatus, which performs the above-described hierarchical image decoding. As illustrated in FIG. 38, a hierarchical image decoding apparatus 630 includes a demultiplexing unit 631, a decoding unit 632, and a decoding unit 633.

The demultiplexing unit 631 demultiplexes the hierarchical image coded stream obtained by multiplexing the base layer image coded stream and the non-base layer image coded stream to extract the base layer image coded stream and the non-base layer image coded stream. The decoding unit 632 decodes the base layer image coded stream extracted by the demultiplexing unit 631 to obtain the base layer image. The decoding unit 633 decodes the non-base layer image coded stream extracted by the demultiplexing unit 631 to obtain the non-base layer image.

An image decoding apparatus 200 (FIG. 9) or an image decoding apparatus 400 (FIG. 21) may be applied to the decoding unit 632 and the decoding unit 633 of the hierarchical image decoding apparatus 630. In this case, the hierarchical image decoding apparatus 630 sets the quantization parameter from the difference value between the quantization parameter set by the coding unit 631 and the quantization parameter set by the coding unit 632 to perform inverse quantization.

<8. Eighth Embodiment>

[Computer]

It is possible that the above-described series of processes is executed by hardware or executed by software. In this case, it may be configured as a computer illustrated in FIG. 39, for example.

Figure 39:
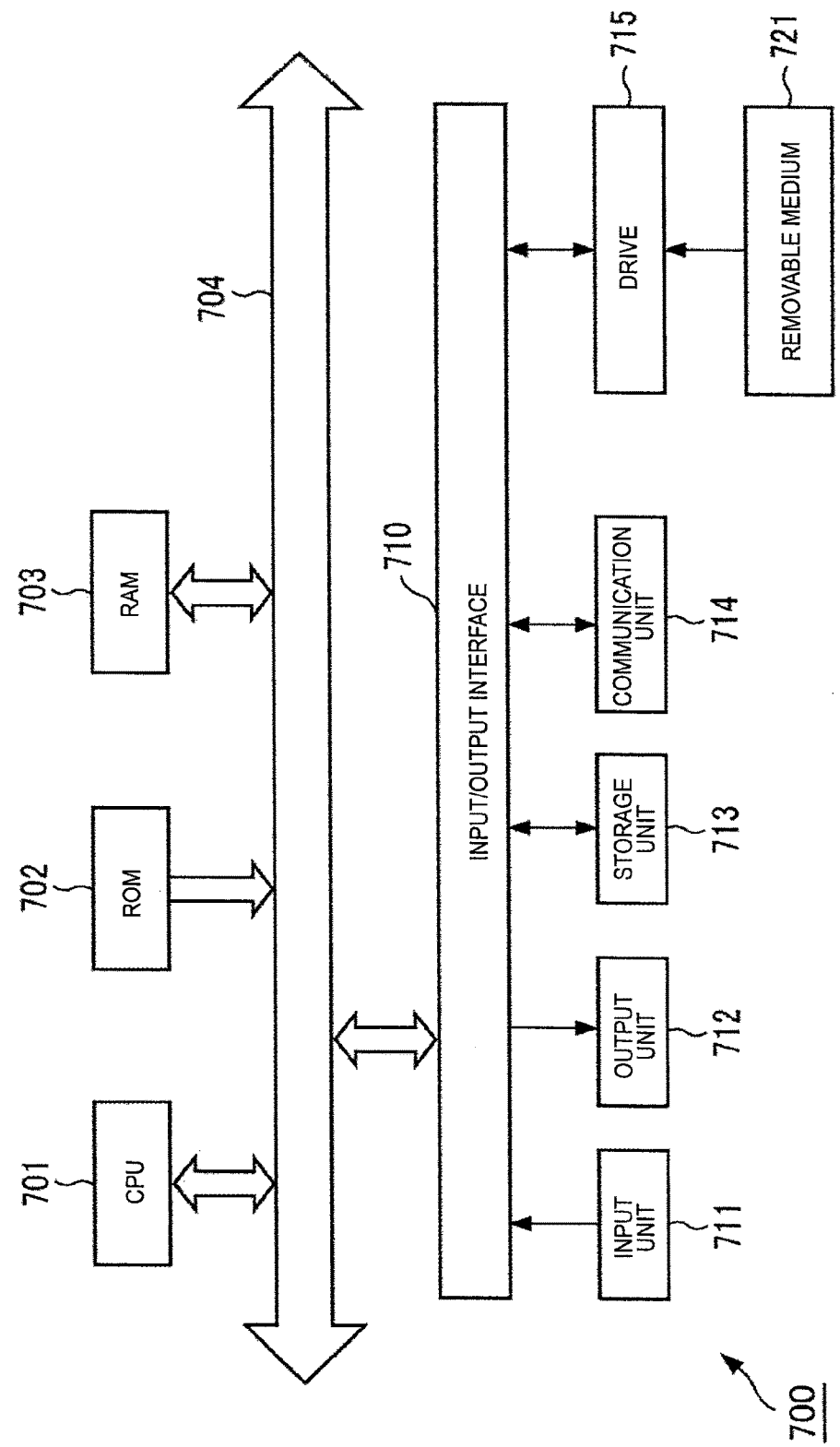
FIG. 39 is a block diagram illustrating a principal configuration example of a computer to which the present technology is applied.

In FIG. 39, a CPU (Central Processing Unit) 701 of a personal computer 700 executes various processes according to a program stored in a ROM (Read Only Memory) 702 or a program loaded from a storage unit 713 into a RAM (Random Access Memory) 703. Data necessary for the CPU 701 to execute the various processes also are appropriately stored in the RAM 703.

The CPU 701, the ROM 702, and the RAM 703 are connected to one another through a bus 704. An input/output interface 710 also is connected to the bus 704.

An input unit 711 formed of a keyboard, a mouse and the like, an output unit 712 formed of a display formed of a CRT (Cathode Ray Tube) and an LCD (Liquid Crystal Display), a speaker and the like, the storage unit 713 formed of a hard disc and the like, and a communication unit 714 formed of a modem and the like are connected to the input/output interface 710. The communication unit 714 performs a communication process through a network including the Internet.

A drive 715 is connected to the input/output interface 710 as needed, a removable medium 721 such as a magnetic disc, an optical disc, a magnetooptical disc, and a semiconductor memory is appropriately mounted thereon, and a computer program read from the medium is installed on the storage unit 713 as needed.

When the above-described series of processes is executed by the software, a program, which composes the software, is installed from the network or a recording medium.

The recording medium is composed not only of the removable medium 721 including the magnetic disc (including a flexible disc), the optical disc (including a CD-ROM (Compact Disc-Read Only Memory) and a DVD (Digital Versatile Disc)), the magnetooptical disc (including an MD (Mini Disc)), and the semiconductor memory, in which the program is recorded, distributed to a user for distributing the program separately from an apparatus main body but also of the ROM 702 in which the program is recorded and the hard disc included in the storage unit 713 distributed to the user in a state being embedded in advance in the apparatus main body as illustrated in FIG. 39, for example.

Meanwhile, the program executed by the computer may be the program of which processes are chronologically performed in order described in this specification or the program of which processes are performed in parallel or at a required timing such as when this is called.

Also, in this specification, a step of describing the program recorded in the recording medium includes not only the processes chronologically performed in the described order but also the processes executed in parallel or individually, which are not necessarily chronologically performed.

Also, in this specification, a system means an entire apparatus including a plurality of devices (apparatus).

It is also possible to divide the configuration described above as one apparatus (or processor) into a plurality of apparatuses (or processors). Other way round, it is also possible to put the configurations described above as a plurality of apparatuses (or processors) together as one apparatus (or processor). It goes without saying that a configuration other than the above-described one may be added to the configuration of each apparatus (or each processor). Further, it is also possible to add a part of the configuration of a certain apparatus (or processor) to the configuration of another apparatus (or another processor) as long as the configuration and operation as an entire system are substantially the same. That is, an embodiment of the present technology is not limited to the above-described embodiments and various modifications may be made without departing from the spirit of the present technology.

An image coding apparatus 100 (FIG. 1), an image coding apparatus 300 (FIG. 18), an image coding apparatus 500 (FIG. 29), a multi-view image coding apparatus 600 (FIG. 34), a hierarchical image coding apparatus 620 (FIG. 37), an image decoding apparatus 200 (FIG. 9), an image decoding apparatus 400 (FIG. 21), a multi-view image decoding apparatus 610 (FIG. 35), and a hierarchical image decoding apparatus 630 (FIG. 38) according to the above-described embodiments are applicable to various electronic devices such as a transmitter or a receiver in satellite broadcasting, cable broadcasting to a cable television and the like, distribution on the Internet, distribution to a terminal through cellular communication and the like, a recording apparatus, which records an image on the medium such as the optical disc, the magnetic disc, and a flash memory, or a reproducing apparatus, which reproduces the image from a storage medium. Four applications are hereinafter described.

[Television Apparatus]

Figure 40:
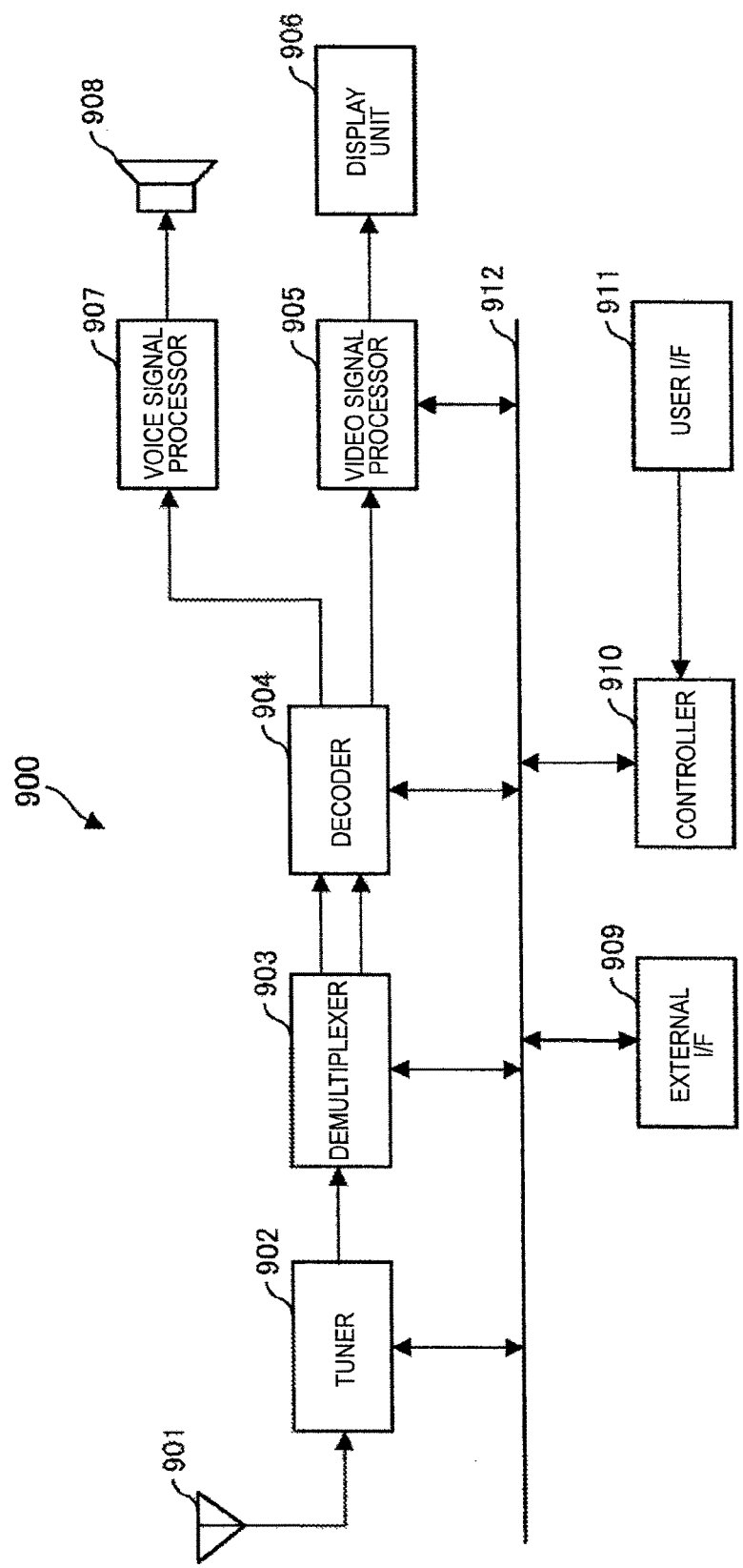
FIG. 40 is a block diagram illustrating a principal configuration example of a television apparatus to which the present technology is applied.

FIG. 40 illustrates an example of a schematic configuration of a television apparatus to which the above-described embodiment is applied. A television apparatus 900 includes an antenna 901, a tuner 902, a demultiplexer 903, a decoder 904, a video signal processor 905, a display unit 906, a voice signal processor 907, a speaker 908, an external interface 909, a controller 910, a user interface 911, and a bus 912.

The tuner 902 extracts a signal of a desired channel from a broadcast signal received through the antenna 901 and demodulates the extracted signal. Then, the tuner 902 outputs a coded bit stream obtained by demodulation to the demultiplexer 903. That is, the tuner 902 serves as transmitting means in the television apparatus 900, which receives the coded stream in which the image is coded.

The demultiplexer 903 separates a video stream and a voice stream of a program to be watched from the coded bit stream and outputs each separated stream to the decoder 904.

Also, the demultiplexer 903 extracts auxiliary data such as EPG (Electronic Program Guide) from the coded bit stream and supplies the extracted data to the controller 910. Meanwhile, the demultiplexer 903 may descramble when the coded bit stream is scrambled.

The decoder 904 decodes the video stream and the voice stream input from the demultiplexer 903. Then, the decoder 904 outputs video data generated by a decoding process to the video signal processor 905. Also, the decoder 904 outputs voice data generated by the decoding process to the voice signal processor 907.

The video signal processor 905 reproduces the video data input from the decoder 904 and allows the display unit 906 to display video. The video signal processor 905 may also allow the display unit 906 to display an application screen supplied through the network. The video signal processor 905 may also perform an additional process such as noise removal, for example, to the video data according to setting. Further, the video signal processor 905 may generate a GUI (Graphical User Interface) image such as a menu, a button, and a cursor, for example, and superimpose the generated image on an output image.

The display unit 906 is driven by a drive signal supplied from the video signal processor 905 to display the video or image on a video screen of a display device (for example, a liquid crystal display, a plasma display, an OELD (Organic ElectroLuminescence Display (organic EL display) and the like).

The voice signal processor 907 performs a reproducing process such as D/A conversion and amplification to the voice data input from the decoder 904 and allows the speaker 908 to output the voice. The voice signal processor 907 may also perform an additional process such as the noise removal to the voice data.

The external interface 909 is the interface for connecting the television apparatus 900 and an external device or the network. For example, the video stream or the voice stream received through the external interface 909 may be decoded by the decoder 904. That is, the external interface 909 also serves as the transmitting means in the television apparatus 900, which receives the coded stream in which the image is coded.

The controller 910 includes a processor such as the CPU and a memory such as the RAM and the ROM. The memory stores the program executed by the CPU, program data, the EPG data, data obtained through the network and the like. The program stored in the memory is read by the CPU at startup of the television apparatus 900 to be executed, for example. The CPU controls operation of the television apparatus 900 according to an operation signal input from the user interface 911, for example, by executing the program.

The user interface 911 is connected to the controller 910. The user interface 911 includes a button and a switch for the user to operate the television apparatus 900, a receiver of a remote control signal and the like, for example. The user interface 911 detects operation by the user through the components to generate the operation signal and outputs the generated operation signal to the controller 910.

The bus 912 connects the tuner 902, the demultiplexer 903, the decoder 904, the video signal processor 905, the voice signal processor 907, the external interface 909, and the controller 910 to one another.

In the television apparatus 900 configured in this manner, the decoder 904 has functions of the image decoding apparatus 200 (FIG. 9), the image decoding apparatus 400 (FIG. 21), the multi-view image decoding apparatus 610 (FIG. 35), or the hierarchical image decoding apparatus 630 (FIG. 38) according to the above-described embodiments. Therefore, the decoder 904 calculates a quantization value for each sub macroblock by using a quantization parameter such as submb_qp_delta supplied from a coding side to perform inverse quantization for the video decoded by the television apparatus 900. Therefore, it is possible to perform an inverse quantization process more suitable for contents of the image, thereby inhibiting subjective image quality of a decoded image from deteriorating.

[Mobile Phone]

Figure 41:
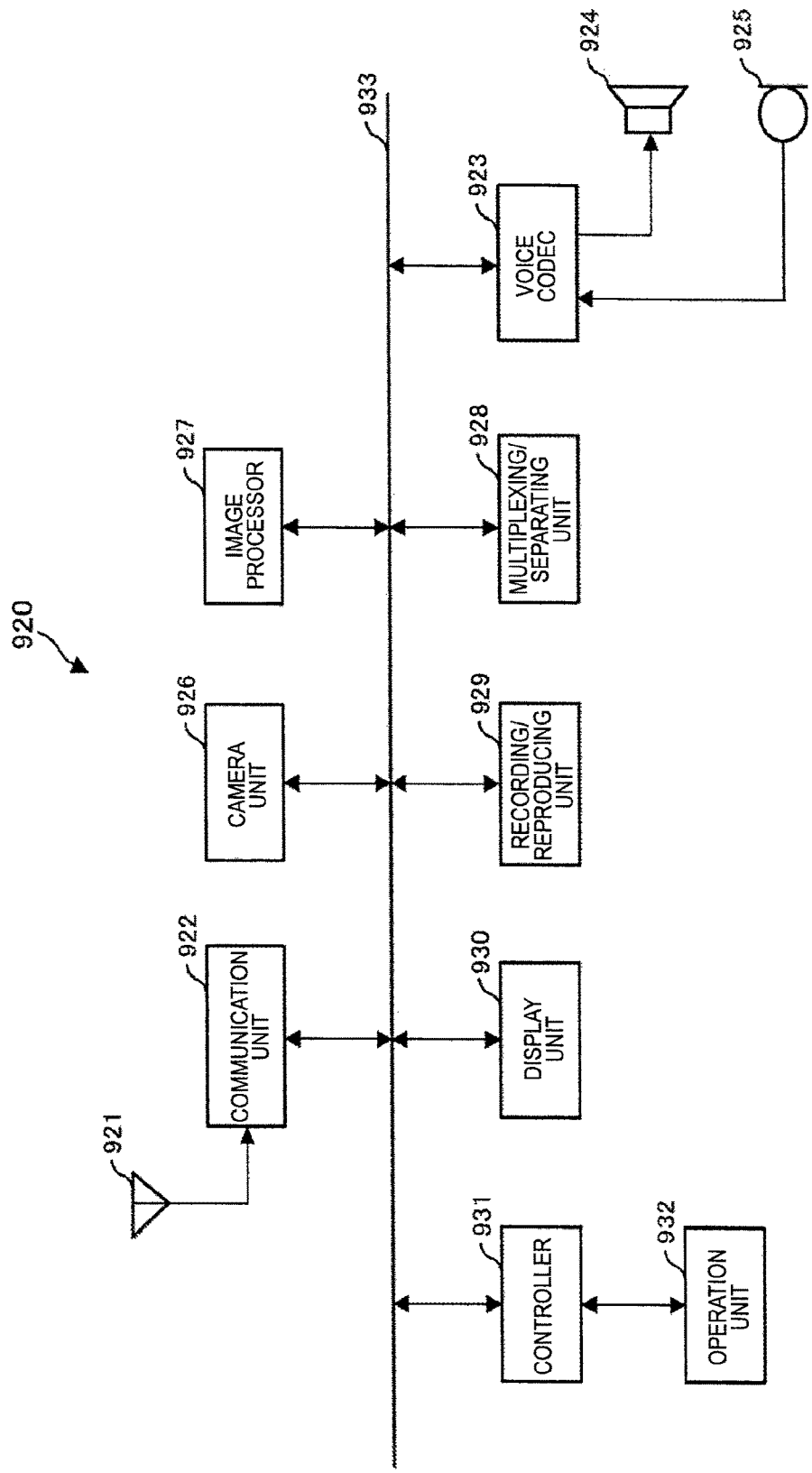
FIG. 41 is a block diagram illustrating a principal configuration example of a mobile terminal to which the present technology is applied.

FIG. 41 illustrates an example of a schematic configuration of a mobile phone to which the above-described embodiment is applied. A mobile phone 920 is provided with an antenna 921, a communication unit 922, a voice codec 923, a speaker 924, a microphone 925, a camera unit 926, an image processor 927, a multiplexing/separating unit 928, a recording/reproducing unit 929, a display unit 930, a controller 931, an operation unit 932, and a bus 933.

The antenna 921 is connected to the communication unit 922. The speaker 924 and the microphone 925 are connected to the voice codec 923. The operation unit 932 is connected to the controller 931. The bus 933 connects the communication unit 922, the voice codec 923, the camera unit 926, the image processor 927, the multiplexing/separating unit 928, the recording/reproducing unit 929, the display unit 930, and the controller 931 to one another.

The mobile phone 920 performs operation such as transmission/reception of a voice signal, transmission/reception of an e-mail or image data, image taking, and recording of data in various operation modes including a voice communication mode, a data communication mode, an imaging mode, and a television-phone mode.

In the voice communication mode, an analog voice signal generated by the microphone 925 is supplied to the voice codec 923. The voice codec 923 converts the analog voice signal to the voice data and A/D converts the converted voice data to compress. Then, the voice codec 923 outputs the compressed voice data to the communication unit 922. The communication unit 922 codes and modulates the voice data to generate a transmission signal. Then, the communication unit 922 transmits the generated transmission signal to a base station (not illustrated) through the antenna 921. Also, the communication unit 922 amplifies a wireless signal received through the antenna 921 and applies frequency conversion to the same to obtain a reception signal. Then, the communication unit 922 generates the voice data by demodulating and decoding the reception signal and outputs the generated voice data to the voice codec 923. The voice codec 923 expands the voice data and D/A converts the same to generate the analog voice signal. Then, the voice codec 923 supplies the generated voice signal to the speaker 924 to allow the same to output the voice.

In the data communication mode, for example, the controller 931 generates character data composing the e-mail according to the operation by the user through the operation unit 932. Also, the controller 931 allows the display unit 930 to display characters. The controller 931 generates e-mail data according to a transmission instruction from the user through the operation unit 932 to output the generated e-mail data to the communication unit 922. The communication unit 922 codes and modulates the e-mail data to generate the transmission signal. Then, the communication unit 922 transmits the generated transmission signal to the base station (not illustrated) through the antenna 921. Also, the communication unit 922 amplifies the wireless signal received through the antenna 921 and applies the frequency conversion to the same to obtain the reception signal. Then, the communication unit 922 demodulates and decodes the reception signal to restore the e-mail data and outputs the restored e-mail data to the controller 931. The controller 931 allows the display unit 930 to display contents of the e-mail data and allows the storage medium of the recording/reproducing unit 929 to store the e-mail data.

The recording/reproducing unit 929 includes an arbitrary readable/writable storage medium. For example, the storage medium may be a built-in storage medium such as the RAM and the flash memory and may be an externally-mounted storage medium such as the hard disc, the magnetic disc, the magnetooptical disc, the optical disc, a USB memory, and a memory card.

In the imaging mode, for example, the camera unit 926 takes an image of an object to generate the image data and outputs the generated image data to the image processor 927. The image processor 927 codes the image data input from the camera unit 926 and stores the coded stream in the storage medium of the recording/reproducing unit 929.

Also, in the television-phone mode, for example, the multiplexing/separating unit 928 multiplexes the video stream coded by the image processor 927 and the voice stream input from the voice codec 923 and outputs the multiplexed stream to the communication unit 922. The communication unit 922 codes and modulates the stream to generate the transmission signal. Then, the communication unit 922 transmits the generated transmission signal to the base station (not illustrated) through the antenna 921. Also, the communication unit 922 amplifies the wireless signal received through the antenna 921 and applies the frequency conversion to the same to obtain the reception signal. The transmission signal and the reception signal may include the coded bit stream. Then, the communication unit 922 restores the stream by demodulating and decoding the reception signal and outputs the restored stream to the multiplexing/separating unit 928. The multiplexing/separating unit 928 separates the video stream and the voice stream from the input stream and outputs the video stream and the voice stream to the image processor 927 and the voice codec 923, respectively. The image processor 927 decodes the video stream to generate the video data. The video data is supplied to the display unit 930 and a series of images is displayed by the display unit 930. The voice codec 923 expands the voice stream and D/A converts the same to generate the analog voice signal. Then, the voice codec 923 supplies the generated voice signal to the speaker 924 to output the voice.

In the mobile phone 920 configured in this manner, the image processor 927 has the functions of the image coding apparatus 100 (FIG. 1), the image coding apparatus 300 (FIG. 18), the image coding apparatus 500 (FIG. 29), the multi-view image coding apparatus 600 (FIG. 34), or the hierarchical image coding apparatus 620 (FIG. 37) and the functions of the image decoding apparatus 200 (FIG. 9), the image decoding apparatus 400 (FIG. 21), the multi-view image decoding apparatus 610 (FIG. 35), or the hierarchical image decoding apparatus 630 (FIG. 38) according to the above-described embodiments. Therefore, the image processor 927 calculates the quantization value for each sub macroblock and quantizes an orthogonal transform coefficient by using the quantization value for each sub macroblock for the video coded and decoded by the mobile phone 920. In this manner, it is possible to perform the quantization process more suitable for the contents of the image and generate the coded data so as to inhibit the subjective image quality of the decoded image from deteriorating. Also, the image processor 927 calculates the quantization value for each sub macroblock by using the quantization parameter such as submb_qp_delta supplied from the coding side to perform the inverse quantization. Therefore, it is possible to perform the inverse quantization process more suitable for the contents of the image to inhibit the subjective image quality of the decoded image from deteriorating.

Although it has been described above as the mobile phone 920, the image coding apparatus and the image decoding apparatus to which the present technology is applied may be applied to any apparatus having an imaging function and a communication function similar to those of the mobile phone 920 such as a PDA (Personal Digital Assistants), a smartphone, a UMPC (Ultra Mobile Personal Computer), a netbook, and a notebook computer, for example, as in the case of the mobile phone 920.

[Recording/Reproducing Apparatus]

Figure 42:
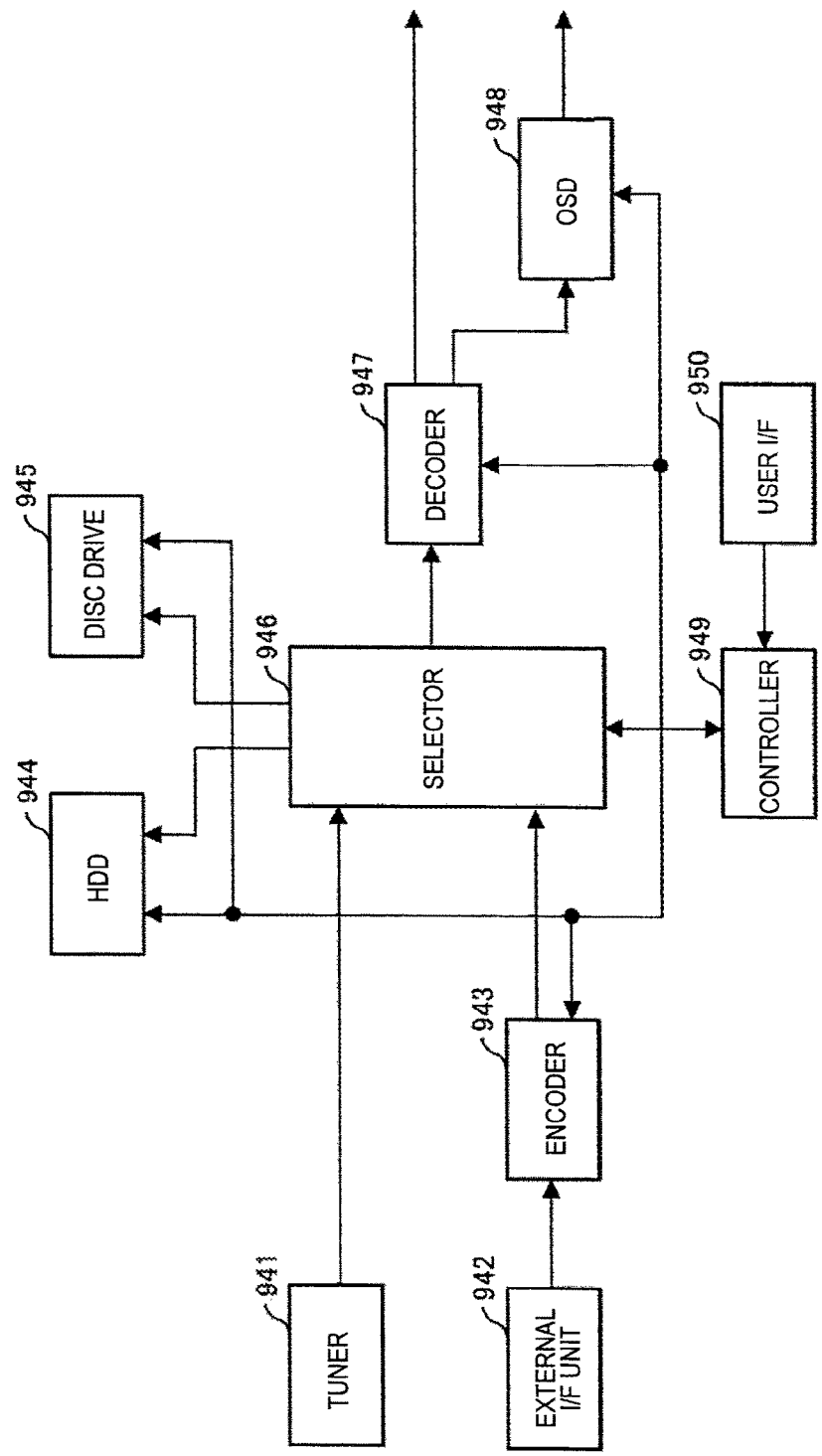
FIG. 42 is a block diagram illustrating a principal configuration example of a recording/reproducing apparatus to which the present technology is applied.

FIG. 42 illustrates an example of a schematic configuration of the recording/reproducing apparatus to which the above-described embodiment is applied. The recording/reproducing apparatus 940 codes the voice data and the video data of a received broadcast program to record on the recording medium, for example. Also, the recording/reproducing apparatus 940 may code the voice data and the video data obtained from another apparatus to record on the recording medium, for example. Also, the recording/reproducing apparatus 940 reproduces the data recorded on the recording medium by a monitor and the speaker according to the instruction of the user. At that time, the recording/reproducing apparatus 940 decodes the voice data and the video data.

The recording/reproducing apparatus 940 is provided with a tuner 941, an external interface 942, an encoder 943, a HDD (Hard Disk Drive) 944, a disc drive 945, a selector 946, a decoder 947, an OSD (On-Screen Display) 948, a controller 949, and a user interface 950.

The tuner 941 extracts a signal of a desired channel from the broadcast signal received through an antenna (not illustrated) and demodulates the extracted signal. Then, the tuner 941 outputs the coded bit stream obtained by the demodulation to the selector 946. That is, the tuner 941 serves as the transmitting means in the recording/reproducing apparatus 940.

The external interface 942 is the interface for connecting the recording/reproducing apparatus 940 and the external device or the network. The external interface 942 may be an IEEE1394 interface, a network interface, a USB interface, a flash memory interface and the like, for example. For example, the video data and the voice data received through the external interface 942 are input to the encoder 943. That is, the external interface 942 serves as the transmitting means in the recording/reproducing apparatus 940.

The encoder 943 codes the video data and the voice data when the video data and the voice data input from the external interface 942 are not coded. Then, the encoder 943 outputs the coded bit stream to the selector 946.

The HDD 944 records the coded bit stream in which content data such as the video and the voice are compressed, various programs and other data on an internal hard disc. The HDD 944 reads the data from the hard disc when reproducing the video and the voice.

The disc drive 945 records and reads the data on and from the mounted recording medium. The recording medium mounted on the disc drive 945 may be the DVD disc (DVD-Video, DVD-RAM, DVD-R, DVD-RW, DVD+R, DVD+RW and the like), a Blu-ray (registered trademark) disc and the like, for example.

The selector 946 selects the coded bit stream input from the tuner 941 or the encoder 943 and outputs the selected coded bit stream to the HDD 944 or the disc drive 945 when recording the video and the voice. Also, the selector 946 outputs the coded bit stream input from the HDD 944 or the disc drive 945 to the decoder 947 when reproducing the video and the voice.

The decoder 947 decodes the coded bit stream to generate the video data and the voice data. Then, the decoder 947 outputs the generated video data to the OSD 948. Also, the decoder 904 outputs the generated voice data to an external speaker.

The OSD 948 reproduces the video data input from the decoder 947 to display the video. The OSD 948 may also superimpose the GUI image such as the menu, the button, and the cursor, for example, on the displayed video.

The controller 949 includes the processor such as the CPU and the memory such as the RAM and ROM. The memory stores the program executed by the CPU, the program data and the like. The program stored in the memory is read by the CPU to be executed on activation of the recording/reproducing apparatus 940, for example. The CPU controls operation of the recording/reproducing apparatus 940 according to an operation signal input from the user interface 950, for example, by executing the program.

The user interface 950 is connected to the controller 949. The user interface 950 includes a button and a switch for the user to operate the recording/reproducing apparatus 940 and a receiver of a remote control signal, for example. The user interface 950 detects operation by the user through the components to generate the operation signal and outputs the generated operation signal to the controller 949.

In the recording/reproducing apparatus 940 configured in this manner, the encoder 943 has the functions of the image coding apparatus 100 (FIG. 1), the image coding apparatus 300 (FIG. 18), the image coding apparatus 500 (FIG. 29), the multi-view image coding apparatus 600 (FIG. 34), or the hierarchical image coding apparatus 620 (FIG. 37) according to the above-described embodiments. Also, the decoder 947 has the functions of the image decoding apparatus 200 (FIG. 9), the image decoding apparatus 400 (FIG. 21), the multi-view image decoding apparatus 610 (FIG. 35), and the hierarchical image decoding apparatus 630 (FIG. 38) according to the above-described embodiments. Therefore, the quantization value for each sub macroblock is calculated and the orthogonal transform coefficient is quantized by using the quantization value for each sub macroblock for the video coded and decoded by the recording/reproducing apparatus 940. In this manner, it is possible to perform the quantization process more suitable for the contents of the image and generate the coded data so as to inhibit the subjective image quality of the decoded image from deteriorating. Also, the quantization value for each sub macroblock is calculated by using the quantization parameter such as submb_qp_delta supplied from the coding side and the inverse quantization is performed. Therefore, it is possible to perform the inverse quantization process more suitable for the contents of the image and inhibit the subjective image quality of the decoded image from deteriorating.

[Imaging Apparatus]

Figure 43:
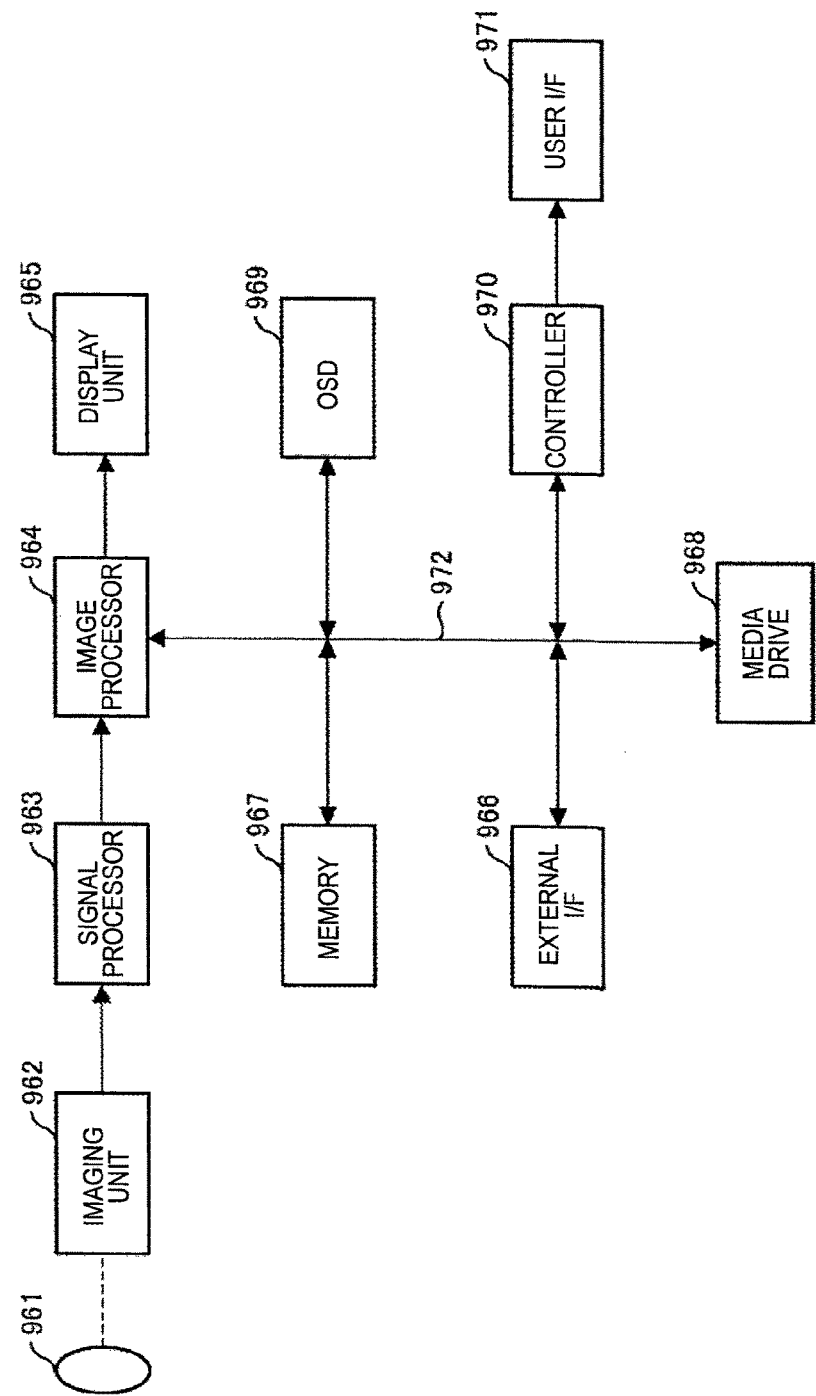
FIG. 43 is a block diagram illustrating a principal configuration example of an imaging apparatus to which the present technology is applied.

FIG. 43 illustrates an example of a schematic configuration of an imaging apparatus to which the above-described embodiment is applied. An imaging apparatus 960 takes an image of the object to generate the image, codes the image data and records the same on the recording medium.

The imaging apparatus 960 is provided with an optical block 961, an imaging unit 962, a signal processor 963, an image processor 964, a display unit 965, an external interface 966, a memory 967, a media drive 968, an OSD 969, a controller 970, a user interface 971, and a bus 972.

The optical block 961 is connected to the imaging unit 962. The imaging unit 962 is connected to the signal processor 963. The display unit 965 is connected to the image processor 964. The user interface 971 is connected to the controller 970. The bus 972 connects the image processor 964, the external interface 966, the memory 967, the media drive 968, the OSD 969, and the controller 970 to one another.

The optical block 961 includes a focus lens, a diaphragm mechanism and the like. The optical block 961 forms an optical image of the object on an imaging surface of the imaging unit 962. The imaging unit 962 includes an image sensor such as a CCD and a CMOS and converts the optical image formed on the imaging surface to an image signal as an electric signal by photoelectric conversion. Then, the imaging unit 962 outputs the image signal to the signal processor 963.

The signal processor 963 performs various camera signal processes such as knee correction, gamma correction, color correction to the image signal input from the imaging unit 962. The signal processor 963 outputs the image data after the camera signal process to the image processor 964.

The image processor 964 codes the image data input from the signal processor 963 to generate the coded data. Then, the image processor 964 outputs the generated coded data to the external interface 966 or the media drive 968. Also, the image processor 964 decodes the coded data input from the external interface 966 or the media drive 968 to generate the image data. Then, the image processor 964 outputs the generated image data to the display unit 965. The image processor 964 may also output the image data input from the signal processor 963 to the display unit 965 to display the image. The image processor 964 may also superimpose data for display obtained from the OSD 969 on the image output to the display unit 965.

The OSD 969 generates the GUI image such as the menu, the button, and the cursor, for example, and outputs the generated image to the image processor 964.

The external interface 966 is composed as an USB input/output terminal, for example. The external interface 966 connects the imaging apparatus 960 and a printer when printing the image, for example. Also, a drive is connected to the external interface 966 as needed. The removable medium such as the magnetic disc and the optical disc is mounted on the drive, for example, and the program read from the removable medium may be installed on the imaging apparatus 960. Further, the external interface 966 may be configured as a network interface connected to the network such as a LAN and the Internet. That is, the external interface 966 serves as the transmitting means in the imaging apparatus 960.

The recording medium mounted on the media drive 968 may be an arbitrary readable/writable removable medium such as the magnetic disc, the magnetooptical disc, the optical disc, and the semiconductor memory, for example. It is also possible that the recording medium is fixedly mounted on the media drive 968 to compose a non-portable storage unit such as a built-in hard disc drive or SSD (Solid State Drive), for example.

The controller 970 includes the processor such as the CPU and the memory such as the RAM and the ROM. The memory stores the program executed by the CPU and the program data. The program stored in the memory is read by the CPU at startup of the imaging apparatus 960 to be executed, for example. The CPU controls operation of the imaging apparatus 960 according to the operation signal input from the user interface 971, for example, by executing the program.

The user interface 971 is connected to the controller 970. The user interface 971 includes a button, a switch and the like for the user to operate the imaging apparatus 960, for example. The user interface 971 detects the operation by the user through the components to generate the operation signal and outputs the generated operation signal to the controller 970.

In the imaging apparatus 960 configured in this manner, the image processor 964 has the functions of the image coding apparatus 100 (FIG. 1), the image coding apparatus 300 (FIG. 18), the image coding apparatus 500 (FIG. 29), the multi-view image coding apparatus 600 (FIG. 34), or the hierarchical image coding apparatus 620 (FIG. 37) and the functions of the image decoding apparatus 200 (FIG. 9), the image decoding apparatus 400 (FIG. 21), the multi-view image decoding apparatus 610 (FIG. 35), or the hierarchical image decoding apparatus 630 (FIG. 38) according to the above-described embodiments. Therefore, the image processor 964 calculates the quantization value for each sub macroblock and quantizes the orthogonal transform coefficient by using the quantization value for each sub macroblock for the video coded and decoded by the imaging apparatus 960. In this manner, it is possible to perform the quantization process more suitable for the contents of the image and generate the coded data so as to inhibit the subjective image quality of the decoded image from deteriorating. Also, the image processor 964 calculates the quantization value for each sub macroblock by using the quantization parameter such as submb_qp_delta supplied from the coding side and performs the inverse quantization. Therefore, it is possible to perform the inverse quantization process more suitable for the contents of the image and inhibit the subjective image quality of the decoded image from deteriorating.

It goes without saying that the image coding apparatus and the image decoding apparatus to which the present technology is applied may be applied to the apparatus and system other than the above-described apparatus.

Meanwhile, an example in which the quantization parameter is transmitted from the coding side to the decoding side has been described in this specification. It is possible that a method of transmitting a quantization matrix parameter is transmitted or recorded as separate data associated with the coded bit stream instead of being multiplexed with the coded bit stream. Herein, the term "associate" means that the image included in the bit stream (or a part of the image such as a slice and a block) and information corresponding to the image may be linked with each other at the time of decoding. That is, the information may be transmitted on a transmission channel other than that of the image (or bit stream). Also, the information may be recorded on the recording medium other than that of the image (or bit stream) (or another recording area of the same recording medium). Further, it is possible that the information and the image (or bit stream) are associated with each other in an arbitrary unit such as a plurality of frames, one frame, or a part of the frame, for example.

Although preferred embodiments of this disclosure have been described in detail with reference to the attached drawings, the technical scope of this disclosure is not limited to such examples. It is clear that one skilled in the art of this disclosure may conceive of various modifications and corrections within the scope of the technical idea recited in claims and it is understood that they also naturally belong to the technical scope of this disclosure.

REFERENCE SIGNS LIST

100 Image coding apparatus
105 Quantization unit
108 Inverse quantization unit
117 Rate controller
121 Sub macroblock quantization unit
122 Sub macroblock inverse quantization unit 151 Sub macroblock activity buffer
152 Quantization parameter calculation unit
153 Quantization processor
200 Image decoding apparatus
203 Inverse quantization unit
221 Sub macroblock inverse quantization unit
251 Quantization parameter buffer
252 Orthogonal transform coefficient buffer
253 Inverse quantization processor

The invention claimed is:

1. A method for processing an image performed by an image processing apparatus, the method comprising:
  decoding a bit stream to generate quantized data, the bit stream including a flag, for each block, that specifies whether or not a difference quantization parameter is present in the bit stream, and the flag being included in a first layer that is higher than a second layer in which the difference quantization parameter is set;
  setting, by processing circuitry of the image processing apparatus according to the flag, a current quantization parameter for a current sub block formed by block partitioning, which splits a block into smaller sub blocks; and
  inversely quantizing, by the processing circuitry, the generated quantized data using the set current quantization parameter.

2. The method according to claim 1, wherein the setting comprises:
  setting the current quantization parameter for the current sub block using a value indicating a minimum sub block size for which the difference quantization parameter is set.

3. The method according to claim 2, wherein the difference quantization parameter is a difference value between the current quantization parameter for the current sub block and a previous quantization parameter for a previous sub block.

4. The method according to claim 3, wherein the previous sub block is a sub block that is decoded immediately before the current sub block in the order the bit stream is decoded.

5. The method according to claim 1, wherein the difference quantization parameter is a difference value between the current quantization parameter set for the current sub block and a current slice quantization parameter set for a current slice.

6. The method according to claim 1, further comprising:
  acquiring the flag as a syntax of the bit stream.

7. The method according to claim 1, wherein
  the block is a largest coding unit (LCU) and the sub block is a coding unit, and
  the LCU is recursively split into the coding units.

8. An image processing apparatus, comprising:
  processing circuitry configured to
    decode a bit stream to generate quantized data, the bit stream including a flag, for each block, that specifies whether or not a difference quantization parameter is present in the bit stream, and the flag being included in a first layer that is higher than a second layer in which the difference quantization parameter is set;
    set, according to the flag, a current quantization parameter for a current sub block formed by block partitioning, which splits a block into smaller sub blocks; and
    inversely quantize the generated quantized data using the set current quantization parameter.

9. The image processing apparatus according to claim 8, wherein the processing circuitry is configured to
  set the current quantization parameter for the current sub block using a value indicating a minimum sub block size for which the difference quantization parameter is set.

10. The image processing apparatus according to claim 8, wherein the difference quantization parameter is a difference value between the current quantization parameter for the current sub block and a previous quantization parameter for a previous sub block.

11. The image processing apparatus according to claim 10, wherein the previous sub block is a sub block that is decoded immediately before the current sub block in the order the bit stream is decoded.

12. The image processing apparatus according to claim 8, wherein the difference quantization parameter is a difference value between the current quantization parameter set for the current sub block and a current slice quantization parameter set for a current slice.

13. The image processing apparatus according to claim 8, wherein the processing circuitry is configured to
  acquire the flag as a syntax of the bit stream.

14. The image processing apparatus according to claim 8, wherein
  the block is a largest coding unit (LCU) and the sub block is a coding unit, and
  the LCU is recursively split into the coding units.

* * * * *